US012003924B2

(12) United States Patent
Rucker

(10) Patent No.: US 12,003,924 B2
(45) Date of Patent: Jun. 4, 2024

(54) PIEZOELECTRIC TRANSDUCER FOR TYMPANIC MEMBRANE

(71) Applicant: Earlens Corporation, Menlo Park, CA (US)

(72) Inventor: Paul Rucker, San Francisco, CA (US)

(73) Assignee: Earlens Corporation, Menlo Park, CA (US)

(*) Notice: Subject to any disclaimer, the term of this patent is extended or adjusted under 35 U.S.C. 154(b) by 276 days.

(21) Appl. No.: 17/549,722

(22) Filed: Dec. 13, 2021

(65) Prior Publication Data

US 2022/0150650 A1 May 12, 2022

Related U.S. Application Data

(63) Continuation of application No. PCT/US2020/040089, filed on Jun. 29, 2020.

(60) Provisional application No. 62/870,237, filed on Jul. 3, 2019.

(51) Int. Cl.
*H04R 25/00* (2006.01)
*H04R 17/00* (2006.01)

(52) U.S. Cl.
CPC ........... *H04R 25/606* (2013.01); *H04R 17/00* (2013.01); *H04R 25/609* (2019.05); *H04R 25/652* (2013.01); *H04R 2225/025* (2013.01); *H04R 2460/11* (2013.01); *H04R 2460/13* (2013.01)

(58) Field of Classification Search
CPC ........................... H04R 25/505; H04R 25/554; H04R 2225/55; H04R 2430/01; H04R 25/70; H04R 25/55
See application file for complete search history.

(56) References Cited

U.S. PATENT DOCUMENTS 4,756,312 A * 7/1988 Epley .................. H04R 25/606 607/57

* cited by examiner

*Primary Examiner* — Amir H Etesam
(74) *Attorney, Agent, or Firm* — Polsinelli PC

(57) ABSTRACT

The present disclosure provides a contact hearing device comprising a piezoelectric actuator. The attachment of the piezoelectric actuator to a tympanic membrane can vibrate the tympanic membrane based on a transmission received by the receiver assembly and produce perception of sounds.

21 Claims, 40 Drawing Sheets

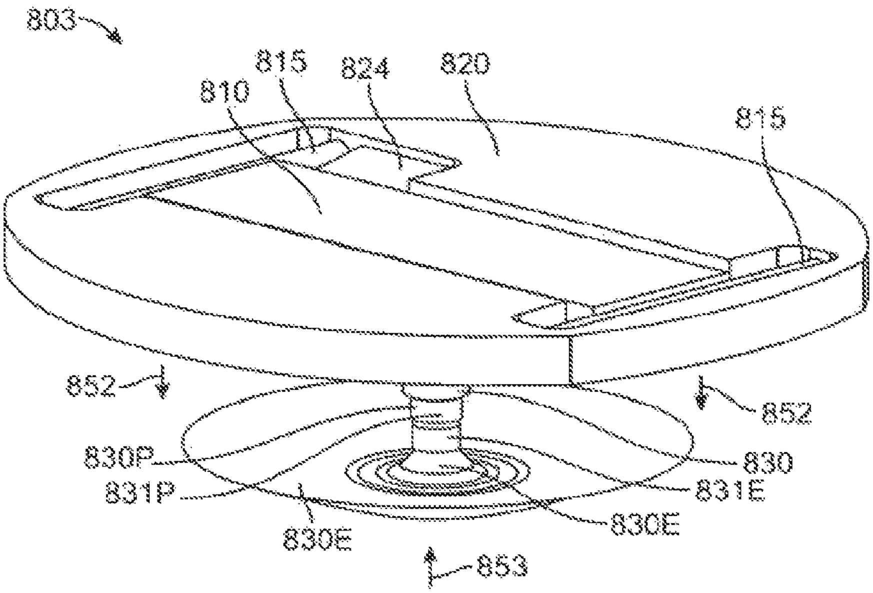
FIG. 10B1

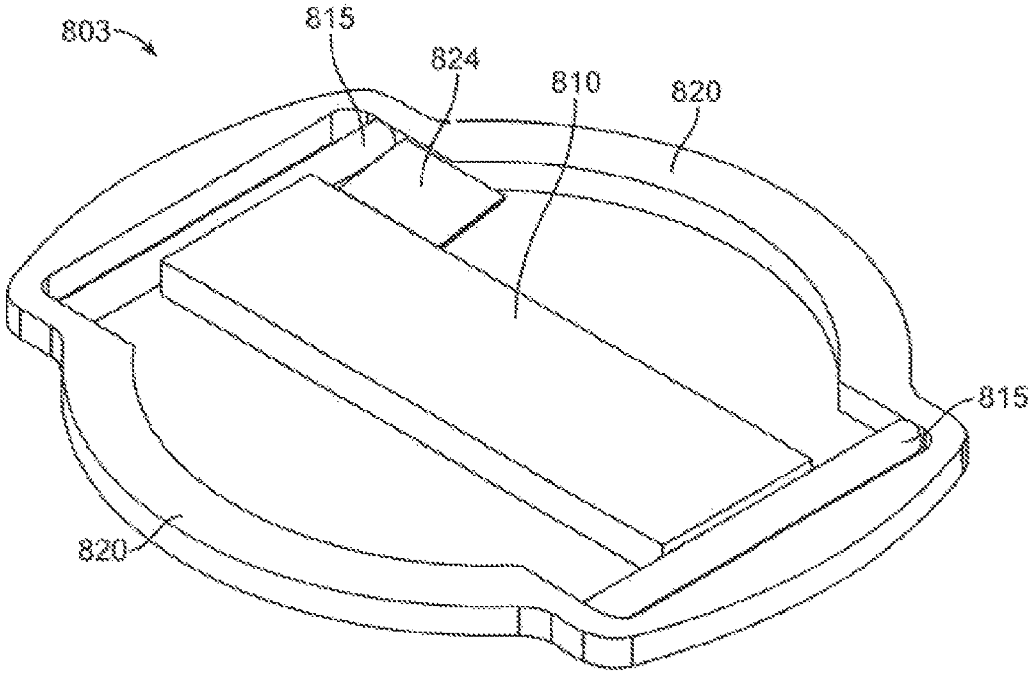
FIG. 10B2

PIEZOELECTRIC TRANSDUCER FOR TYMPANIC MEMBRANE

CROSS-REFERENCE

This application is a continuation of PCT Application No. PCT/US20/40089, filed Jun. 29, 2020; which claims priority to U.S. Provisional Patent Application No. 62/870,237, filed Jul. 3, 2019; the contents of which are incorporated herein by reference.

The subject matter of this application is related to that of U.S. patent application Ser. No. 13/069,282 filed Mar. 22, 2011; Ser. No. 15/042,595 filed Feb. 12, 2016; Ser. No. 15/911,595 filed Mar. 5, 2018; and U.S. Provisional Applications Nos. 62/712,458; 62/712,462; 62/712,466; 62/712,474; 62/712,478 filed Jul. 31, 2018, the contents of which are incorporated herein by reference.

BACKGROUND

The present disclosure is related to hearing systems, devices, and methods. Although specific reference is made to hearing aid systems, embodiments of the present disclosure can be used in many applications in which a signal is used to stimulate the ear.

People like to hear. Hearing allows people to listen to and understand others. Natural hearing can include spatial cues that allow a user to hear a speaker, even when background noise is present.

Hearing devices can be used with communication systems to help the hearing impaired. Hearing impaired subjects need hearing aids to verbally communicate with those around them. Open canal hearing aids have proven to be successful in the marketplace because of increased comfort and an improved cosmetic appearance. Another reason why open canal hearing aids can be popular is reduced occlusion of the ear canal. Occlusion can result in an unnatural, tunnel-like hearing effect which can be caused by large hearing aids which block the ear canal. In at least some instances, occlusion will be noticed by the user when he or she speaks and the occlusion results in an unnatural sound during speech. However, a problem that may occur with open canal hearing aids is feedback. The feedback may result from placement of the microphone in too close proximity with the speaker or the amplified sound being too great. Thus, feedback can limit the degree of sound amplification that a hearing aid can provide. Although feedback can be decreased by placing the microphone outside the ear canal, this placement can result in the device providing an unnatural sound that is devoice of the spatial location information cues present with natural hearing.

In some instances, feedback may be decreased by using non-acoustic means of stimulating the natural hearing transduction pathway, for example, stimulating the tympanic membrane, bones of the ossicular chain, and/or the cochlea. An output transducer may be placed on the eardrum, the ossicles in the middle ear, or the cochlea to stimulate the hearing pathway. Such an output transducer may be electromagnetically based. For example, the transducer may comprise a magnet and coil placed on the ossicles to stimulate the hearing pathway. Surgery is often needed to place a hearing device on the ossicles or cochlea, and such surgery can be somewhat invasive in at least some instances. At least some of the known methods of placing an electromagnetic transducer on the eardrum may result in occlusion in some instances.

One promising approach has been to place a magnet on the eardrum and drive the magnet with a coil positioned away from the eardrum. The magnets can be electromagnetically driven with a coil to cause motion in the hearing transduction pathway thereby causing neural impulses leading to the sensation of hearing. A permanent magnet may be coupled to the ear drum through the use of a fluid and surface tension, for example as described in U.S. Pat. Nos. 5,259,032 and 6,084,975.

However, there is still room for improvement. For example, with a magnet positioned on the eardrum and coil positioned away from the magnet, the strength of the magnetic field generated to drive the magnet may decrease rapidly with the distance from the driver coil to the permanent magnet. Because of this rapid decrease in strength over distance, efficiency of the energy to drive the magnet may be less than ideal. Also, placement of the driver coil near the magnet may cause discomfort for the user in some instances. There can also be a need to align the driver coil with the permanent magnet that may, in some instances, cause the performance to be less than ideal.

For the above reasons, it would be desirable to provide hearing systems which at least decrease, or even avoid, at least some of the above mentioned limitations of the current hearing devices. For example, there is a need to provide a comfortable hearing device which provides hearing with natural qualities, for example with spatial information cues, and which allow the user to hear with less occlusion, distortion and feedback than current devices.

SUMMARY

The present disclosure is related to hearing systems, devices, and methods. Although specific reference is made to hearing aid systems, embodiments of the present disclosure can be used in many applications in which a signal is used to stimulate the ear.

Embodiments of the present disclosure can provide improved hearing which overcomes at least some of the aforementioned limitations of current systems. In many embodiments, a device to transmit an audio signal to a user may comprise a transducer assembly comprising a mass, a piezoelectric transducer, and a support to support the mass and the piezoelectric transducer with the eardrum. The piezoelectric transducer can be configured to drive the support and the eardrum with a first force and the mass with a second force opposite the first force. This driving of the ear drum and support with a force opposite the mass can result in more direct driving of the eardrum, and can improve coupling of the vibration of transducer to the eardrum. The transducer assembly device may comprise circuitry configured to receive wireless power and wireless transmission of an audio signal, and the circuitry can be supported with the eardrum to drive the transducer in response to the audio signal, such that vibration between the circuitry and the transducer can be decreased. The wireless signal may comprise an electromagnetic signal produced with a coil, or an electromagnetic signal comprising light energy produce with a light source. In at least some embodiments, at least one of the transducer or the mass can be positioned on the support away from the umbo of the ear when the support is coupled to the eardrum to drive the eardrum, so as to decrease motion of the transducer and decrease user perceived occlusion, for example, when the user speaks. This positioning of the transducer and/or the mass away from the umbo, for example, on the short process of the malleus, may allow a transducer with a greater mass to be used and may even amplify the motion of the transducer with the malleus. In at least some embodiments, the transducer may comprise a plurality of transducers to drive the malleus with both a hinging rotational motion and a twisting motion, which can result in more natural motion of the malleus and can improve transmission of the audio signal to the user.

In a first aspect, embodiments of the present disclosure provide a device to transmit an audio signal to a user. The user has an ear comprising an ear drum. The device comprises a mass, a piezoelectric transducer, and a support to support the mass and the piezoelectric transducer with the eardrum. The piezoelectric transducer is configured to drive the support and the eardrum with a first force and the mass with a second force opposite the first force.

In many embodiments, the piezoelectric transducer is disposed between the mass and the support.

In many embodiments, the device further comprises at least one flexible structure disposed between the piezoelectric transducer and the mass.

In many embodiments, the piezoelectric transducer is magnetically coupled to the support.

In many embodiments, the piezoelectric transducer comprises a first portion connected to the mass and a second portion connected to the support to drive the mass opposite the support.

In many embodiments, the support comprises a first side shaped to conform with the eardrum. A protrusion can be disposed opposite the first side and affixed to the piezoelectric transducer.

In many embodiments, the device further comprises a fluid disposed between the first side and the eardrum to couple the support to the eardrum. The fluid may comprise a liquid composed of at least one of an oil, a mineral oil, a silicone oil, or a hydrophobic liquid. In some embodiments, the support comprises a second side disposed opposite the first side and the protrusion extends from the second side to the piezoelectric transducer.

In many embodiments, the support comprises a first component and a second component. The first component may comprise a flexible material shaped to conform to the eardrum and flex with motion of the eardrum. The second component may comprise a rigid material extending from the transducer to the flexible material to transmit the first force to the flexible material and the eardrum. In at least some embodiments, the rigid material comprises at least one of a metal, titanium, a stainless steel or a rigid plastic, and the flexible material comprises at least one of a silicone, a flexible plastic or a gel.

In many embodiments, the device further comprises a housing, which may be rigidly affixed to the mass to move the housing and the mass opposite the support. In some embodiments, the support comprises a rigid material that extends through the housing to the transducer to move the mass and the housing opposite the support.

In many embodiments, the mass comprises circuitry coupled to the transducer and supported with the support and the transducer. The circuitry is configured to receive wireless power and wireless transmission of the audio signal to drive the transducer in response to the audio signal.

In many embodiments, the piezoelectric transducer comprises at least one of a piezoelectric unimorph transducer, a bimorph-bender piezoelectric transducer, a piezoelectric multimorph transducer, a stacked piezoelectric transducer with a mechanical multiplier, or a ring piezoelectric transducer with a mechanical multiplier.

In some embodiments, the piezoelectric transducer comprises the bimorph-bender piezoelectric transducer and the mass comprises a first mass and a second mass. The bimorph bender comprises a cantilever extending from a first end supporting the first mass to a second end supporting the second mass. The support is coupled to the cantilever between the first end and the second end to drive the ear drum with the first force and drive the first mass and the second mass with the second force.

In some embodiments, the piezoelectric transducer comprises the stacked piezoelectric transducer with the mechanical multiplier. The mechanical multiplier comprises a first side coupled to the support to drive the eardrum with the first force and a second side coupled to the mass to drive the mass with the second force.

In some embodiments, the piezoelectric transducer comprises the ring piezoelectric transducer with the mechanical multiplier. The mechanical multiplier comprises a first side and a second side. The first side extends inwardly from the ring piezoelectric transducer to the mass. The second side extends inwardly toward a protrusion of the support. The mass moves away from the protrusion of the support when the ring contracts and toward the protrusion of the support when the ring expands. The ring piezoelectric multiplier may define a center having central axis extending there through. The central protrusion and the mass may be disposed along the central axis.

In some embodiments, the piezoelectric transducer comprises the bimorph bender. The mass comprises a ring having a central aperture formed thereon. The bimorph bender extends across the ring with a first end and a second end coupled to the ring. The support extends through the aperture and connects to the piezoelectric transducer between the first end and the second end to move the support opposite the ring when the bimorph bender bends. The bimorph bender can be connected to the ring with an adhesive on the first end and the second end such that the first end and the second end are configured to move relative to the ring with shear motion when the bimorph bender bends to drive the support opposite the ring.

In another aspect, embodiments of the present invention provide a device to transmit an audio signal to a user. The user has an ear comprising an eardrum. The device comprises a transducer, circuitry coupled to the transducer, and a support configured to couple to the eardrum and support the circuitry and the transducer with the eardrum. The circuitry is configured to receive at least one of wireless power or wireless transmission of the audio signal to drive the transducer in response to the audio signal.

In many embodiments, the transducer is configured to drive the support and the eardrum with a first force and drive the circuitry with a second force opposite the first force.

In many embodiments, the circuitry is rigidly attached to a mass and coupled to the transducer to drive the circuitry and the mass with the first force. In some embodiments, the circuitry is rigidly attached to the mass and coupled to the transducer to drive the circuitry and the mass with the second force.

In many embodiments, the circuitry is flexibly attached to a mass and coupled to the transducer to drive the circuitry and the mass with the first force. In some embodiments, the circuitry is flexibly attached to the mass and coupled to the transducer to drive the circuitry and the mass with the second force.

In many embodiments, the circuitry comprises at least one of a photodetector or a coil supported with the support and coupled to the transducer to drive the transducer with the at least one of the wireless power or wireless transmission of the audio signal.

In many embodiments, the transducer comprises at least one of a piezoelectric transducer, a magnetostrictive transducer, a magnet, or a coil.

In another aspect, embodiments of the invention provide a device to transmit an audio signal to a user. The user has an ear comprising an eardrum having a mechanical impedance. The device comprises a transducer and a support to support the transducer with the eardrum. A combined mass of the support and the transducer supported thereon is configured to match the mechanical impedance of the eardrum for at least one audible frequency between about 0.8 kHz and about 10 kHz.

In many embodiments, the combined mass comprises no more than about 50 mg. In some embodiments, the combined mass is within a range from about 10 mg to about 150 mg. In other embodiments, the combined mass is within a range from about 50-100 mg.

In many embodiments, the combined mass comprises at least one of a mass from circuitry to drive the transducer, a mass from a housing disposed over the transducer, or a metallic mass coupled to the transducer opposite the support. In some embodiments, the transducer, the circuitry to drive the transducer, the housing disposed over the transducer and the metallic mass are supported with the eardrum when the support is coupled to the eardrum.

In many embodiments, at least one audible frequency is between about 1 kHz and about 6 KHz.

In many embodiments, the transducer and the mass are positioned on the support to place at least one of the transducer or the mass away from an umbo of the eardrum when the support is placed on the eardrum. This positioning can decrease a mechanical impedance of the support to sound transmitted with the eardrum when the support is positioned on the eardrum.

In many embodiments, the piezoelectric transducer comprises a stiffness. The stiffness of the piezoelectric transducer is matched to the mechanical impedance of the eardrum for the at least one audible frequency.

In many embodiments, the eardrum comprises an umbo and the acoustic input impedance comprises an acoustic impedance of the umbo. The stiffness of the piezoelectric transducer is matched to the acoustic input impedance of the umbo.

In another aspect, embodiments of the present disclosure provide a device to transmit an audio signal to a user. The user has an ear comprising an eardrum and a malleus connected to the ear drum at an umbo. The device comprises a transducer and a support to support the transducer with the eardrum. The transducer is configured to drive the eardrum. The transducer is positioned on the support to extend away from the umbo when the support is placed on the eardrum.

In many embodiments, a mass is positioned on the support for placement away from the umbo when the support is placed against the eardrum, and the transducer extends between the mass and a position on the support that corresponds to the umbo so as to couple vibration of the transducer to the umbo. The mass can be positioned on the support to align the mass with the malleus away from the umbo when the support is placed against the eardrum.

In many embodiments, the transducer is positioned on the support so as to decrease a first movement of the transducer relative to a second movement of the umbo when the eardrum vibrates and to amplify the second movement of the umbo relative to the first movement of the transducer when the transducer vibrates. In some embodiments, the first movement of the transducer is no more than about 75% of the second movement of the umbo and the second movement of the umbo is at least about 25% more than the first movement of the transducer. The first movement of the transducer may be no more than about 67% of the second movement of the umbo and the second movement of the umbo may be at least about 50% more than the first movement of the transducer.

In many embodiments, the device further comprises a mass, and the transducer is disposed between the mass and the support.

In many embodiments, the support is shaped to the eardrum of the user to position the support on the eardrum in a pre-determined orientation. The transducer is positioned on the support to align the transducer with a malleus of the user with the eardrum disposed between the malleus and the support when the support is placed on the eardrum. In some embodiments, the support comprises a shape from a mold of the eardrum of the user.

In many embodiments, the transducer is positioned on the support to place the transducer away from a tip of the malleus when the support is placed on the eardrum.

In many embodiments, the transducer is positioned on the support to place the transducer away from the tip when the support is positioned on the eardrum. The malleus comprises a head and a handle. The handle extends from the head to a tip near the umbo of the eardrum.

In many embodiments, the transducer is positioned on the support to align the transducer with the lateral process of the malleus with the eardrum disposed between the lateral process and the support when the support is placed on the eardrum. In some embodiments, the support comprises a rigid material that extends from the transducer toward the lateral process to move the lateral process opposite the mass.

In many embodiments, the transducer comprises at least one of a piezoelectric transducer, a magnetostrictive transducer, a photostrictive transducer, a coil, or a magnet.

In many embodiments, the transducer comprises the piezoelectric transducer. The piezoelectric transducer may comprise a cantilevered bimorph bender, which has a first end anchored to the support and a second end attached to a mass to drive the mass opposite the lateral process when the support is placed on the eardrum.

In many embodiments, the device further comprises a mass coupled to the transducer and circuitry coupled to the transducer to drive the transducer. The mass and the circuitry are supported with the eardrum when the support is placed on the ear. The support, the transducer, the mass, and the circuitry comprise a combined mass of no more than about 60 mg, for example, a combined mass of no more than about 40 mg or even a combined mass of no more than 30 mg.

In another aspect, embodiments of the present disclosure provide a device to transmit an audio signal to a user. The user has an ear comprising an ear drum. The device comprises a first transducer, a second transducer, and a support to support the first transducer and the second transducer with the eardrum when the support is placed against the eardrum. The first transducer is positioned on the support to couple to a first side of the malleus. The second transducer positioned on the support to couple to a second side of the malleus.

In many embodiments, the first transducer is positioned on the support to couple to the first side of the malleus and the second transducer is positioned on the support and coupled to the second side of the malleus which is opposite the first side of the malleus.

In many embodiments, the support comprises a first protrusion extending to the first transducer to couple the first side of the malleus to the first transducer and a second protrusion extending to the second transducer to couple the second side of the malleus to the second transducer.

In many embodiments, the first transducer and second transducer are positioned on the support and configured to twist the malleus with a first rotation about a longitudinal axis of the malleus when the first transducer and second transducer move in opposite directions. The first transducer and second transducer can be positioned on the support and configured to rotate the malleus with a second hinged rotation when the first transducer and second transducer move in similar directions.

In many embodiments, the device further comprises circuitry coupled to the first transducer and the second transducer. The circuitry is configured to generate a first signal to drive the transducer and a second signal to drive the second transducer. In some embodiments, the circuitry is configured to generate the first signal at least partially out of phase with the second signal and drive the malleus with a twisting motion. The circuitry can be configured to drive the first transducer substantially in phase with the second transducer at a first frequency below about 1 kHz, and the circuitry can be configured to drive the first transducer at least about ten degrees out of phase with the second transducer at a second frequency above at least about 2 kHz.

In many embodiments, the first transducer comprises at least one of a first piezoelectric transducer, a first coil and magnet transducer, a first magnetostrictive transducer or a first photostrictive transducer, and the second transducer comprises at least one of a second piezoelectric transducer, a second coil and magnet transducer, a second magnetostrictive transducer or a second photostrictive transducer.

In another aspect, embodiments of the present disclosure provide a method of transmitting an audio signal to a user. The user has an ear comprising an eardrum. The method comprises supporting a mass and a piezoelectric transducer with a support on the eardrum of the user and driving the support and the eardrum with a first force and the mass with a second force, the second force opposite the first force.

In many embodiments, the ear comprises a mechanical impedance. The mass, the piezoelectric transducer, and the support comprise a combined mechanical impedance. The combined mechanical impedance matches the mechanical impedance of the eardrum for at least one audible frequency within a range from about 1 kHz to about 6 KHz.

In another aspect, embodiments of the present disclosure provide a method of transmitting an audio signal to a user. The user has an ear comprising an eardrum. The method comprises supporting circuitry and a transducer coupled to the circuitry with the eardrum and transmitting the audio signal with a wireless signal to the circuitry to drive the transducer in response to the audio signal.

In another aspect, embodiments of the present disclosure provide a method of transmitting an audio signal to a user. The user has an ear comprising an eardrum having a mechanical impedance. The method comprises supporting a transducer and a support coupled to the eardrum with the eardrum. A combined mass of the support and the transducer supported thereon matches the mechanical impedance of the eardrum for at least one audible frequency between about 0.8 kHz and about 10 kHz.

In another aspect, embodiments of the present disclosure provide a method of transmitting an audio signal to a user. The user has an ear comprising an eardrum and a malleus connected to the ear drum at an umbo. The method comprises supporting a transducer with a support positioned on the eardrum and vibrating the support and the eardrum with the transducer positioned away from the umbo. In many embodiments, a first movement of the transducer is decreased relative to a second movement of the umbo when the eardrum is vibrated and the second movement of the umbo is amplified relative to the first movement of the transducer.

In another aspect, embodiments of the present disclosure provide a method of transmitting an audio signal to a user. The user has an ear comprising an eardrum and a malleus connected to the eardrum at an umbo. The method comprises supporting a first transducer and a second transducer with a support positioned on the eardrum. The first transducer and the second transducer are driven in response to the audio signal to the twist the malleus such that the malleus rotates about an elongate longitudinal axis of the malleus.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 10B1 and 10B2 shows perspective views of ring mass with a bimorph piezo with flexible structures to couple the bimorph piezo to the ring mass, in accordance with the system of FIGS. 1, 2, and 3A to 5;

FIG. 23A shows a top view of the flat circular piezoelectric actuator. FIG. 23B shows a top view of a sub-circular section of the flat circular piezoelectric actuator in FIG. 23A, with piezoelectric wires arranged in a triangular configuration. FIG. 23C shows a cross-sectional view along a diameter of the flat circular piezoelectric actuator in FIG. 23A. FIG. 23D shows a magnified view of the cross-sectional view in FIG. 23C. FIG. 23E shows a cross-sectional view along a diameter of the flat piezoelectric actuator in FIG. 23C during flexing or movement of the flat piezoelectric actuator when a data transmission is received. FIG. 23F shows a perspective view of the flexing, flat circular piezoelectric actuator in FIG. 23F;

FIG. 25A shows a top view of the flat rectangular piezoelectric actuator, with piezoelectric wires arranged in a rectangular configuration. FIG. 25B illustrates a cross-sectional view of the flat rectangular piezoelectric actuator in FIG. 25A during flexing or movement of the flat rectangular piezoelectric actuator when a data transmission is received;

FIG. 26A shows a side section view of the contact hearing device, including a drive post, umbo lens, chassis, and perimeter platform, as placed in the ear canal adjacent the tympanic membrane. FIG. 26B shows a side lateral view of the contact hearing device of FIG. 26A as placed in the ear canal adjacent the tympanic membrane, the contact hearing device including a flat circular piezoelectric actuator as in FIGS. 23A-23F;

FIG. 27A shows a top view of the actuator assembly, wherein only one side of the actuator is connected to the chassis by a spring member. FIG. 27B shows a side view of the actuator assembly of FIG. 27B; FIG. 28A shows a top view of the actuator assembly, including its chassis, including spring members connecting two sides of the actuator to the chassis. FIG. 28B shows a side view of the actuator assembly of FIG. 28A.

DETAILED DESCRIPTION

Figure 1:
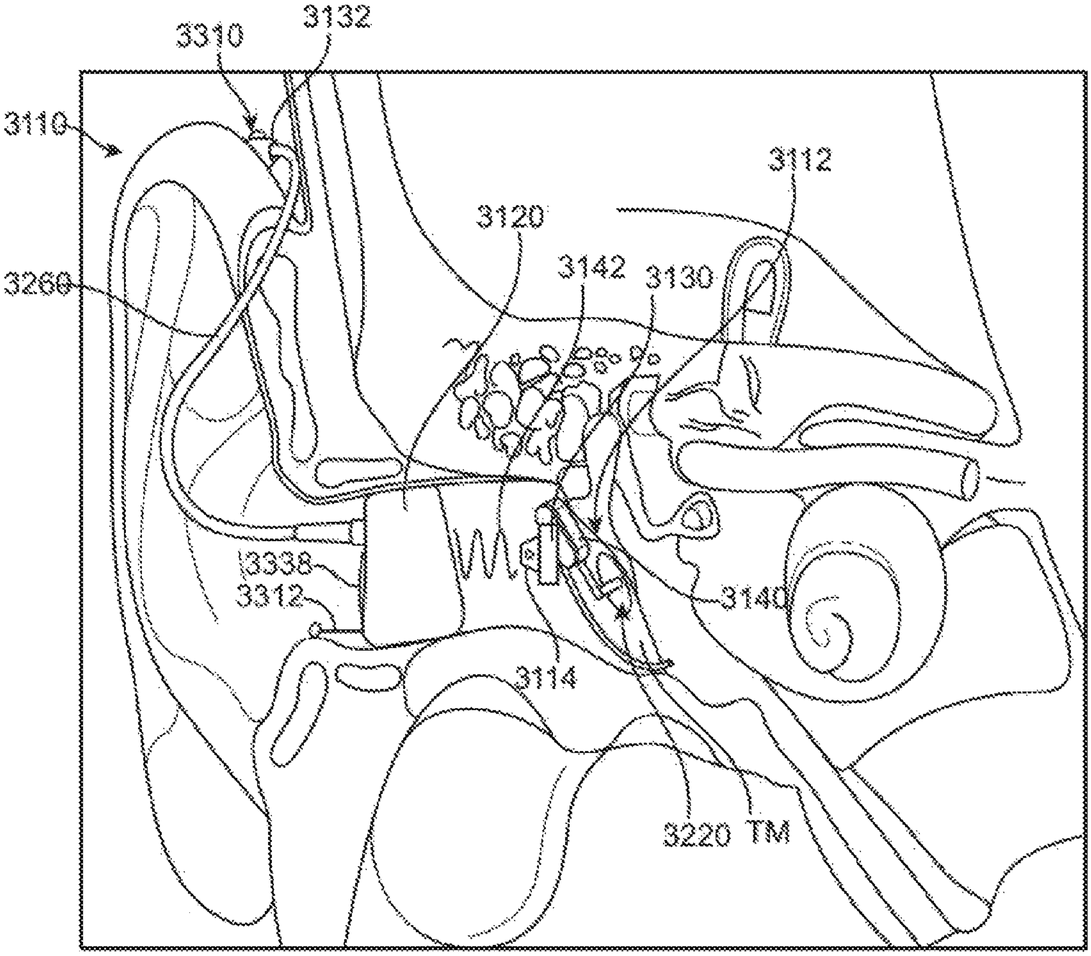
FIG. 1 is a cutaway view of an ear canal showing a contact hearing system using an inductive transmission according to the present disclosure, wherein at least a portion of the contact hearing system is positioned in the ear canal.

The present disclosure provides contact hearing devices and systems comprising a piezoelectric actuators or transducers. The piezoelectric devices and systems can present several advantages such as high frequency response, high transient response, and high output.

Furthermore, the present disclosure teaches the placement of the contact hearing device on the tympanic membrane. Such placement can allow less invasive surgery compared to cochlear implant and can enable faster patient recovery time with less chance of infection.

Definitions

Contact Hearing Device

A contact hearing device can comprise an actuator connected to a customized ring-shaped support platform that floats on the ear canal around the eardrum or tympanic membrane, where the actuator directly vibrates the eardrum causing energy to be transmitted through the middle and inner ears to stimulate the brain and produce the perception of sound. In embodiments of the disclosure, the contact hearing device may comprise an actuator assembly and receiver assembly, wherein the receiver assembly can comprise a receiver coil. In a contact hearing device, a microactuator can be connected to the receiver coil and a sulcus platform which is a support structure supporting the coil and microactuator. The actuator may also be referred to as a Tympanic Contact Actuator (TCA), a Tympanic Lens, or a Tympanic Membrane Transducer (TMT).

Disclosed herein is a contact hearing device comprising an actuator assembly which comprises a piezoelectric actuator; and a receiver assembly, wherein the actuator assembly further comprises a sulcus platform connecting the piezoelectric actuator to a tympanic membrane to vibrate the tympanic membrane based on a transmission received by the receiver assembly.

Actuator Assembly

An actuator assembly can comprise an actuator connected to the receiver assembly. The actuator assembly can further comprise a supporting structure, and sulcus platform, which connects the actuator to the tympanic membrane. In some cases, the actuator assembly can also comprise one or more masses.

Actuator

The actuator can be a transducer. The transducer can be a piezoelectric transducer. The piezoelectric actuator or transducer can convert an electromagnetic or electrical signal or transmission to a mechanical or kinetic energy. The electrical transmission can be an electric current. The electric current can be an alternating current or a direct current. The electric transmission can be electromagnetic signal. The electromagnetic or electrical signal or transmission can be in the radiofrequency band.

The piezoelectric actuator or transducer can comprise crystals or ceramics. The ceramics can be lithium niobate, lithium tantalate, gallium arsenide, zinc oxide, potassium sodium tartrate, aluminium nitride, barium titanate, or lead zirconate-titanate (PZT). The crystal can be quartz. In some cases, the piezoelectric actuator or transducer can also be ferroelectric. The ferroelectric material can be bismuth ferrite.

The piezoelectric transducer can comprise one or more coiled wires. The coiled wires of the piezoelectric transducer can be arranged in any geometric form. In certain cases, the coiled wires can be arranged in flat circular shape. When electric transmission is received, the coils in the flat circular shape can twist with respect to each to form roughly a conical shape. The coiled wires may be arranged to form rectangular shape. The rectangular shape can twist to form a concave structure from a flat form when electric transmission is received.

The piezoelectric transducer can further comprise one or more electrodes that connect the coils of the piezoelectric materials. The piezoelectric transducer can also comprise sealant encasing the coiled wires.

Sulcus Platform

The actuator can be attached or affixed to the tympanic membrane by sulcus platform. The sulcus platform can comprise an umbo lens that connects the actuator to the tympanic membrane via a drive post. The umbo lens can be attached to the tympanic membrane by adhesive, tethers, stitch, lock-key, or screw. The attachment can be done with any combination of adhesive, tethers, stitch, lock-key, and screw. In some cases, the umbo lens can be coupled to the tympanic membrane and held in place with a spring or a layer of fluid. The fluid can be an oil. The oil can be skin oil, mineral, or silicone oil. In some cases, the fluid can be water.

The sulcus platform can also comprise a chassis which further affixes the actuator to the ear canal by perimeter platform. The perimeter platform can provide one, two, three, four, or five points of attachment on the chassis to the ear canal. The actuator can be connected to the chassis by one or more spring members. The spring members can be attach the actuator to the chassis by one, two, three, or four points of attachment. The spring members can comprise dampening material to dampen the lateral (perpendicular to the direction of the movement of the tympanic membrane) motion of the actuator. In certain cases, the perimeter platform can provide a complete/continuous attachment on the chassis to the ear canal. The perimeter platform can be further held in place with a mechanical fit or a layer of fluid. The fluid can be an oil. The oil can be skin oil, mineral, or silicone oil. In some cases, the fluid can be water.

Mass

A mass can be positioned on the actuator on the sulcus platform to increase the mechanical mass used to push against the tympanic membrane.

The actuator can comprise one or more masses. The actuator may comprise two, three, four, or five masses. The mass(es) can be floating mass(es) or balanced armature(s). The mass(es) can have mass of about 10 to about 150 mg. The mass(es) can have mass of 10 to 50 mg. The mass(es) can be less than 10 mg. In some cases, the mass(es) are preferably less than or equal to 50 mg. In some cases, the mass(es) cannot be greater than 50 mg. In other cases, the mass(es) can have mass of about 50 to about 100 mg.

Receiver Assembly

The receiver assembly receives the electromagnetic or electrical signal or transmission from a transmitter assembly and passes the signal or transmission to the actuator so the actuator can vibrate the tympanic membrane. The receiver assembly can comprise a receive coil. The receive coil can comprise ferromagnetic material. The ferromagnetic material can be ferrite. The ferrite can be bismuth ferrite. The ferromagnetic material can be chosen from iron, nickel, cobalt, gadolinium, dysprosium and alloys such as steel.

The receive coil can receive electromagnetic signals. The electromagnetic signal can be radiofrequency signal.

The receive coil can be directly connected to the piezoelectric actuator. The receive coil can be positioned separately from the actuator. The receive coil can be connected to the actuator through electric wires.

The receiver assembly may further comprise a rectifier and converter circuit that are connected to the receive coil through a capacitor.

Contact Hearing System

A contact hearing system can be a system including a contact hearing device disclosed herein and an ear tip. In embodiments of the disclosure, contact hearing systems may also include an audio processor and an external communication device. In embodiments of the disclosure, power and/or data may be transmitted between an ear tip and a contact hearing device using inductive coupling.

External Communication Device

The external communication device can comprise one or more microphone. The microphone can receive the audio signal from the external environment and shuttle the signal to audio processor Audio Processor Audio processor can be a system for receiving and processing audio signals. In embodiments of the disclosure, audio processors may include one or more microphones adapted to receive audio which reaches the user's ear. In embodiments of the disclosure, the audio processor may include one or more components for processing the received sound. In embodiments of the disclosure, the audio processor may include digital signal processing electronics and software which are adapted to process the received sound. In embodiments of the disclosure, processing of the received sound may include amplification of the received sound. In embodiments of the disclosure, the output of the audio processor may be a signal suitable for driving an inductive coil located in an ear tip. Audio processors may also be referred to as behind the ear units or BTEs.

Ear Tip

An ear tip can be a structure designed to be placed into and reside in the ear canal of a user, where the structure is adapted to receive signals from an audio processor and transmit signals to the user's tympanic membrane or to a device positioned on or near the user's tympanic membrane (such as, for example, a contact hearing device). In embodiments of the disclosure, the signal may be transmitted using inductive coupling, using a coil connected to the Ear Tip.

The ear tip can comprise a transmit coil that produces electromagnetic transmission from the audio signal received from the audio processor. The electromagnetic signal generated by transmit coil may be used to generate an electrical current in receive coil by causing an electrical voltage across receive coil. The electromagnetic signal generated can be radiofrequency signal.

The ear tip can further comprise a passage extending from a lateral to a medial end of the ear tip, and at least one acoustic vent in the passage, wherein a medical end of the at least one acoustic vent is positioned at or near the medial end of the passage.

Description

FIG. 1 is a cutaway view of an ear canal showing a contact hearing system 3110 for use in systems and methods according to the present disclosure, wherein at least a portion of the contact hearing system 3110 is positioned in the ear canal. In embodiments of the disclosure, contact hearing system 3110 may be referred to as a smartlens system or smartlens. In embodiments of the disclosure, contact hearing system 3110 may comprise a contact hearing system using electromagnetic waves to transmit information and/or power from ear tip 3120 to the contact hearing device 3112. In embodiments of the disclosure, contact hearing system 3110 may comprise a contact hearing system using inductive coupling to transmit information and/or power from ear tip 3120 to contact hearing device 3112. In FIG. 1, contact hearing system 3110 includes Audio processor 3132, which audio processor may include at least one external microphone 3310. Audio processor 3132 may be connected to an ear tip 3120 by cable 3260, which is adapted to transmit signals from audio processor 3132 to ear tip 3120. Ear tip 3120 may further include canal microphone 3312 and at least one acoustic vent 3338. Ear tip 3120 may be an ear tip which radiates electromagnetic waves 3142 in response to signals from audio processor 3132. Electromagnetic signals radiated by ear tip 3120 may be received by contact hearing device 3112, which may comprise receive coil 3130, microactuator 3140, and umbo platform 3220. The receive coil transfers the electric transmission to microactuator 3140 such as piezoelectric actuator, which in turns converts the electric transmission to mechanical movements and acts upon tympanic membrane (TM) via umbo platform 3220.

Figure 2:
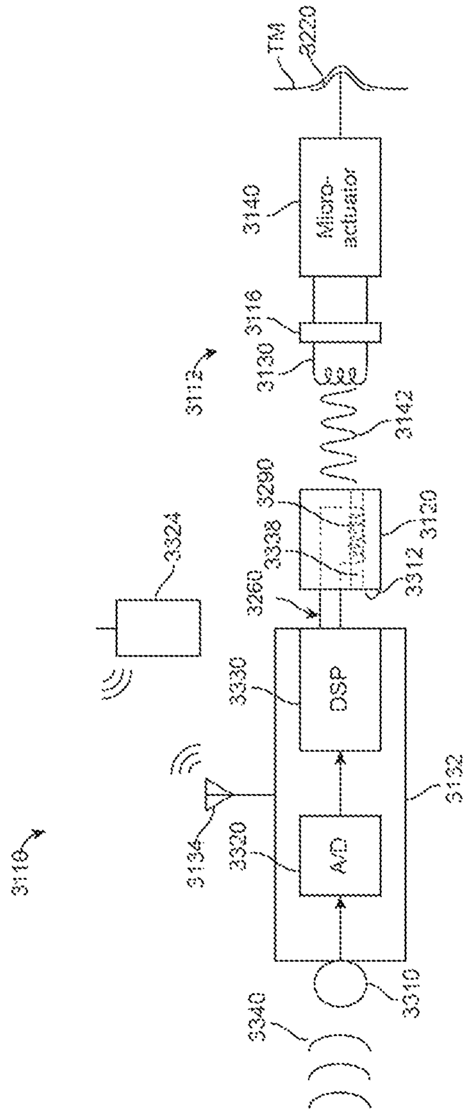
FIG. 2 is a block diagram of the contact hearing system in FIG. 1.

FIG. 2 is a block diagram of a contact hearing system 3110 for use in methods and apparatus according to the present disclosure. In embodiments of the disclosure, at least a portion of contact hearing system 3110 is positioned in the ear canal of a user. In FIG. 2, ambient sound 3340 may be received by external microphone 3310 of audio processor 3132, which then processes the received sound by passing it through processing circuitry, which may include analog to digital converter 3320 and digital signal processor 3330. The output of audio processor 132 may be transmitted to an ear tip 3120 by cable 3260. Signals transmitted to ear tip 3120 may then be transmitted to contact hearing device 3112 by, for example, causing transmit coil 3290 to radiate electromagnetic waves 3142. In embodiments of the disclosure, contact hearing device 3112 may include receive coil 3130, microactuator 3140 such as piezoelectric actuator, and umbo lens 3220. Information contained in electromagnetic waves 3142 received by receive coil 3130 may be transmitted through demodulator 3116 to microactuator 3140, moving umbo lens 3220. In embodiments of the disclosure, the signal transmitted to ear tip 3120 may be a signal representative of the received audio signal which may then be transmitted to contact hearing device 3112. In embodiments of the disclosure, transmit coil 3290 may be wound around an acoustic vent 3338 in ear tip 3120. In embodiments of the disclosure, acoustic vent 3338 may be formed as a passage through a ferrite material. In embodiments of the disclosure, transmit coil 3290 may be wound around ferrite material positioned in ear tip 3120. In embodiments of the disclosure, contact hearing system 3110 may include one or more external communication and control devices 3324, such as, for example, a cell phone. In embodiments of the disclosure, audio processor 3132 may communicate with external communication and control devices 3324 by, for example, using audio processor antenna 3134.

Figure 3:
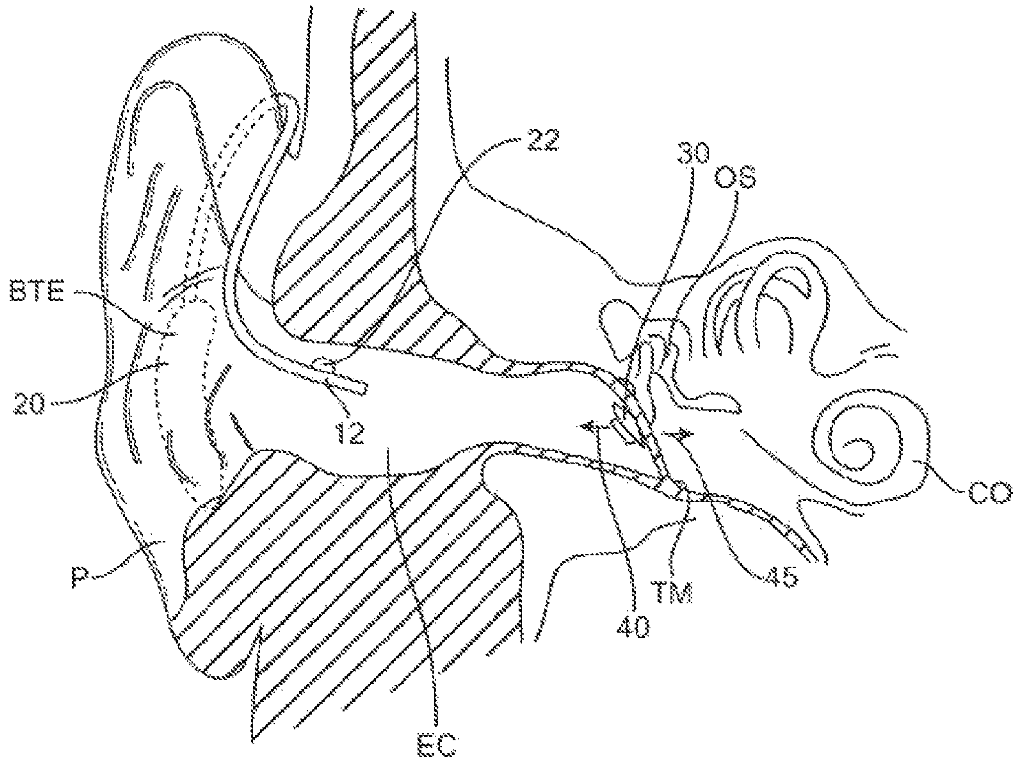
FIG. 3 is a cutaway view of an ear canal showing a contact hearing system using a light transmission according to the present disclosure, wherein at least a portion of the contact hearing system is positioned in the ear canal

FIG. 3 shows another embodiment of a hearing aid system with wireless signal transduction, using light as the signal in this case. The hearing system 10 includes a transmitter assembly or input transducer assembly 20 and an output transducer assembly 30. Hearing system 10 may comprise a behind the ear unit BTE. Behind the ear unit BTE may comprise many components of system 10 such as a speech processor, battery, wireless transmission circuitry and input transducer assembly 10. Behind the ear unit BTE may comprise many components as described in U.S. Pat. Pub. Nos. 2007/0100197, entitled "Output transducers for hearing systems"; and 2006/0251278, entitled "Hearing system having improved high frequency response". The input transducer assembly 20 is located at least partially behind the pinna P, although an input transducer assembly may be located at many sites such as in pinna P or entirely within ear canal EC. The input transducer assembly 20 can receive a sound input, for example an audio sound. With hearing aids for hearing impaired individuals, the input can be ambient sound. The input transducer assembly comprises an input transducer, for example a microphone 22. Microphone 22 can be positioned in many locations such as behind the ear, if appropriate. Microphone 22 is shown positioned within ear canal near the opening to detect spatial localization cues from the ambient sound. The input transducer assembly can include a suitable amplifier or other electronic interface. In some embodiments, the input may comprise an electronic sound signal from a sound producing or receiving device, such as a telephone, a cellular telephone, a Bluetooth connection, a radio, a digital audio unit, and the like.

Transmitter assembly or an input transducer assembly 20 includes a signal output source 12 which is a light source such as an LED or a laser diode. But the signal output source can also be an electromagnet, an RF source, or the like. Alternatively, an amplifier of the input assembly may be coupled to the output transducer assembly with a conductor such as a flexible wire, conductive trace on a flex printed circuitry board, or the like. The signal output source can produce an output signal based on the sound input. Output transducer assembly 30 can receive the output source signal and can produce mechanical vibrations in response. Output transducer assembly 30 may comprise a transducer responsive to the electromagnetic signal, for example at least one photodetector, a coil responsive to the electromagnet, a magenetostrictve element, a photostrictive element, a piezoelectric element, or the like. When properly coupled to the subject's hearing transduction pathway, the mechanical vibrations caused by output transducer assembly 30 can induce neural impulses in the subject which can be interpreted by the subject as the original sound input.

The output transducer assembly 30 comprising a receiver assembly and an actuator assembly can be configured to couple to a point along the hearing transduction pathway of the subject in order to induce neural impulses which can be interpreted as sound by the subject. As shown in FIG. 3, the output transducer assembly 30 may be coupled to the tympanic membrane (TM) or eardrum. Output transducer assembly 30 may be supported on the eardrum TM by a support, housing, mold, or the like shaped to conform with the shape of the eardrum TM. A fluid may be disposed between the eardrum TM and the output transducer assembly 30 such as an oil, a mineral oil, a silicone oil, a hydrophobic liquid, or the like. Output transducer assembly 30 can cause the eardrum TM to move in a first direction 40 and in a second direction 45 opposite the first direction 40, such that output transducer assembly 30 may cause the eardrum TM to vibrate. Specific points of attachment are described in prior U.S. Pat. Nos. 5,259,032; and 6,084,975, the full disclosures of which are incorporated herein by reference and may be suitable for combination with some embodiments of the present disclosure.

Figure 3A:
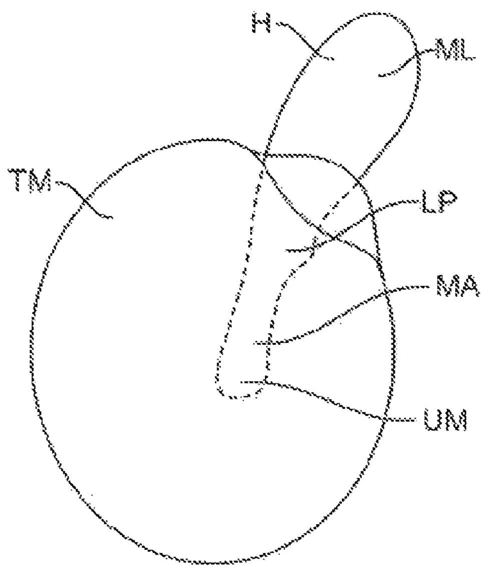
FIG. 3A shows the lateral side of the eardrum and FIG. 3B shows the medial side of the eardrum, suitable for incorporation of the hearing aid system of FIG. 3.
Figure 3B:
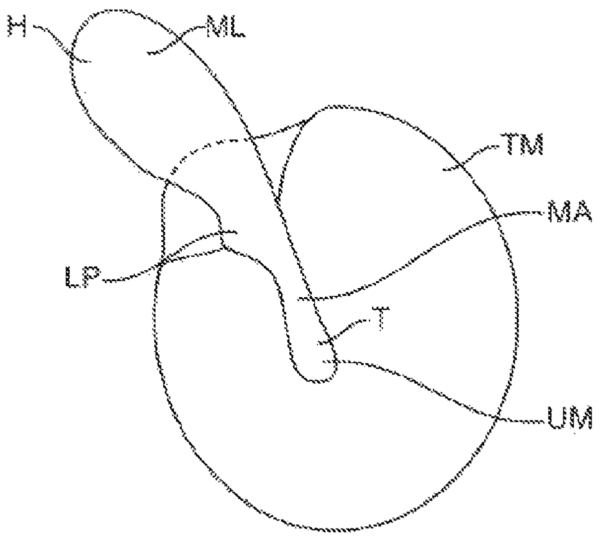

FIG. 3A shows structures of the ear suitable for placement of the output transducer assembly from the lateral side of the eardrum TM, and FIG. 3B shows structures of the ear from the medial side of the eardrum TM. The eardrum TM is connected to a malleus ML. Malleus ML comprises a head H, a manubrium MA, a lateral process LP, and a tip T. Manubrium MA is disposed between head H and tip T and coupled to eardrum TM, such that the malleus ML vibrates with vibration of eardrum TM.

Figure 3C:
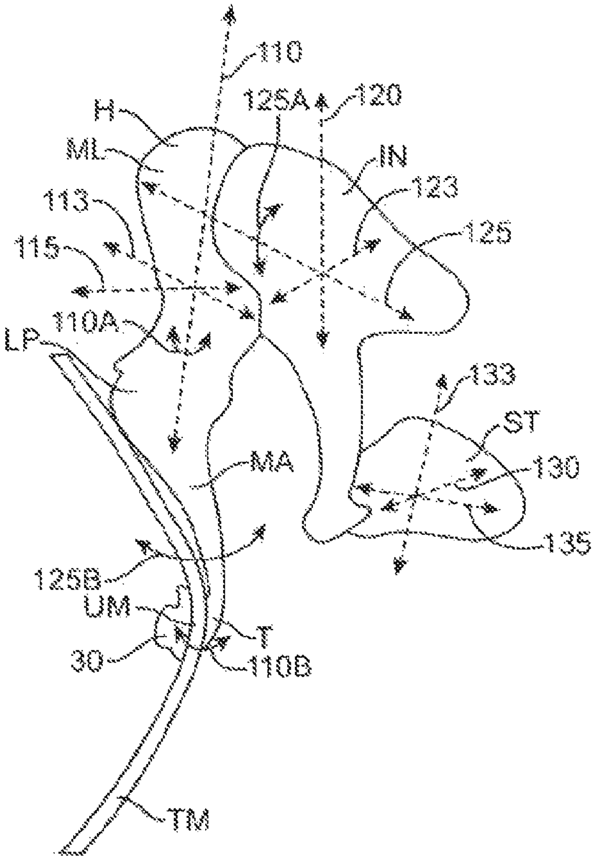
FIGS. 3C and 3D show side section views of the eardrum coupled to the ossicles including the malleus, incus, and stapes, and locations of attachment for the hearing aid systems shown in FIGS. 1, 2, and 3.

FIG. 3C shows output transducer assembly 30 coupled to the eardrum TM on the umbo UM to transmit vibration so that the user can perceive sound. Eardrum TM is coupled to the ossicles including the malleus ML, incus IN, and stapes ST. The manubrium MA of the malleus ML can be firmly attached to eardrum TM. The most depressed or concaved point of the eardrum TM comprises the umbo UM. Malleus ML comprises a first axis 110, a second axis 113 and a third axis 115. Incus IN comprises a first axis 120, a second axis 123 and a third axis 125. Stapes ST comprises a first axis 130, a second axis 133 and a third axis 135.

The axes of the malleus ML, incus IN and stapes ST can be defined based on moments of inertia. The first axis may comprise a minimum moment of inertia for each bone. The second axis comprises a maximum moment of inertia for each bone. The first axis can be orthogonal to the second axis. The third axis extends between the first and second axes, for example such that the first, second and third axes comprise a right handed triple. For example first axis 110 of malleus ML may comprise the minimum moment of inertia of the malleus. Second axis 113 of malleus ML may comprise the maximum moment of inertia of malleus ML. Third axis 115 of malleus ML can extend perpendicular to the first and second axis, for example as the third component of a right handed triple defined by first axis 110 and second axis 113. Further first axis 120 of incus IN may comprise the minimum moment of inertia of the incus. Second axis 123 of incus IN may comprise the maximum moment of inertia of incus IN. Third axis 125 of incus IN can extend perpendicular to the first and second axis, for example as the third component of a right handed triple defined by first axis 120 and second axis 123. First axis 130 of stapes ST may comprise the minimum moment of inertia of the stapes. Second axis 133 of stapes ST may comprise the maximum moment of inertia of stapes ST. Third axis 135 of stapes ST can extend perpendicular to the first and second axis, for example as the third component of a right handed triple defined by first axis 130 and second axis 133.

Vibration of the output transducer system induces vibration of eardrum TM and malleus ML that is transmitted to stapes ST via Incus IN, such that the user perceives sound. Low frequency vibration of eardrum TM at umbo UM can cause hinged rotational movement 125A of malleus ML and incus IN about axis 125. Translation at umbo UM and causes a hinged rotational movement 125B of the tip T of malleus ML and hinged rotational movement 125A of malleus ML and incus IN about axis 125, which causes the stapes to translate along axis 135 and transmits vibration to the cochlea. Vibration of eardrum TM, for example at higher frequencies, may also cause malleus ML to twist about elongate first malleus axis 110 in a twisting movement 110A. Such twisting may comprise twisting movement 110B on the tip T of the malleus ML. The twisting of malleus ML about first malleus axis 110 may cause the incus IN to twist about first incus axis 120. Such rotation of the incus can cause the stapes to transmit the vibration to the cochlea where the vibration is perceived as sound by the user.

With the output transducer assembly positioned over the eardrum TM on the umbo UM, the combined mass of the output transducer assembly can be from about 10 to about 100 mg, for example from about 50 to about 85 mg. In some embodiments, the combined mass comprises no more than about 50 mg. The combined mass may comprise the mass of the support, the transducer, a mass opposite the support and/or the circuitry to receive a wireless signal and drive the transducer. The support can be configured to support the transducer, a mass opposite the support and/or the circuitry to receive a wireless signal and drive the transducer with the eardrum when the support is placed against the eardrum.

Figure 3D:
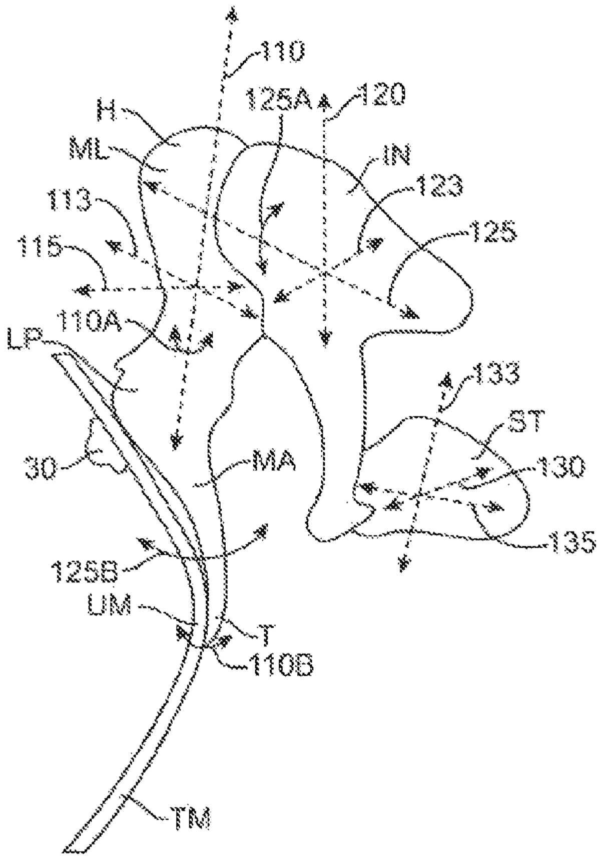

FIG. 3D shows output transducer assembly 30 coupled on the TM away from umbo UM, for example over the lateral process LP of the malleus ML. Output transducer assembly 30 may be placed on other parts of the eardrum as well. Depending on the placement of output transducer assembly 30 on the eardrum TM, the mechanical impedance of the output transducer assembly 30 and the eardrum TM may vary. Placement of output transducer assembly 30 away from the umbo UM allows for increased mass of the lateral process while minimizing occlusion. For example, with placement over the lateral process, the mass of the output transducer assembly may comprise approximately twice the mass as when placed over the umbo without causing occlusion. For example, an output transducer assembly comprising a mass of 60 mg positioned over the lateral process will provide a mechanical impedance and occlusion similar to a 30 mg mass positioned over the umbo. Further the vibration of the transducer at the lateral process is amplified from the lateral process to the umbo, for example by a factor of two due to leverage of the malleus with hinged rotation from the head of the malleus to the tip near the umbo.

The mass of transducer assembly 30 for placement away from the umbo can be similar to ranges described above for the configuration placed over the umbo, and may be scaled accordingly. For example, with the output transducer assembly positioned over the eardrum TM away from the umbo UM, for example over the lateral process, the combined mass of the output transducer assembly can be from about 20 to about 120 mg, for example from about 40 to about 80 mg. In many embodiments, the combined mass of output transducer assembly 30 over the lateral process can be from about 20 mg to about 60 mg to provide occlusion and transmission losses similar to a mass of about 10 mg to about 30 mg over the umbo.

Output transducer assembly 30 may have a number of exemplary specifications for maximum output. Output transducer assembly 30 may produce a sound pressure level of up to 200 dB. For example, a sound pressure level of up to at least about 100 dB can be sufficient to provide quality hearing for many hearing impaired users. In another example, the sound pressure level can be 110 dB. The "center" of the eardrum, or the umbo, may move at 0.1 um/Pa at 1 kHz and 0.01 um/Pa at 10 kHz. The velocity can be 630 um/s/Pa from about 1 kHz and 10 kHz. The area of the eardrum may be about 100 mm2. The ear drum may have an impedance of about 0.2 Ns/m for frequencies greater than 1 kHz, which may be damping in nature, and an impedance of about 1000 N/m for frequencies less than 1 kHz in nature, which may be stiffening in nature. Thus, the power input into the ear at up to 106 dB SPL may be up to about 1 uW.

Output transducer assembly 30 may comprise a number of exemplary specifications for frequency response. Output transducer assembly 30 can have a frequency response of 100 Hz to 10 kHz. For an open canal system, it may be acceptable if low frequency response rolls off below 1 kHz since most hearing impaired subjects have relatively good low frequency hearing and the natural sound pathway can provide this portion of the sound spectrum. A relatively flat response may be good and it may be ideal if a resonance is generated at 2-3 kHz without affecting response at other frequencies. Variability between subjects may be +/−3 dB. This includes variability due to variable insertions and movement of the transducer with jaw movements. Variability across subjects may be +/−10 dB. In certain cases, the variability can be +/−6 dB. Even in low responding subjects may need to have adequate output above their thresholds at all frequencies. Subject based calibrations may likely be problematic for clinicians and best avoided if possible.

Output transducer assembly 30 may further comprise a number of other exemplary specifications. For example, output transducer assembly 30 may have less than 1 percent harmonic distortion of up to 100 db SPL and less than 10 percent distortion of up to 106 db SPL. Output transducer may have less than 30 dB SPL noise equivalent pressure at the input. Output transducer may provide 15 dB of gain up to 1 kHz and 30 dB of gain above 1 kHz.

I. Power Sources

Both power and signal may be transmitted to the output transducer assembly 30. 30 uW of power into the ear may need to be generated to meet maximum output specifications. Methods of transmitting power may include light (photovoltaic), ultrasound, radio frequency, magnetic resonant circuits.

In exemplary embodiments, a piezoelectric transducer driven by a photovoltaic (PV) cell or a number of photovoltaic (PV) in placed in series. The maximum voltage and current provided by the cells can be limited by the area and the amount of incident light upon them. 70 mW may be a good upper limit for the amount of electrical power available for the output transducer at its maximum output. This power can be limited by the amount of heat that can be dissipated as well as battery life considerations.

LEDs may be about 5% efficient in their conversion of electrical power into light power. The maximum light power coming out of the LEDs may be near 3.5 mW. The light coming out of the LED can cover a broader area than the area of the photovoltaic cell. The broader area may be set based on the movement of the ear canal and the ability to point the light directly at the photovoltaic cells. For example, a spot with a diameter that is twice a wide as a square 3.16 mm×3.16 mm photocell may be used. This spot size would have an area of 31.4 mm2 (leading to an optical efficiency of 32%). The photodetector area may comprise two parts—one part to move the transducer in a first direction and another part to move the transducer in a second direction, for example as described in U.S. Pat. Nos. 8,396,239, 8,824,715, and 9,049,528, the full disclosure of which is incorporated herein by reference. This two part photodetector area may further reduce the efficiency by a factor of two to 16%. This efficiency may be improved depending on the result of studies showing how much the motion of the ear canal moves the light as well as the ability to initially point the light down the ear canal. With a 16% efficiency, 560 uW of light power impinges on the surface of each of the two photovoltaics. The device may comprise at least one photo detector, for example as described in U.S. Pat. Nos. 8,715,152, 9,591,409, 9,961,454, and 10,516,949, the full disclosure of which is incorporated by reference.

Figure 4:
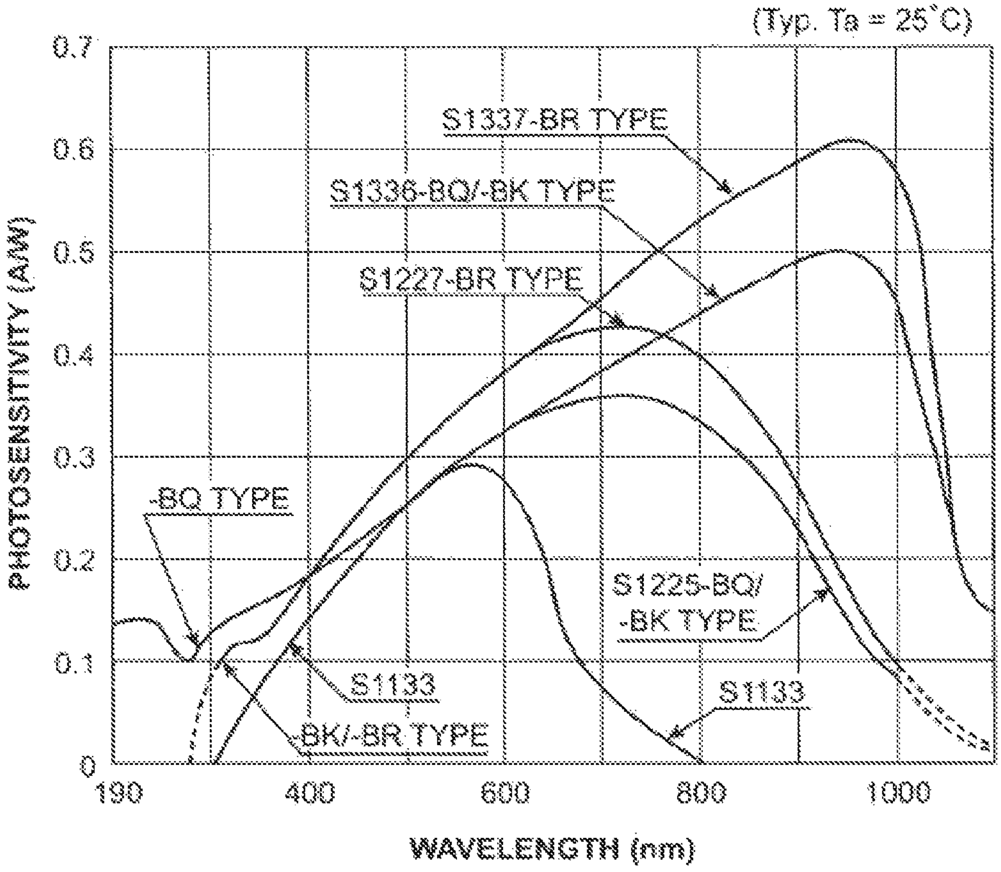
FIG. 4 is a graph showing the sensitivity of silicon photovoltaics to different wavelengths of light, suitable for incorporation with the systems of FIGS. 1, 2, and 3A to 3D.

FIG. 4 shows the sensitivity of silicon photovoltaics to different wavelengths of light. The sensitivity of a photodetector is how much current is produced per unit power of incident light (A/W). In FIG. 4, maximum light intensity of 560 uW may be 336 uA at infrared wavelengths (S=0.6 A/W @ 900-1000 nm) or 224 uA in the "red" range (S=0.4 A/W @ 650 nm). Red LEDs may be more efficient than infrared LEDs, so the increased efficiency of the LEDs may overcome the decreased sensitivity of the photodetector at those wavelengths. The maximum available currents may be in the 220-340 uA range. The voltage characteristic of the photodetector is set by the "diode" action of the junction. Starting a 0.3 V, an increasingly non-linear voltage response may be encountered. Hence the maximum effective voltage of the photodetector for our application may be 0.4V. Multiplying this 0.4V by the 224 uA one obtains 90 uW. Taking this 90 uW and dividing by the 560 uW of light power in gives an efficiency of 16%. One may also use the photocells in series to increase the amount of voltage available. However, the area of each photocell may need to be reduced to keep the total area the same. This may have the effect that voltage may be traded for current and vice versa, however the total amount of power remains fixed.

The LED/photovoltaic system may supply approximately 224 uA of current and 0.4V. Voltage can be increased by putting cells in series but the voltage increase may be at the proportional cost of current. 90 uW of power may be available to the transducer for producing motion of the eardrum. However, the amount of power utilized can depend on the load characteristics. The optimal load may be an 1800 ohm resistor (0.4V/224 uA). In either the piezoelectric case (capacitive load) or the voice coil case (inductive load), the load impedance may change as a function of frequency. A frequency at which this optimal impedance is matched may be chosen. For the capacitive load case, the system may be current limited above this frequency and voltage limited below this frequency. For the inductive load case, the situation may reverse. In the current limited cases, one may not be able to reach the desired maximum output levels. In the voltage limited regions, driving the system too hard may highly distort the output. If 2 kHz is chosen as the optimal frequency, this impedance may correspond to a capacitance of 44 nF or an inductance of 143 mH. Even with an optimal load attached, the overall efficiency of the optical power transfer is 0.04%. Yet even with this efficiency, the amount of power produced by the PV is 90× greater than what we expect to need to input into the ear. Table 1 below summarizes the above-mentioned exemplary power specifications.

TABLE 1

EXEMPLARY POWER SPECIFICATIONS FOR OUTPUT TRANSDUCER

| Parameter | Formula | Value | Comment |
|---|---|---|---|
| Input Power Maximum | | 70 mW | May be chosen based on magnetic system experience with heat and battery life. |
| LED efficiency | | 5% | May be based on literature and experimental data |
| Area of illumination | $pR^2$ | R = 3.16 mm<br>$A = 31.4\ mm^2$ | May be a reasonable guess based on what will be required for robust illumination of photodetectors |
| Area of photodetectors | $\frac{b^2}{2}$ | b = 3.16 mm<br>$A = 5\ mm^2$ | May be based on what area of the eardrum is easily viewable from a middle ear canal location. Remember that only half of the area is available for each photodetectors (hence the divide by 2). |
| Optical efficiency | $\frac{A_{Num}}{A_{PV}} \times 100\%$ | 16% | |
| Maximum optical power incident on photodetectors | $E_{optical}E_{LED}P_{max}$ | 560 mW | |
| Sensitivity of PV @ IR (~950 nm) | | 0.6 A/W | |
| Sensitivity of PV @ Red (~650 nm) | | 0.4 A/W | |
| Maximum PV current @ IR | $S_{PV}P_{\lambda PV}$ | 336 mA | |
| Maximum PV current @ Red | $S_{PV}P_{\lambda PV}$ | 224 mA | |
| Maximum PV voltage | | 0.4 V | Maximum voltage for ~10% distortion. (0.3 V for ~1%) |
| Maximum PV power @ Red | $V_{PVmax}I_{PVmax}$ | 90 mW | |
| Optimal Load for PV | $\frac{V_{PVmax}}{I_{PVmax}}$ | 1800 ohms | |
| Overall efficiency | $\frac{P_{PV}}{P_{max}\square} \times 100\%$ | 0.13% | |

Other power transmission potions may include ultrasonic power transmission, magnetic resonant circuits, and radiofrequency power transmission. For magnetic resonant circuits, the basic concept is to produce two circuits that resonant with each other. The "far" coil should only draw enough power from the magnetic fields to perform its task. Power transfer may be in the 30-40% efficient range.

II. Output Transducer Specifications

In exemplary embodiments, an output transducer may comprise two major characteristics; the physics used to generate motion and the type of reference method used. The choices for the physics used to generate motion can include electromagnetic (voice coils, speakers, and the like), piezoelectric, electrostatic, pryomechanical, photostrictive, magnetostrictive, and the like. Regardless of what physics are used to generate motion, the energy of the motion can be turned into useful motion of the eardrum. In order to produce motion, forces or moments that act against the impedance of the eardrum may be generated. To generate forces or moments, the reaction force or moment is resisted. To resist such forces or movements, a fixed anchor point may be introduced, a floating inertia may be used, for example, utilizing translational and rotational inertia, or deforming an object so that the boundaries produce a net force that moves the object, i.e., using a deformation transducer.

Figure 5:
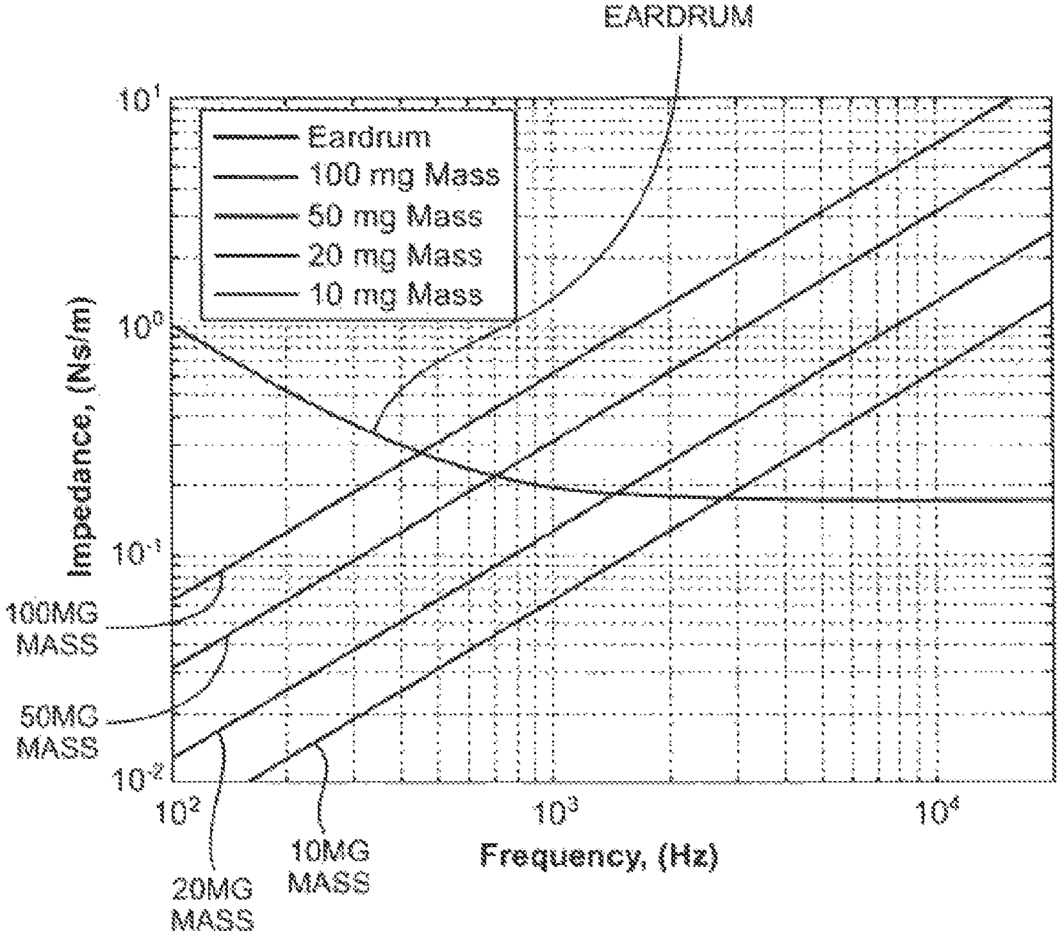
FIG. 5 is graph showing the mechanical impedance of the eardrum in relation to that of various masses, in accordance with the systems of FIGS. 1, 2, and 3A to 5.

FIG. 5 is a graph showing the mechanical impedance of the eardrum in relation to that of various masses of 100 mg, 50 mg, 20 mg, and 10 mg. The impedance of the eardrum matches the masses of 100 mg, 50 mg, 20 mg, and 10 mg at frequencies of about 450 Hz, 700 Hz, 1.5 kHz, 3 kHz, respectively. The impedance of the mass can be dependent on the location of the eardrum. By placing the mass away from the umbo, the impedance can be decreased, for example halved, when the mass is positioned on the short or lateral process of the malleus, for example. For example, a mass of 40 mg can have an impedance at 1.5 kHz that is similar to a 20 mg mass so as to match the impedance of the eardrum TM.

Exemplary physical specifications may be placed on the transducer based on the size of the ear canal, the ability of an output transducer to remain in position and the perception of occlusion resulting from having a mass present on the eardrum. Table 2 below show these specifications.

TABLE 2

EXEMPLARY PHYSICAL SPECIFICATIONS FOR OUTPUT TRANSDUCER

| Parameter | Value | Comment |
|---|---|---|
| Maximum dimension in plane with annular ligament of TM | <5 mm | If the dimension gets larger, then manipulating the transducer into place may become difficult for physicians and may not fit down some ear canals. |
| Maximum dimension perpendicular to TM | <2 mm | If the dimension gets larger, then the anterior wall that "hangs" over the TM may begin to get in the way. |
| Maximum mass | 60 mg | Amass of 46 mg may result in significant "occlusion". Other embodiments may be able to hold more weight. There may be evidence that at even this weight gravity may shift the position of the transducer depending on the orientation of the head and the support to TM coupling. |

Output transducer assembly 30 may use a piezoelectric element to generate motion. Material properties of exemplary piezoelectric elements are shown in the table 3 below.

TABLE 3

MATERIAL PROPERTIES OF EXEMPLARY PIEZOELECTRIC ELEMENTS

| | APC disk bender | APC Tapecast | APC stacked | STEMinc | TRS single crystal | APC single crystal |
|---|---|---|---|---|---|---|
| Material | APC 855 | APC 850 | APC PST 150 | 7x7x.2 SMQA | TRS PMN-PT | APC PMN-PT |
| Density (kg/m3) | 7600 | 7700 | 8000 | 7900 | 7900 | 8200 |
| Curie Temperature | 200 | 360 | 155 | 250 | 166 | |
| k33 | 0.76 | 0.72 | | | 0.91 | 0.92 |
| d31 (x10-12 m/V) | 276 | 175 | 290 | 140 | 1000 | 930 |
| d33 (x10-12 m/V) | 600 | 400 | 640 | 310 | 1900 | 2000 |
| E33 (N/m2) | 5.10E+10 | 5.40E+10 | 5.56E+10 | 7.30E+10 | 1.16E+10 | |
| relative dielectric constant (Er33) | 3400 | 1900 | 5400 | 1400 | 7700 | 4600 |
| E11 (N/m2) | 5.90E+10 | 6.30E+10 | | 8.40E+10 | | 2.48E+10 |
| kp | 0.68 | 0.63 | | 0.58 | | 0.92 |
| kt | | | | 0.45 | 0.55 | 0.6 |
| k31 | 0.4 | 0.36 | | 0.34 | 0.51 | 0.72 |

III. Exemplary Output Transducers

Output transducer assembly 30 may comprise a piezoelectric based output transducer, for example, a transducer comprising a piezoelectric unimorph, piezoelectric bimorph, or a piezoelectric multimorph. Exemplary output transducers may comprise a simply supported bimorph bender 400 as shown in FIG. 6, a cantilevered bimorph bender 500 as shown in FIG. 7, a stacked piezo with mechanical multiplier 600 as shown in FIG. 6, a disk or narrow ring piezo with a mechanical multiplier 700 as shown in FIG. 7 or a ring mass with bimorph piezoelectric transducer 800 as shown in FIG. 8.

Figure 6:
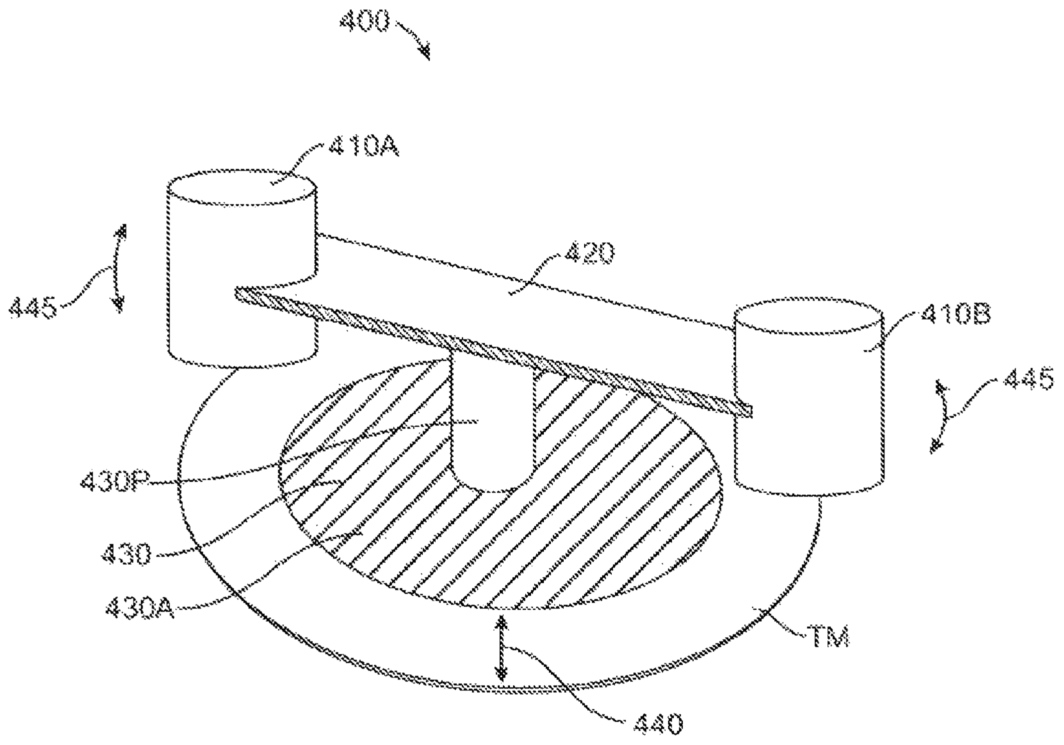
FIG. 6 shows a perspective view of a simply supported bimorph bender, in accordance with the systems of FIGS. 1, 2, and 3A to 5.

FIG. 6 shows a simply supported bimorph bender 400 suitable for incorporation with transducer assembly 30 as described above. Simply supported bimorph bender 400 comprises a first mass 410*a*, a second mass 410*b*, a bimorph piezoelectric cantilever 420, and a support 430. Cantilever 420 extends from a first end supporting first mass 410*a* to a second end supporting second mass 410*b*. Cantilever 420 is coupled with the support 430 comprising a protrusion 430*p* extending from the support to the transducer to couple the support to the transducer between the first and second ends. Support 430 may be configured to support the first and second masses 410*a*, 410*b* and the bimorph cantilever 420 on the eardrum TM. For example, support 430 may comprise a mold shaped to conform with the eardrum TM, for example support 430 can be shaped with known molding techniques. The portion 430*a* of support 430 which is in contact with the fluid that couples to the eardrum TM can be flexible, for example, by comprising a flexible material such as silicone, flexible plastic, a gel, or the like. Other portions of support 430, for example protrusion 430P may be rigid, for example, by comprising a metal, titanium, a rigid plastic, or the like. Simply supported bimorph bender 400 may comprise circuitry which receives an external, wireless signal and causes cantilever 420 to change shape. Cantilever 420 may push against masses 410*a*, 410*b* causing a force on the masses 410*a*, 410*b* in a direction 445 and also cause a force on support 430 in a direction 440 opposite direction 445. The force on support 430 drives the eardrum TM to produce sensations of sound.

Figure 7A:
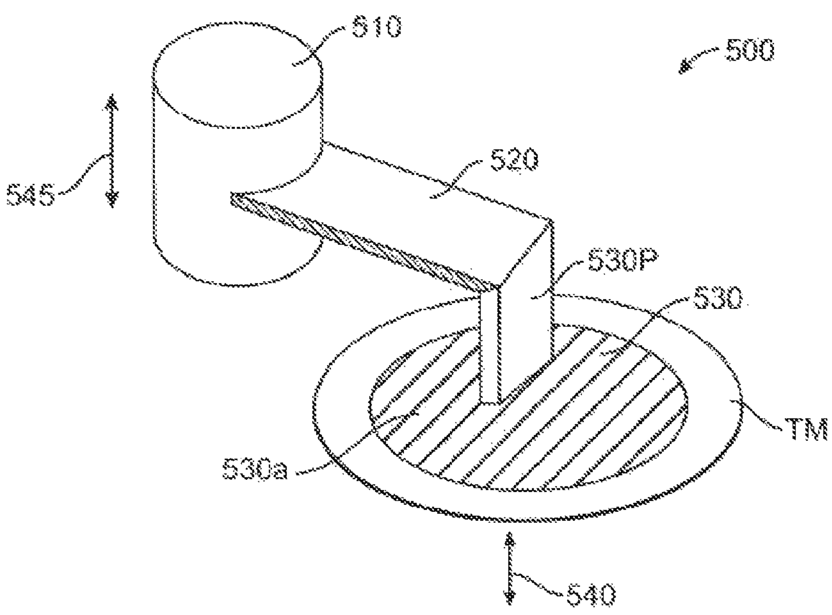
FIG. 7A shows a perspective view of a cantilevered bimorph bender, in accordance with the systems of FIGS. 1, 2, and 3A to 5.
Figure 8:
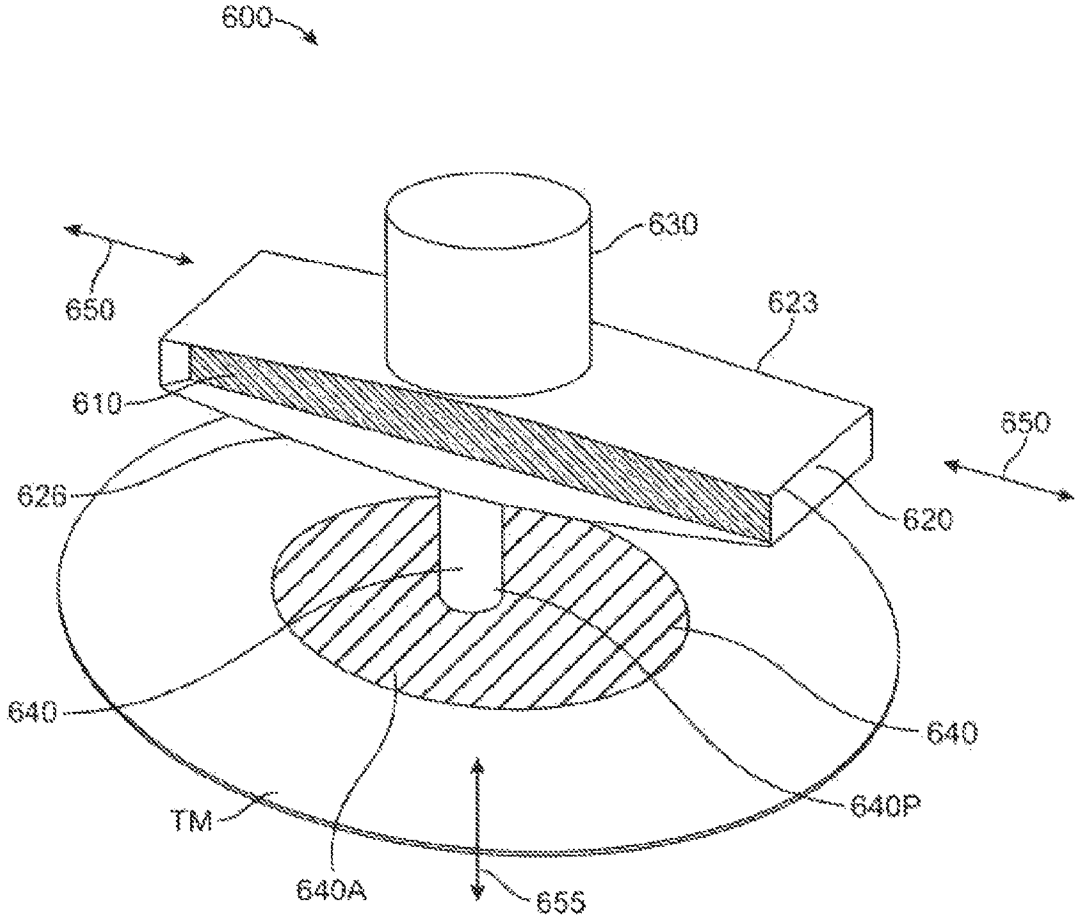
FIG. 8 shows a perspective view of a stacked piezo with mechanical multiplier, in accordance with the systems of FIGS. 1, 2, and 3A to 5.

FIG. 7A shows a cantilevered bimorph bender 500 suitable for incorporation with transducer assembly 30 as described above. Cantilevered bimorph bender 500 includes a mass 510, a bimorph cantilever 520 extending from mass 510, and a support 530 coupled with cantilever 520. Support 530 may be configured to support mass 510 and bimorph cantilever 520 on the eardrum TM, which may not be drawn to scale in FIG. 7A. For example, support 530 may comprise a mold shaped to conform with the eardrum TM. Cantilever 520 is coupled with the support 530 comprising a protrusion 530*p* extending from the support to the transducer. The portion 530*a* of support 530 which is in contact with the eardrum TM can be flexible, for example, by comprising a flexible material such as silicone, flexible plastic, a gel, or the like. Other portions of support 530 may be rigid, for example, by comprising a metal, titanium, a rigid plastic, or the like. Cantilevered bimorph bender 500 may comprise circuitry configured to receive an external, wireless signal and cause cantilever 520 to bend and thus push against mass 510. The pushing action causes a force in a direction 545 on the mass 510 and also a force on the support 530 in a direction 540 opposite the direction 545. The force on the support 530 drives the eardrum TM to produce sensations of sound.

Cantilevered bimorph bender 500 includes mass 510 and cantilever 520. Some embodiments may include more than one mass, cantilever, and/or support.

Figure 7B:
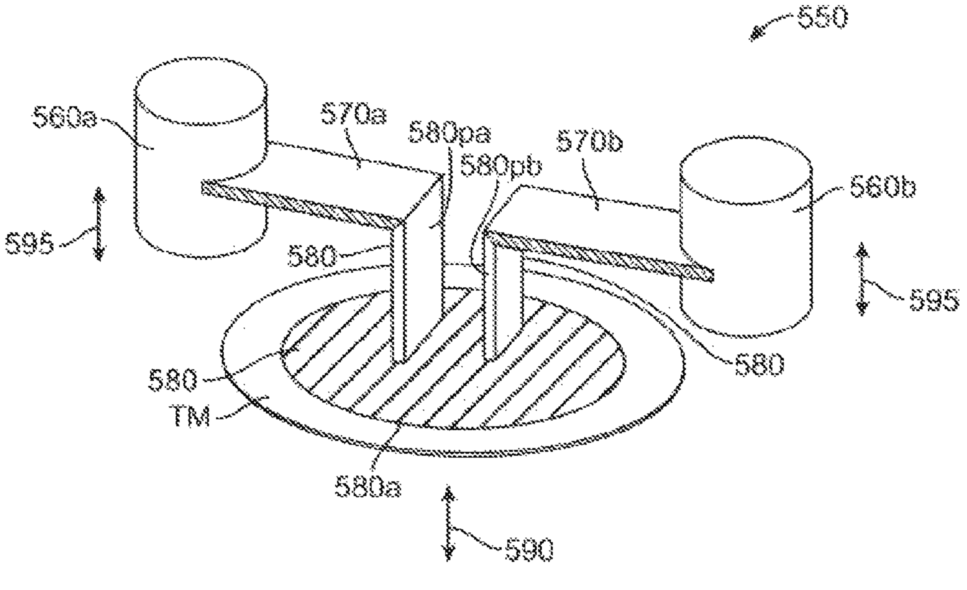
FIG. 7B shows a perspective view of cantilevered bimorph bender which includes a first mass and a second mass, in accordance with the systems of FIGS. 1, 2, and 3A to 5.

FIG. 7B shows cantilevered bimorph bender 550 suitable for incorporation with transducer assembly 30 as described above. Bimorph bender 550 includes a first mass 560*a* and a second mass 560*b*. A first cantilevered bimorph 570*a* is coupled to first mass 560*a*. A second cantilevered bimorph 570*b* is coupled to second mass 560*b*. A support 580 is coupled to the first cantilevered bimorph 570*a* and second cantilevered bimorphs 570*b*. First cantilevered bimorph 570*a* is coupled with the support 580 comprising a protrusion 580*p*. Second cantilevered bimorph 570*b* is coupled with the support 580 comprising a protrusion 580*pb*. Support 580 may be configured to support masses 560*a*, 560*b* and bimorph cantilevers 570*a*, 570*b* on the eardrum TM, which may not be drawn to scale on FIG. 7B. For example, support 580 may comprise a mold shaped to conform with the eardrum TM. The portion 580*a* of support 580 which is in contact with the eardrum TM can be flexible, for example, by comprising a flexible material such as silicone, flexible plastic, a gel, or the like. Other portions of support 580 may be rigid, for example, by comprising a metal, titanium, a rigid plastic, or the like. Cantilevered bimorph bender 550 may comprise circuitry configured to receive an external, wireless signal and cause cantilevers 570*a*, 570*b* to bend and thus push against masses 560*a*, 560*b*, respectively. The pushing action causes force in a direction 595 on the masses 560*a*, 560*b* and also a force on the support 580 in a direction 590 opposite the direction 595. The force on the support 580 causes a translational movement which drives the eardrum TM to produce sensations of sound. Cantilevers 570*a*, 570*b* may push masses 560*a*, 560*b* in tandem to cause support 540 to translate and drive the eardrum TM. Cantilevers 570*a*, 570*b* may also push masses 560*a*, 570*b* in different orders as to cause a rotational or twisting movement of the support 580 and the eardrum TM.

FIG. 8 shows a stacked piezo with mechanical multiplier 600 suitable for incorporation with transducer assembly 30 as described above. The stacked piezo 600 comprises a plurality of piezoelectric elements or a stacked piezoelectric array 610, mechanical multiplier 620, a mass 630, and a support 640. The piezoelectric array 610 may be held by mechanical multiplier 620. Mechanical multiplier 620 is coupled to mass 630 on side 623 and support 640 on side 626. Mechanical multiplier 620 is coupled with the support 640 comprising a protrusion 640*p* extending from the support to the transducer. Support 640 may be configured to support mechanical multiplier 620 and the piezoelectric array 610 and the mass 630 on the eardrum TM, which may not be drawn to scale in FIG. 8. For example, support 640 may comprise a mold shaped to conform with the eardrum TM. The portion 630*a* of support 630 which is in contact with the eardrum TM can be flexible, for example, by comprising a flexible material such as silicone, flexible plastic, a gel, or the like. Other portions of support 640 may be rigid, for example, by comprising a metal, titanium, a rigid plastic, or the like. Stacked piezo 600 may comprise circuitry configured to receive an external, wireless signal and cause the piezoelectric array 610 to expand or contract along axis 650. Mechanical multiplier 620 uses leverage to multiply this expansion and contraction and change its direction to a direction along axis 655, thereby producing a force against mass 630 and support 640. The force on support 640 drives the eardrum TM to produce sensations of sound.

Figure 9:
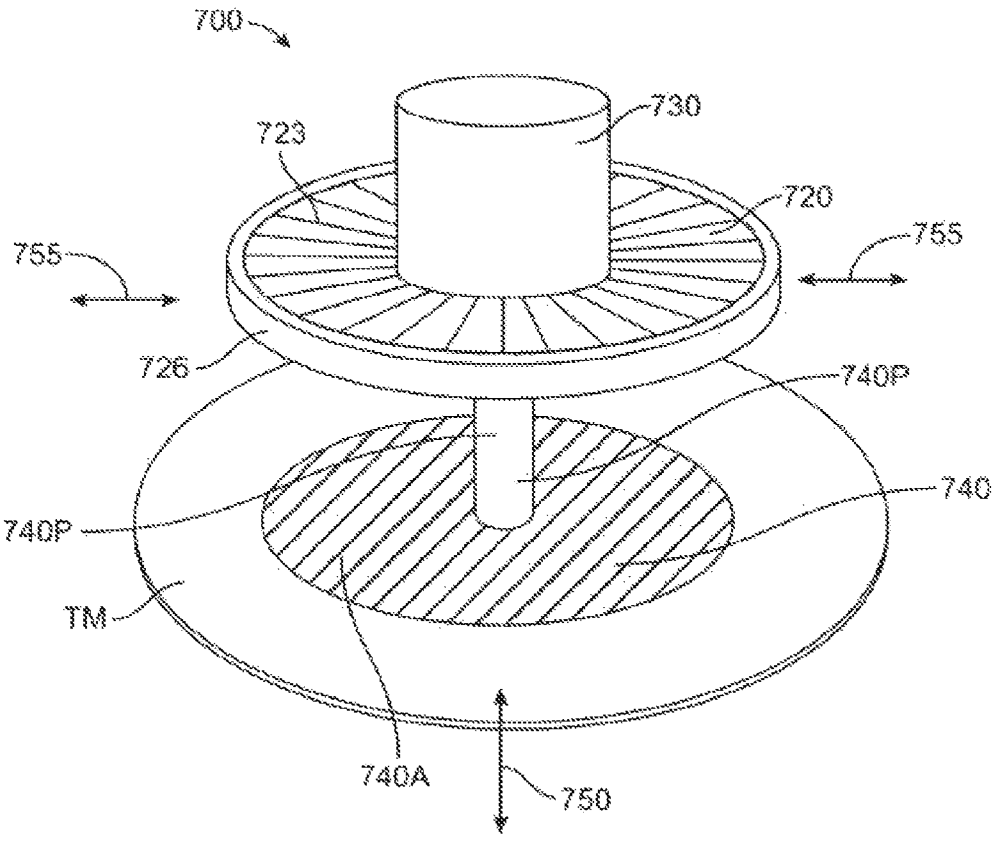
FIG. 9 shows a perspective view of a narrow ring piezo with a mechanical multiplier, in accordance with the systems of FIGS. 1, 2, and 3A to 5.

FIG. 9 shows a narrow ring piezo with a mechanical multiplier 700 suitable for incorporation with transducer assembly 30 as described above. The narrow ring piezo 700 comprises a piezoelectric ring 710, disc-shaped mechanical multiplier 720, a mass 730, and a support 740. Mechanical multiplier 720 is coupled to mass 730 and support 740. Mechanical multiplier 720 is coupled with the support 740 comprising a protrusion 740*p* extending from the support to the transducer. Support 740 may be configured to support mechanical multiplier 720 and the piezoelectric ring 710 and the mass 730 on the eardrum TM. For example, support 740 may comprise a mold shaped to conform with the eardrum TM. The portion 740*a* of support 740 which is in contact with the eardrum TM can be flexible, for example, by comprising a flexible material such as silicone, flexible plastic, a gel, or the like. Other portions of support 740 may be rigid, for example protrusion 740P that extends to the bimorph, by comprising a metal, titanium, a rigid plastic, or the like. Mechanical multiplier 720 comprises a first side 723 and a second side 726, the first side 723 extends inwardly from piezoelectric ring 710 to mass 730 and the second side 726 extends inwardly from piezoelectric ring 710 to support 740. Narrow ring piezo 700 may comprise circuitry configured to receive an external, wireless signal and cause the piezoelectric ring 710 to expand or contract along axis 750. Mechanical multiplier 720 uses leverage to multiply this expansion and contraction and change its direction to that along axis 755, producing a force against mass 730 and support 740. The force on support 740 drives the eardrum TM to produce sensations of sound.

Figure 10:
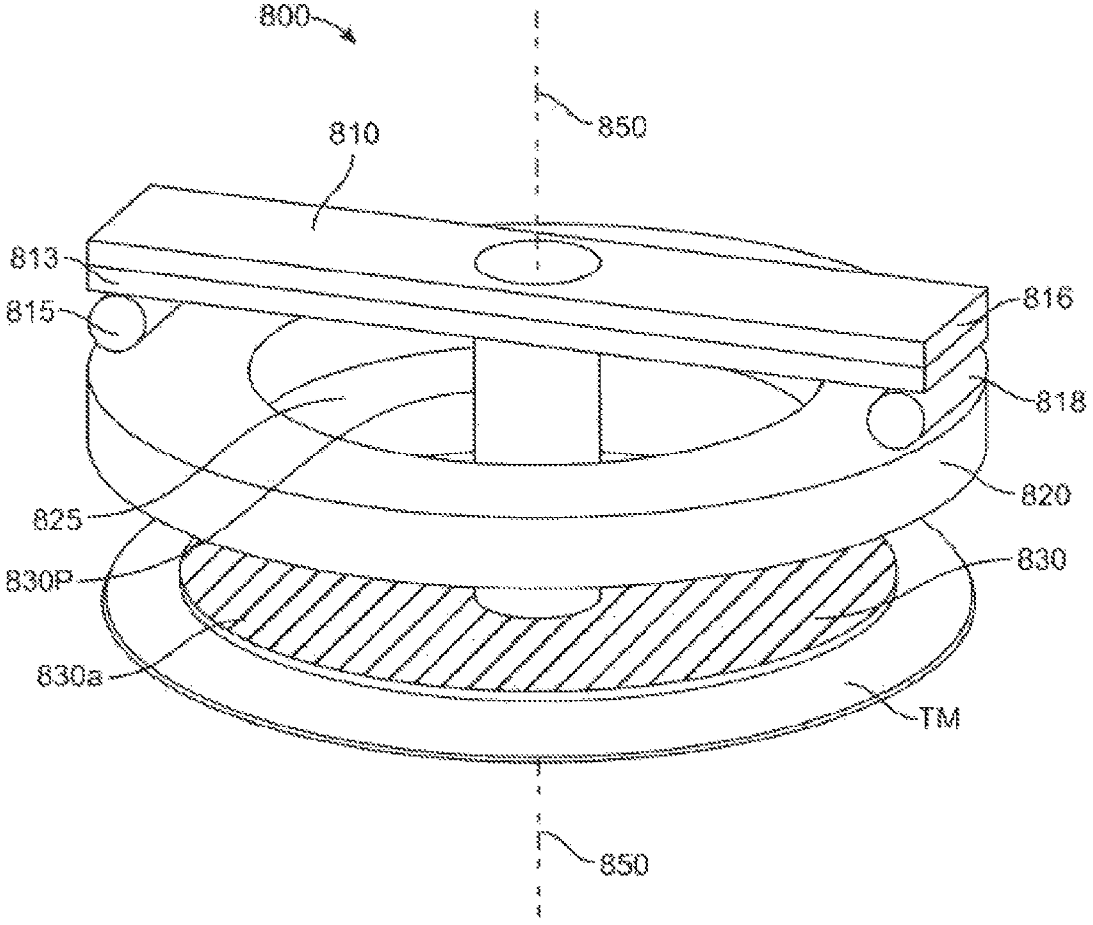
FIG. 10 shows a perspective view of a ring mass with bimorph piezo, in accordance with the systems of FIGS. 1, 2, and 3A to 5.

FIG. 10 shows a ring mass with bimorph piezoelectric transducer 800 suitable for incorporation with transducer assembly 30 as described above. Piezoelectric transducer 800 comprises contact elements contact elements 815 and 818 to connect a washer ring 820 to a piezoelectric bimorph 810. Ring mass with bimorph piezoelectric transducer 800 comprises a piezoelectric bimorph 810, contact elements 815, 818, a washer ring 820 which can serve as a mass and which defines an aperture 825, and a support 830 coupled to the bimorph 810, the support 830 coupled with bimorph 810 and passing through aperture 825 at least in part. Bimorph 810 may comprise a single crystal bimorph. Support 830 may be configured to support bimorph 810 on the eardrum TM. For example, support 830 may comprise a mold shaped to conform with the eardrum TM. The portion 830*a* of support 830 which is in contact with the eardrum TM can be flexible, for example, by comprising a flexible material such as silicone, flexible plastic, a gel, or the like. Other portions of support 830, for example protrusion 830*p*, may be rigid, for example, by comprising a metal, titanium, a rigid plastic, or the like. Bimorph 810 comprises a first end 813 and a second end 816. First end 813 and second end 816 are respectively coupled to ring 820 through contact elements 815 and 818, for example, through the use of an adhesive. Ring mass with bimorph piezoelectric transducer 800 may be coupled to circuitry configured to receive an external, wireless signal and cause bimorph 810 to flex in response. Flexion of bimorph 810 produces a shearing force or shear motion of first end 813 and second end 816 relative to washer ring 820 and produces a translational force along axis 850 so as to drive support 830 against the eardrum TM, producing sensations of sound.

Figure 10A:
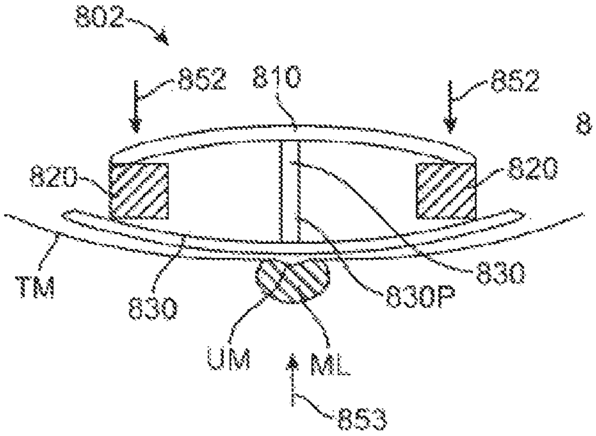
FIGS. 10A and 10B show side and top views, respectively, of a cross-sectional view and a top view, respectively, of a ring mass with bimorph piezo, in accordance with the systems of FIGS. 1, 2, and 3A to 5.
Figure 10B:
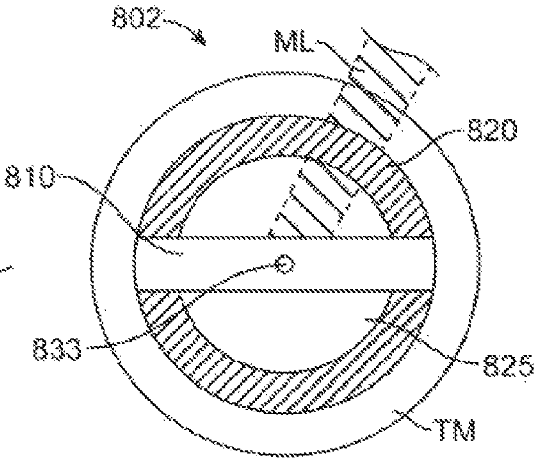

FIGS. 10A and 10B show a ring mass with bimorph piezoelectric transducer 802 suitable for incorporation with transducer assembly 30 as described above. FIG. 10*a* shows a cross-sectional view of ring mass with bimorph piezoelectric transducer 802. FIG. 10*b* shows a top view of ring mass with bimorph piezoelectric transducer 802. Bimorph 810 can be directly connected to washer ring 820 which can serve as a mass. Bimorph 810 is coupled with a support 830 comprising a protrusion 830*p* extending from the support to the transducer. Support 830 may be configured to support washer bimorph 810 and washer 820 on the eardrum TM. The portion of support 830 which is in contact with the eardrum TM can be flexible, for example, by comprising a flexible material such as silicone, flexible plastic, a gel, or the like. Other portions of support 830 may be rigid, for example, the portions may comprise a metal, titanium, a rigid plastic, or the like. For example, support 830 may comprise a mold shaped to conform with the eardrum TM. Support 830 may be configured so that protrusion 830*p* is directly over the umbo UM. Ring mass with bimorph piezoelectric transducer 802 may comprise circuitry configured to receive an external, wireless signal and cause bimorph 810 to bend or flex and thus push against washer 820. The pushing action causes a force in a direction 852 on washer 820 and also a force on the support 830 in a direction 853. The force on the support 830 causes a translational movement of the umbo UM which can rotate malleus ML to produce sensations of sound.

FIGS. 10B1 and 10B2 show perspective views of mass, for example a ring mass, with a piezoelectric transducer, for example a bimorph piezoelectric transducer 803, in which the mass is coupled to the piezoelectric transducer with a flexible intermediate structure, for example intermediate element 815, suitable for incorporation with transducer assembly 30 as described above. The flexible intermediate structure can relax a boundary condition at the edge of the piezoelectric transducer so as to improve performance of the piezoelectric transducer coupled to the mass. Although an elongate rod is shown, the flexible intermediate structure may comprise many known flexible shapes such as coils, spheres and leafs. Bimorph 810 is indirectly and flexibly connected to washer ring 820. The ends of bimorph 810 can be directly connected to intermediate elements 815. Intermediate elements 815 can in turn be directly connected to washer ring 820. Washer ring 820 can serve as a mass. The ends of bimorph 810 may be rigidly attached to intermediate elements 815, for example, via an adhesive or glue. Intermediate elements 815 may be rigidly attached to intermediate elements 815, for example, via an adhesive or glue. Intermediate elements 815 is flexible so as to provide a flexible boundary condition or a flexible connection between bimorph 810 and washer ring 820. For example, intermediate elements 815 may comprise a rod made of a flexible material such as carbon fiber or a similar composite material. Such a flexible material may be more prone to twisting than bending. By providing such a flexible boundary condition, the force outputted by transducer 803 can be greater, for example, twice as great, as the force outputted if bimorph 810 were instead directly and rigidly connected to washer ring 820.

Bimorph 810 is coupled with a support 830. Support 830 comprises a protrusion 830P protruding from the bimorph 810 and a support member 830E adapted to conform with the eardrum TM. Protrusion 830P is coupled to support member 830E. For example, protrusion 830P can comprise a first magnetic member 831P and support member 830E may comprise a complementary second magnetic member 831E so that protrusion 830P and support member 830E are magnetically coupled. Both first magnetic member 831P and second magnetic member 831E may comprise magnets. Alternatively, one of first magnetic member 831P or second magnetic member 831E may comprise a magnet while the other comprises a ferromagnetic material. To position transducer 803 on the eardrum TM, support member 830E may first be placed on the eardrum TM, followed by the remainder of the transducer 803 as guided by first magnetic member 831P and second magnetic member 831E. The use of magnetism to guide the positioning of transducer 803 can reduce a hearing professional's reliance on vision to position transducer 803 on the eardrum TM.

Support member 830E may comprise a mold shaped to conform with the eardrum TM. Support member 830E can comprise a flexible material such as silicone, flexible plastic, a gel, or the like. The portion of support member 830E in contact with protrusion 830P may be rigid, for example, the portions may comprise a metal, titanium, a rigid plastic, or the like. Support 830 may be configured so that protrusion 830P is directly over the umbo UM. Transducer 803 may also comprise circuitry 824. Circuitry 824 may be configured to receive a signal, for example, an external, wireless signal. Circuitry 824 can cause bimorph 810 to bend or flex and thus push against washer 820. The pushing action causes a force in a direction 852 on washer 820 and also a force on the support 830 in a direction 853. The force on the support 830 causes a translational movement of the umbo UM which can rotate malleus ML to produce sensations of sound.

Figure 10C:
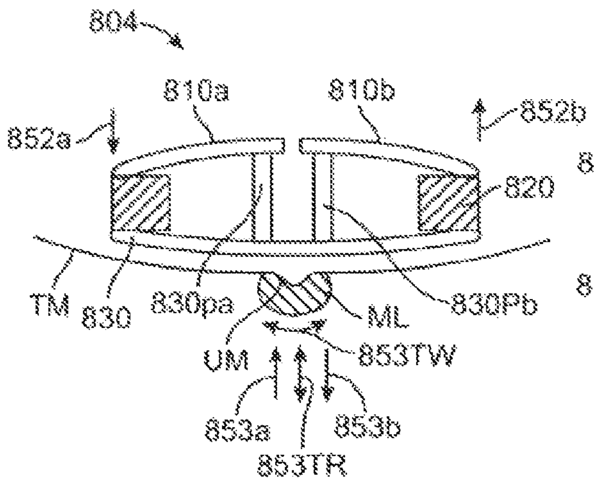
FIGS. 10C and 10D show side and top views, respectively, of a cross-sectional view and a top view, respectively, of a ring mass with dual bimorph piezo, in accordance with the systems of FIGS. 1, 2, and 3A to 5.
Figure 10D:
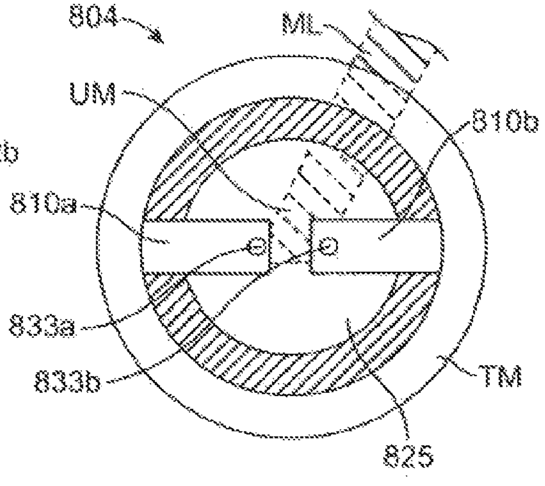

FIGS. 10C and 10D show embodiments that comprise more than one bimorph, for example a ring mass dual bimorph piezoelectric transducer 804, suitable for incorporation with transducer assembly 30 as described above. Transducer 804 may comprise a mass from about 10 mg to about 150 mg, for example about 80 mg. Ring mass with double bimorph piezoelectric transducer 804 comprises first transducer, for example first bimorph 810*a* and second transducer, for example second bimorph 810*b*. Malleus ML extends into the ear canal, and first bimorph 810*a* and second bimorph 810*b* may extend along a line substantially perpendicular to malleus ML, or first bimorph 810*a* and second bimorph 810*b* may extend along a line oblique to Malleus ML. Bimorph 810*a* and bimorph 810*b* are coupled to a ring or washer 820 which comprises a mass. Bimorph 810*a* and bimorph 810*b* are supported by support 830 comprising protrusions 830*pa* and 830*pb*, which are coupled to bimorph 810*a* and bimorph 810*b*, respectively. The portion of support 830 which is in contact with the eardrum TM can be flexible, for example, by comprising a flexible material such as silicone, flexible plastic, a gel, or the like. Other portions of support 830 may be rigid, for example comprising a metal, titanium, a rigid plastic, or the like. For example, support 830 may comprise a mold shaped to conform with the eardrum TM.

Ring mass with double bimorph piezoelectric transducer 804 may comprise circuitry configured to receive an external, wireless signal and cause bimorph 810*a* and bimorph 810*b* to bend and/or flex and thus push against washer 820. The wireless signal may comprise a first signal configured to drive first bimorph 810*a* and a second signal configured to drive second bimorph 810*b*. The pushing action of the first transducer in response to the first signal causes a first force in a first direction 852*a* on washer 820 and an opposite force on the support 830 in an opposite direction 853*a*. The pushing action of the second transducer in response to the second signal causes a second force in a second direction 852*b* on washer 820 and an opposite force on the support 830 in an opposite direction 853*b*. The force on the support 830 in first direction 853*a* and second direction 853*b* causes a translational movement which drives the eardrum TM to produce sensations of sound.

The dual transducer 804 allows the malleus to be driven in more than one dimension, for example with a first translational motion to rotate the malleus with hinged motion about the head of the malleus and second rotational motion to twist the malleus about an elongate axis of the malleus extending from a head of the malleus toward the umbo. When bimorphs 810*a* and 810*b* are flexed at the same time and in the same direction, ring-mass-double-bimorph-piezoelectric-transducer 804 may work similar to same as ring-mass-double-bimorph-piezoelectric-transducer 804. However, flexion of bimorphs 810*a* and 810*b* at different times and/or in different directions or phase may produce a rotational twisting motion along the elongate axis of the malleus with support 830 and thus induce rotation at the umbo of eardrum TM. For example, the received external, wireless signal may cause only one of bimorph 810*a* and bimorph 810*b* to bend or flex. Alternatively or in combination, the received external, wireless signal may cause bimorph 810*a* to bend or flex more than bimorph 810*b*, or vice versa, so as to cause a rotational twisting motion of the malleus to occur along with the hinged rotation motion of the malleus to translate the umbo of eardrum TM. Arrows 853TW show twisting motion of the malleus at umbo UM with a first rotation of the malleus about an elongate axis of the malleus. Arrows 853TR show translational motion of the umbo UM with hinged rotation of the malleus comprising pivoting of the malleus about the head of the malleus. The first transducer and the second transducer can be driven with a signal having a time delay, for example a phase delay of 90 degrees, such that translation movement and twisting of the malleus and umbo occur. Thus, a first portion support 830 may translate in a first direction 853 and a second portion of support 830 may translate in a second direction 853*b* opposite first direction 853*a* so as to rotate the malleus with twisting motion. Thus, the first transducer and the second transducer comprising bimorphs 810*a* and 810*b* can be driven so as to cause translational movement and a rotational movement of eardrum TM. Hinged rotational movement of the malleus to effect translational movement of the umbo UM may be made at low frequencies less than about 5 kHz, for example frequencies less than about 1 kHz. Rotational twisting movement of the malleus may be made at frequencies greater than about 2 kHz, for example high frequencies greater than 5 kHz.

Figure 10E:
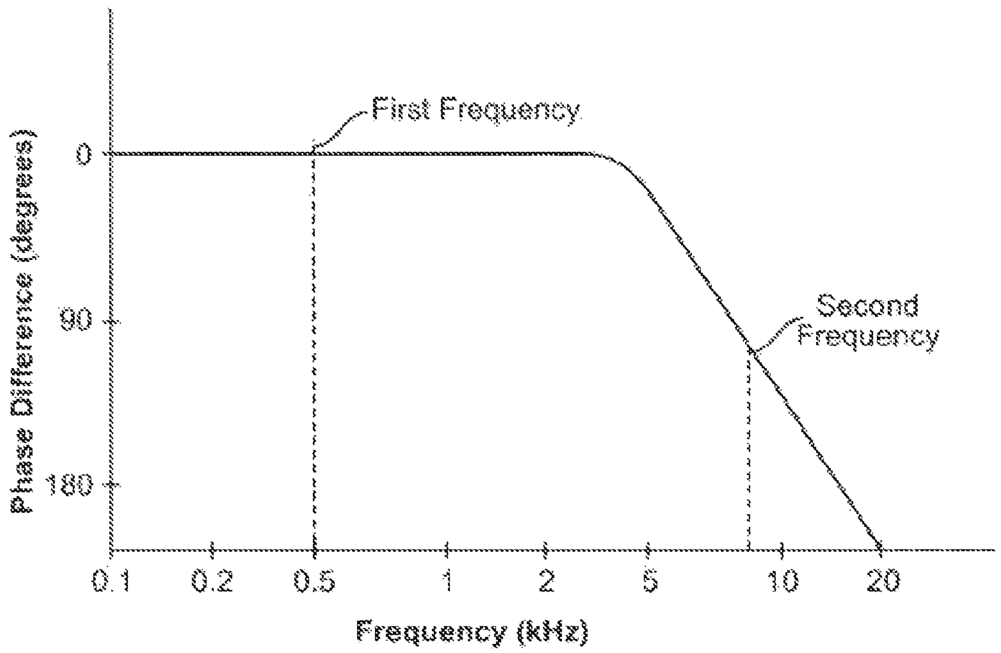
FIG. 10E shows a plot of phase difference versus frequency for the first and second transducers of the dual bimorph piezo of FIGS. 10C and 10D.

FIG. 10E shows a plot of phase difference versus frequency for the first and second transducers of the dual bimorph piezo of FIGS. 10C and 10D. This phase difference can result in increased frequency gain at high frequencies above about 5 kHz, such that the user can hear the high frequency sounds more clearly due to the twisting of the malleus. At a first frequency below about 1 kHz, for example 0.5 kHz, the phase difference between the first transducer and the second transducer is substantially zero. At a second frequency above from about 3 to 6 kHz, for example above about 5 KHz, the phase difference between the first transducer and the second transducer is at least about 10 degrees. For example, at about 9 kHz, the phase difference between the first transducer and the second transducer may comprise about 100 degrees. The phase difference between the first transducer and the second transducer can be provided in many ways, for example with the audio processor as described above, configured to output a first channel to the first transducer and a second channel to the second transducer. The circuitry coupled to the first transducer and the second transducer may be configured to provide the first signal phase shifted from the second signal in response to the audio signal, for example, with circuitry comprising at least one of a capacitor, a resistor or an inductor configured to provide a phase shift of the audio signal such that the first signal is phase shifted from the second signal.

Figure 11:
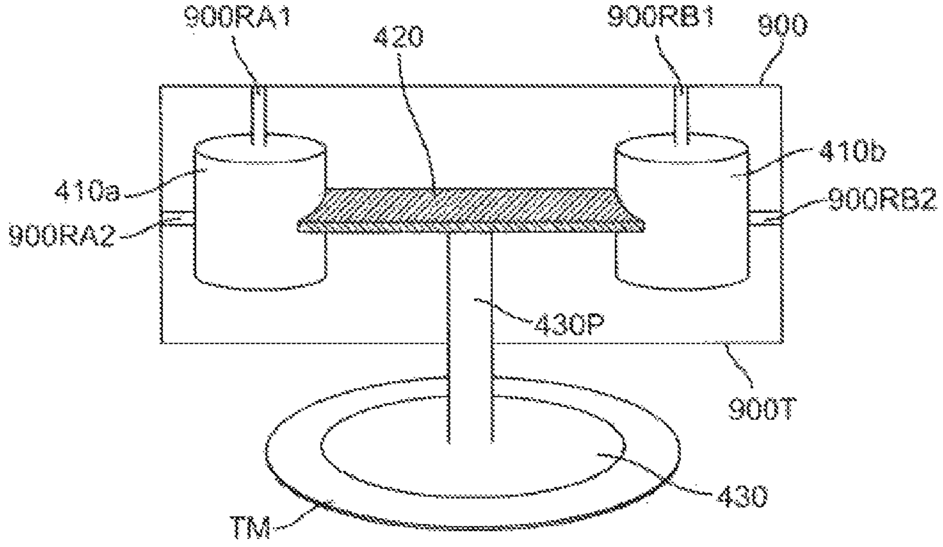
FIG. 11 shows a side view of a simply supported bimorph bender with a housing, in accordance with the systems of FIGS. 1, 2, and 3A to 5.

FIG. 11 shows simply supported bimorph bender 400 housed in a hermetically sealed housing 900 suitable for incorporation with transducer assembly 30 as described above. Housing 900 may comprise many known biocompatible materials. In many embodiments, an output transducer may comprise a hermetically sealed housing. Housing 900 may be rigidly affixed to masses 410*a* and 410*b* with rigid connections. First mass 410*a* is connecting to housing 900 with rigid connections 900RA1 and 900RA2. Second mass 410*b* is connecting to housing 900 with rigid connections 90ORB1 and 900RB2. Housing 900 can provide additional mass for bimorph 420 to push against. A rigid portion 430P of support 430 extends through housing 900 to bimorph 420. Hermitically sealed housing 900 may be configured for many of the above described transducers, for example piezoelectric at least one of cantilevered bimorph bender 500, 550, stacked piezo with mechanical multiplier 600, disk or narrow ring piezo with a mechanical multiplier 700, or transducer 800.

Figure 11A:
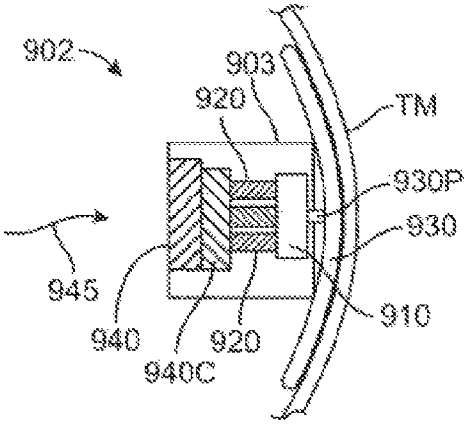
FIG. 11A shows a side view of an optically powered output transducer, in accordance with the systems of FIGS. 1, 2, and 3A to 5.

FIG. 11A shows an output transducer 902 which receives power through optical transmission suitable for incorporation with transducer assembly 30 as described above. Output transducer 902 may comprise a piezoelectric transducer, a magnetostrictive transducer, a photostrictive transducer, a coil and a magnet, or the like. As shown in FIG. 11A, output transducer 902 comprises a piezoelectric transducer 910 which is coupled to annular mass 920. Piezoelectric transducer 910 and mass 920 are both supported by support 930. Piezoelectric transducer 910 may comprise many of the piezoelectric elements described above, for example at least one of a bimorph, a cantilevered bimorph, a stacked piezo, or a disc or ring piezo. Mass 920 may be similar to many of the masses as previously discussed. Piezoelectric transducer 910 can be powered by a photodetector 940 which receives light 945. Light 945 may comprise a signal, for example, a signal representative of sound as described above. Photodetector 940 can be coupled to circuitry 940*c*. Circuitry 940*c* can be supported with support 930, mass 920, piezoelectric transducer 930 and support 930. Circuitry 940 can be coupled to piezoelectric transducer 910 to convert light 945 into an electrical signal which can cause piezoelectric transducer 910 to move and cause vibrations on eardrum TM which may lead to a sensation of sound. A housing 903 extends around piezoelectric transducer 910, circuitry 940*c*, mass 920 and photodetector 940 to hermetically seal transducer 902.

Figure 11B:
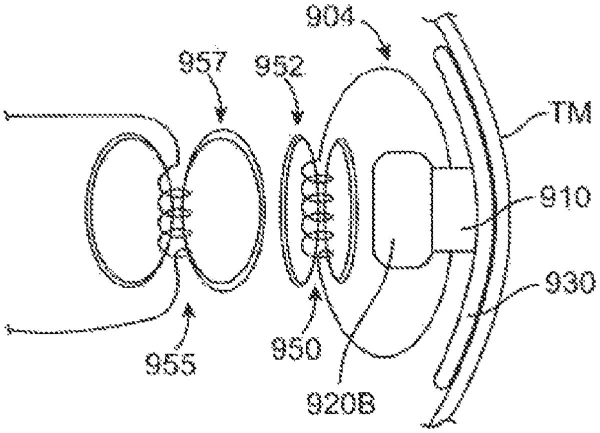
FIG. 11B shows a side view of a magnetically powered output transducer, in accordance with the systems of FIGS. 1, 2, and 3A to 5.

FIG. 11B shows an output transducer 904 which receives power through magnet and/or electric power transmission suitable for incorporation with transducer assembly 30 as described above. Output transducer 904 may comprise a piezoelectric transducer, a magnetostrictive transducer, a photostrictive transducer, a coil and a magnet, or the like. Output transducer 904 comprises a piezoelectric transducer 910 coupled to a mass 920B. Piezoelectric transducer 910 and mass 920B are both supported by support 930. Piezoelectric transducer 910 may comprise many of the piezoelectric elements described above, for example at least one of a bimorph, a cantilevered bimorph, a stacked piezo, or a disc or ring piezo. Mass 920B may be similar to many of the masses as previously discussed. Piezoelectric transducer 910 can be powered by an external coil 955 which produces a magnetic field 957 which causes a magnetic field 952 and a voltage in coil 950. Coil 950 is coupled to and powers piezoelectric transducer 910. Coil 950 can be supported with mass 920B, transducer 910 and support 930. The electromagnetic field 957 produced by external coil 955 may provide a signal, for example, a signal representative of sound, to coil 950. Appropriate variations in magnetic field 957 and magnetic field 952 can cause piezoelectric transducer 910 to cause vibrations on eardrum TM which may lead to a sensation of sound.

Tables 4 and 5 below show characteristics of exemplary piezoelectric output transducers as described above, including simply supported bimorph bender 400, cantilevered bimorph bender 500, stacked piezo with mechanical multiplier 600, disk or narrow ring piezo with a mechanical multiplier 700, and bimorph or wide ring piezo 800.

TABLE 4

EXEMPLARY PARAMETERS OF PIEZOELECTRIC OUTPUT TRANSDUCERS

| Variable | Symbol | Comments |
|---|---|---|
| Displacement at point of interest | w | Simply Supported Bimorph-Mid span<br>Cantilever Bimorph-Free end<br>Stack-Free end<br>Narrow Ring-Mid radius<br>Wide Ring-Outer radius |
| Beam or stack length | L | |
| Beam or stack width | b | Stack is assumed to have a square cross section |
| Wide ring outer radius | | |
| Wide ring inner radius | a | |
| Thickness | h | Bimorph -½total thickness<br>Stack-single layer thickness<br>Ring-total thickness |
| Number of layers | n | Bimorph-number of layers in ½thickness<br>Stack-total number of layers<br>Ring-total number of layers |
| Piezoelectric constant | $d_{31}$, $d_{3\alpha}$ | |
| Elastic moduli | $E_{11}$, $E_{3\alpha}$ | |
| Density | p | |
| Permittivity of free space | $\varepsilon_{\alpha}$ | 8.854E-12(F/m) |
| Relative permittivity | $\bar{\varepsilon}_{3\alpha}$ | |
| Applied voltage | Δ V | |
| Applied force | F | Simply Supported Bimorph-Force (N) at mid span<br>Cantilever Bimorph-Force (N) at free end<br>Stack-Force (N) at free end<br>Narrow Ring-Ring load (N/m) at mid radius Wide Ring-Ring load (N/m) at outer radius |

TABLE 5

EXEMPLARY MECHANICAL FORMULAS FOR PIEZOELECTRIC OUTPUT TRANSDUCERS

| Type | Formulas | Comments |
|---|---|---|
| Simply Supported Bimorph Bender 400 | Displacement per Volt<br>$\frac{W}{\Delta V} = \frac{3}{16} n d_{31} \left(\frac{L}{h}\right)^2$<br>Capacitance<br>$C = 2n^2 \varepsilon_0 E_{32} b \left(\frac{L}{h}\right)$<br>Stiffness<br>$\frac{F}{w} = 32 E_{11} b \left(\frac{h}{L}\right)^3$<br>$1^{st}$ Mechanical Resonance<br>$f_1 = \frac{(\pi)^2}{2\pi} \sqrt{\frac{E_{11} h^2}{3 \rho L^4}}$ | |
| Cantilevered Bimorph Bender 500 | Displacement per Volt<br>$\frac{w}{\Delta V} = \frac{3}{4} n d_{31} \left(\frac{L}{h}\right)^2$<br>Capacitance<br>$C = 2n^2 \varepsilon_0 \bar{\varepsilon}_{33} b \left(\frac{L}{h}\right)$<br>Stiffness<br>$\frac{F}{w} = 2 E_{11} b \left(\frac{h}{L}\right)^2$<br>$1^{st}$ Mechanical Resonance<br>$f_1 = \frac{(1.875)^2}{2\pi} \sqrt{\frac{E_{11} h^2}{3 \rho L^4}}$ | |
| Stack (shown with displacement amplifier) 600 | Displacement per Volt<br>$\frac{w}{\Delta V} = n d_{33}$<br>Stiffness<br>$\frac{F}{w} = \frac{E_{33} b^2}{L}$<br>Capacitance<br>$C = \frac{n \varepsilon_0 \bar{\varepsilon}_{33} b^2}{h}$<br>$1^{st}$ Mechanical Resonance<br>$f_1 = \frac{1}{4L} \sqrt{\frac{E_{33}}{\rho}}$ | The $1^{st}$ mechanical resonance equation may be the 1/4 wave "rod" resonance which can tend to be very high. This may not be the first resonance of the system. The most likely $1^{st}$ mode may be the mass of the piezo/ref mass in conjuction with the spring of the displacement amplifier or some kind of bending mode. |
| Narrow Ring (shown with displacement amplifier) 700 | Displacement per Volt<br>$\frac{w}{\Delta V} = n d_{31} \left(\frac{r_0}{h}\right)$<br>Stiffness | Remember for ring cases that F is a ring load (N/m) that will be summed by the displacement amplifier.<br>The appropriate $1^{st}$ mechanical resonance mode may not be clear. |

TABLE 5-continued

EXEMPLARY MECHANICAL FORMULAS FOR PIEZOELECTRIC OUTPUT TRANSDUCERS

| Type | Formulas | Comments |
|---|---|---|
| | $\frac{F}{w} = \frac{E_{11}t}{r_0\left(\frac{h}{r_0}\right)}$ | Likely the first resonance may either be a bending type mode or a cos (2θ) mode. |
| | Capacitance | |
| | $C = n^2\varepsilon_0\bar{\varepsilon}_{33}2\pi t\left(\frac{r_0}{h}\right)$ | |
| | 1$^{st}$ Mechanical Resonance | |
| Wide Ring | Displacement per Volt | |
| | $\frac{w}{\Delta V} = nd_{31}\left(\frac{b}{h}\right)$ | |
| | Stiffness | |
| | $\frac{F}{w} = \frac{E_{11}t}{b}\frac{(b^2-a^2)}{(1+v)a^2+(1-v)b^2}$ | |
| | Capacitance | |
| | $C = n^2\varepsilon_0\bar{\varepsilon}_{33}\frac{\pi(b^2-a^2)}{h}$ | |
| | 1$^{st}$ Mechanical Resonance | |

Figure 12:
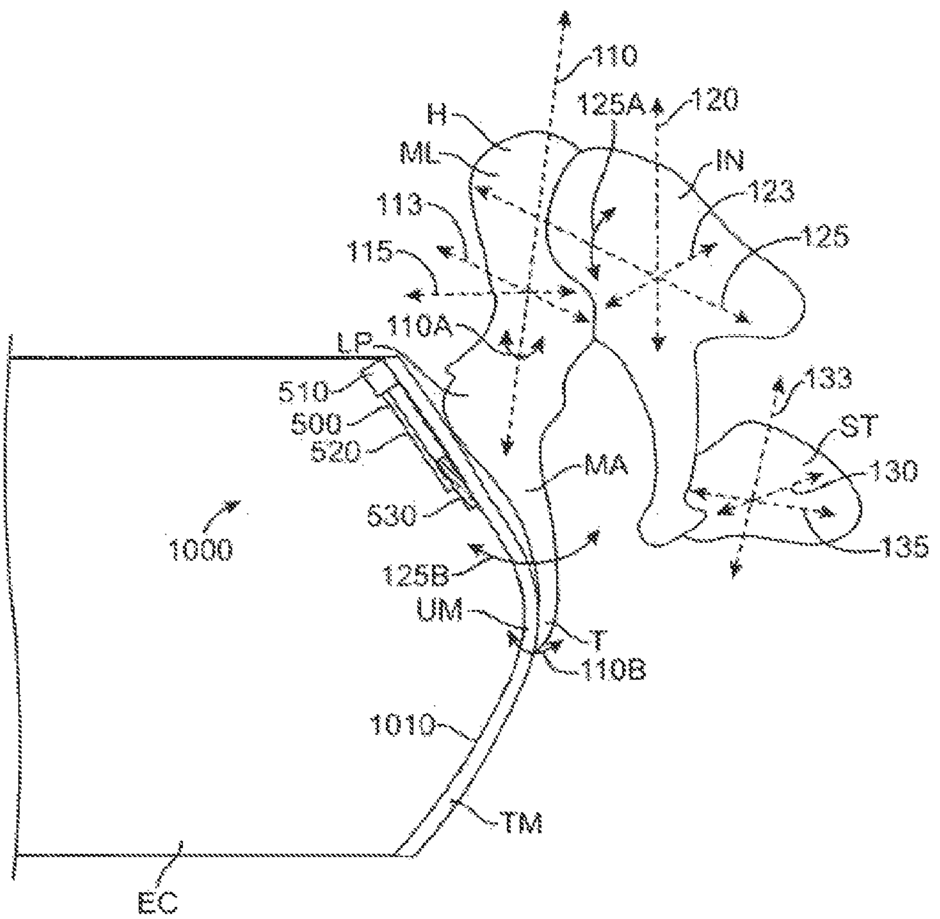
FIG. 12 shows a side view of a cantilevered bimorph bender placed on the eardrum away from the umbo and on the lateral process, in accordance with the systems of FIGS. 3A to 5.

FIG. 12 shows an output transducer assembly 1000 comprising a cantilevered bimorph bender positioned on a support 1010 such that the output transducer assembly is positioned over the lateral process and away from the umbo when the support is placed on the eardrum, suitable for incorporation with transducer assembly 30 as described above. Many of the output transducers as described above can be positioned on support 1010 so as to couple to the umbo of the eardrum TM with the transducer positioned away from the umbo, for example, on the lateral process LP. The output transducer positioned on the support 1010 so as to couple to the umbo with the transducer positioned away from the umbo may comprise at least one of a piezoelectric transducer, a magnetostrictive transducer, a photostrictive transducer, a coil, or a magnet. Support 1010 can be made with known methods of molding to manufacture a support customized to the ear of the user, for example, as with the known EarLens. The transducers as described above, for example simply supported bimorph bender 400, cantilevered bimorph bender 500, cantilevered bimorph bender 550, stacked piezo with mechanical multiplier 600, ring piezo with mechanical multiplier 700, and ring mass with bimorph piezoelectric transducer 800 can be positioned on support 1010 so as to position the transducer at the desired location on the eardrum when support 1010 is placed against tympanic membrane TM. As shown in FIG. 12, the transducer may comprise cantilevered bimorph bender 500 on support 1010 and coupled to eardrum TM over the lateral process LP and away from the umbo UM. Cantilevered bimorph bender 500 can be placed on the support so as to align with malleus ML when the support is placed against the eardrum. For example, support 530 of cantilevered bimorph bender 500 can be positioned on support 1010 to conform to the portion of the eardrum TM over the lateral process LP when support 1010 is placed against the eardrum TM. In some embodiments, support 530 can be placed directly on the eardrum without support 1010, for example directly over the lateral process LP. Mass 510 of cantilevered bimorph bender 500 may be placed along the eardrum away from the umbo U of the eardrum TM so as to decrease a mechanical impedance of the support to sound transmitted with the eardrum TM. Cantilever 520 has a first end coupled to mass 510 and a second end coupled to support 530. Cantilever 520 may bend and push against mass 510 and cause a force on support 530 which drives the lateral process LP of the malleus ML to produce sensations of sound.

Figure 12A:
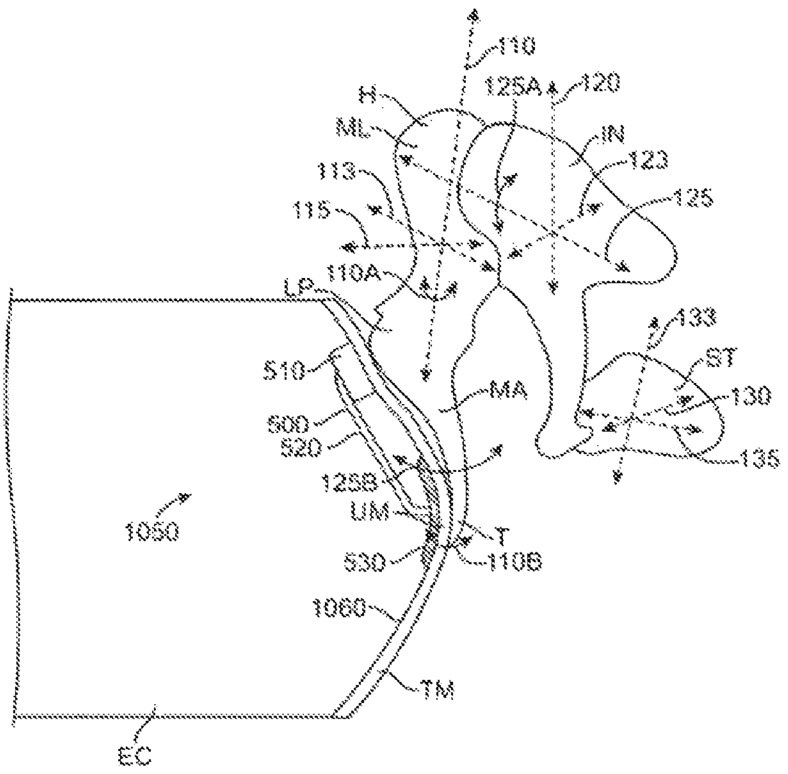
FIG. 12A shows a side view of an output transducer assembly comprising a cantilevered bimorph bender placed on the ear drum with a mass on the lateral process away from the umbo and an elongate member comprising a cantilever extending from the mass toward the umbo so as to couple to the eardrum at the umbo, in accordance with the systems of FIGS. 3A to 5.
Figure 12B:
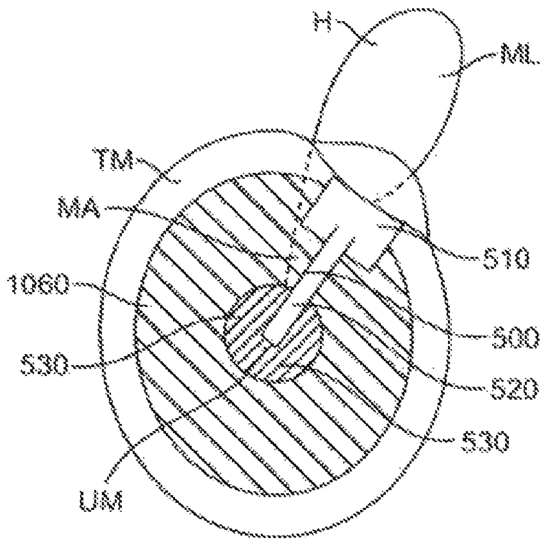
FIG. 12B shows the cantilevered bimorph bender of FIG. 12A from a lateral side view.

FIGS. 12A and 12B show an output transducer assembly 1050 suitable for incorporation with transducer assembly 30 as described above and comprising cantilevered bimorph bender 500 placed on a support 1060 which may be made from a mold of the user's ear. The output transducer positioned on the support 1060 may comprise at least one of a piezoelectric transducer, a magnetostrictive transducer, a photostrictive transducer, a coil, or a magnet. Support 530, mass 510 and the elongate member comprising bimorph cantilever 520 of bimorph bender 500 are positioned on support 1060 such that mass 510 is positioned away from the umbo and the elongate member is coupled to the umbo when support 1060 is placed against eardrum TM. The elongate member, for example bimorph cantilever 520, extends from the mass supported on the lateral process to the umbo so as to couple to the motion of the transducer to the eardrum at the umbo. This configuration has the advantage of lowering the mechanical impedance with the mass positioned away from the umbo while providing mechanical leverage with coupling at the umbo.

The mass can be positioned away from the umbo and/or aligned with the malleus ML in many ways so as to reduce the input impedance of the transducer assembly. For example, mass 510 can be positioned on support 1060 such that mass 510 is supported with the lateral process LP when support 1060 is placed against the ear. Also cantilevered bimorph bender 500 and support 530 can be placed directly on the eardrum TM such that mass 510 is aligned with malleus ML, for example aligned with lateral process LP. As shown in FIGS. 12A and 12B, mass 510 is placed on support 1060 over the lateral process LP and support 530 is placed on support 1060 over the umbo U when support 1060 is placed against the eardrum TM. The elongate member comprising bimorph cantilever 520 has a first end coupled to mass 510 and a second end coupled to support 530. Cantilever 520 may bend and push against mass 510 and cause a force on support 530 which drives the tip T of the malleus ML to produce sensations of sound. The length of cantilever 520 may be provided with a longer length such that cantilever 520 can provide more mechanical leverage while reducing the input impedance of mass 510.

Figure 13:
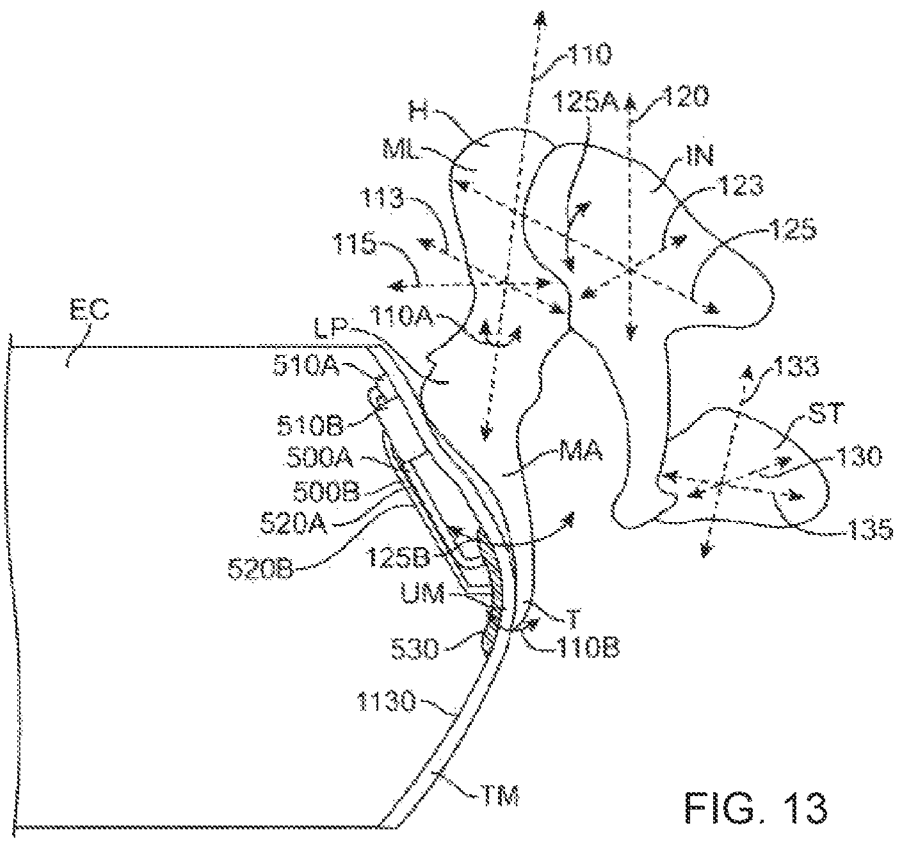
FIG. 13 shows a side view of a transducer comprising two cantilevered bimorph benders placed on different locations on the eardrum, in accordance with the systems of FIGS. 1, 2, and 3A to 5.
Figure 13A:
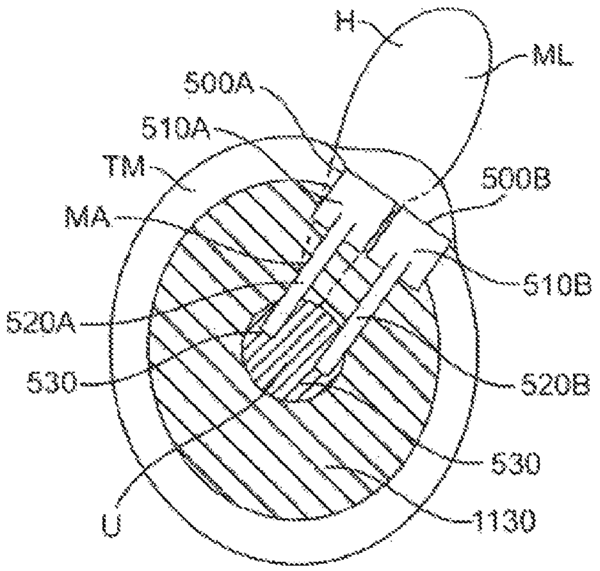
FIG. 13A shows a lateral side view of two cantilevered bimorph benders placed on the ear drum over the umbo and the lateral process, in accordance with the systems of FIGS. 1, 2, and 3A to 5.

FIG. 13 shows two or more transducers positioned on a support 1130 so as to rotate the malleus with hinged rotation at low frequencies and twist the malleus at high frequencies and suitable for incorporation with transducer assembly 30 as described above. Many of the above described transducers can be placed on support 1130. For example, embodiments of cantilevered bimorph bender 550 and bimorph or wide ring piezo 800 may cause a twisting motion on the eardrum TM and thus the malleus ML. Placement of two or more output transducers, on different parts of the eardrum TM can also produce a rotational or twisting motion on the eardrum TM at the umbo and the malleus ML. The placed output transducers may comprise, for example, at least one of simply supported bimorph bender 400, cantilevered bimorph bender 500, stacked piezo with mechanical multiplier 600, disk or narrow ring piezo with a mechanical multiplier 700, and bimorph or wide ring piezo 800. For example, FIGS. 13 and 13A show two cantilevered bimorph benders 500A and 500B configured to couple to the umbo of the eardrum TM on opposite lateral sides over the tip T of malleus ML. Cantilevered bimorph benders 500A and 500B each comprise masses 510A and 510B, respectively, and bimorph cantilevers 520A and 520B, respectively, and may both be supported with a common support 530 and/or support 1130 which also supports masses 510A and 510B. Each of bimorph cantilevers 520A and 520B comprises an elongate member that extends from the mass to the umbo to couple to the eardrum at the umbo. A phase difference, as described above, between bimorphs 500A and 500B may cause malleus ML to twist. Masses 510A and 510B are positioned on support 1130 such that masses 510A and 510B are supported with the lateral process when support 1130 is placed against eardrum TM. Output transducers may be placed on other areas of the eardrum TM as well, for example at additional locations away from the umbo as described above. In some embodiments, support 530 can be coupled directly to eardrum TM, for example without support 1130.

Figure 23B:
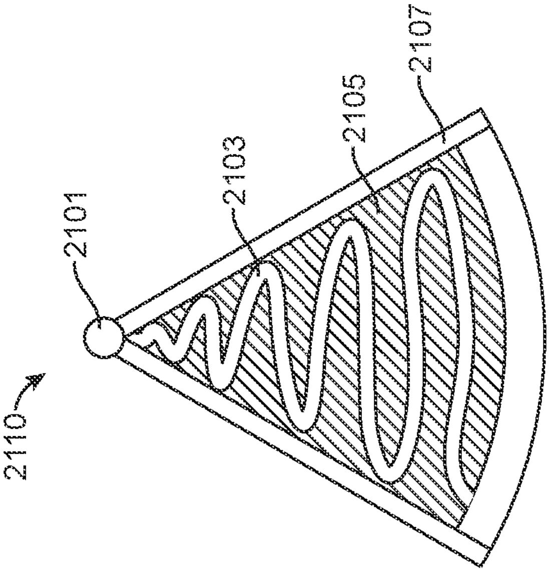
FIGS. 23A-23F illustrate a flat circular piezoelectric transducer or actuator, according to embodiments of the present disclosure.
Figure 23C:
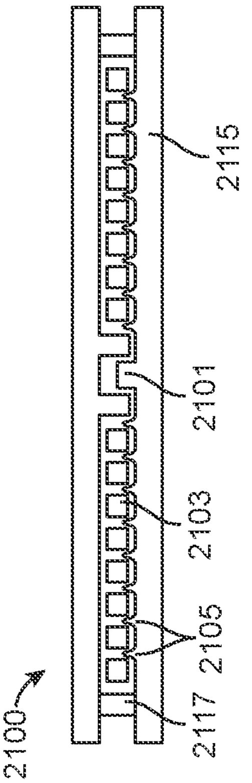
Figure 23A:
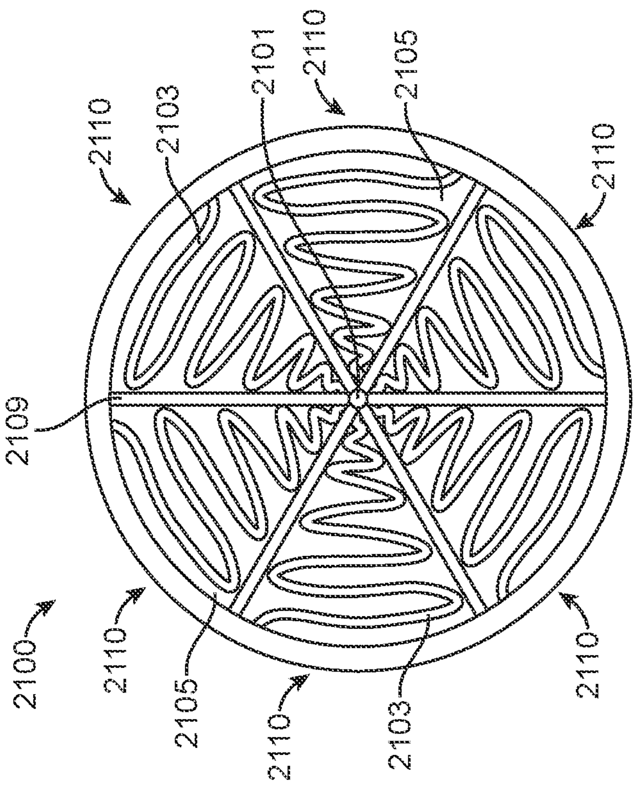

FIGS. 23A-23F illustrates a flat circular piezoelectric transducer 2100. As shown in FIG. 23A, the flat circular piezoelectric transducer 2100 may comprise an arrangement of coiled wires 2103 comprising piezoelectric material(s), e.g., PZT. The flat circular piezoelectric transducer 2100 may comprise a plurality of individual sectors, which in some cases can be individually activated. As shown in FIG. 23A, six sub-circular sectors 2110 of wires 2103 can be connected together to form a circular shape. In each sub-circular sector 2110, the wires 2103 may be arranged in a sinusoidal pattern to form a triangle. The sub-circular sectors 2110 can be connected to a drive post mount 2101 in the center of the flat circular piezoelectric transducer 2100. The circular sectors 2110 may be spaced by flex spine(s) 2109 and the wires 2103 can be spaced by passive elements or materials 2105. The passive elements can comprise electrically insulating materials. In some cases, the passive elements can comprise silicone, silicone gel, parylene, or any combination thereof.

FIG. 23B shows a circular sector 2110 of the circular piezoelectric transducer 2100 in FIG. 23A. The piezoelectric wire 2103 can be connected the drive post mount 2101 which may connect the wires to a drive post. The drive post in turn can affix the actuator to a tympanic membrane TM via an umbo lens as described herein. The coils of the wire 2103 can be spaced by passive elements or materials 2105.

FIG. 23C illustrates a cross-section along the diameter of the flat circular piezoelectric transducer 2100. The wires 2103 can be sandwiched between two layers of the fixture mold 2115 and sealed at the edge by an outer ring 2117.

Figure 23D:
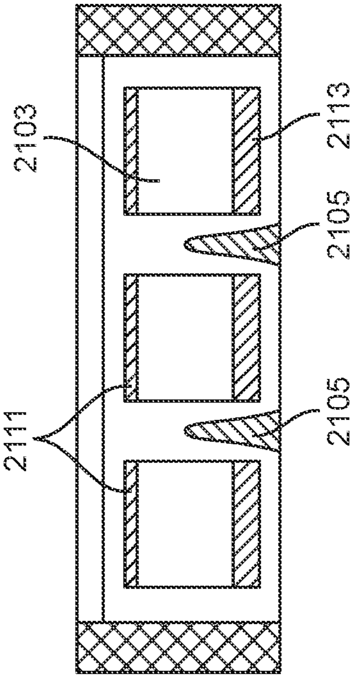

FIG. 23D shows a portion of a section of the cross section in FIG. 23C. Electrodes 2111 can be connected to one side of the piezoelectric wire to conduct the electric current throughout the wire(s) 2103. The wire(s) 2103 can be coated by carrier layer 2113 on the other side.

Figure 23E:
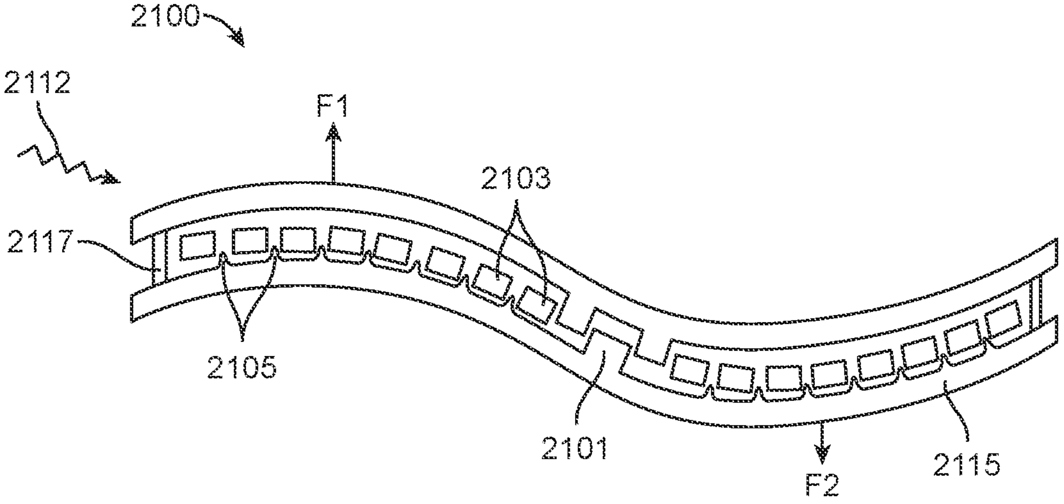
Figure 23F:
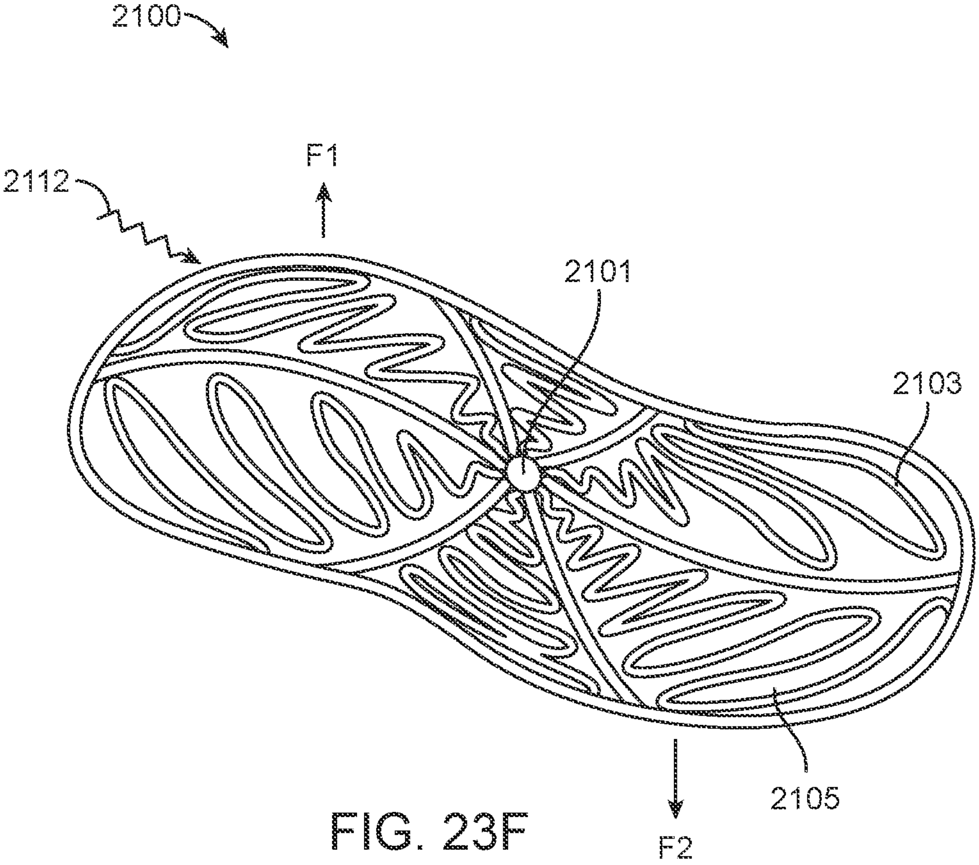

FIGS. 23E and 23 F illustrate movement of the piezoelectric transducer 2100 resulting from receiving caused by an electromagnetic or electrical signal or transmission 2112. The transmission can be an electric current. When the piezoelectric transducer receives such a transmission, some portions of the piezoelectric wires 2103 can move or flex in different directions as shown by arrows F1 and F2. The passive elements or material 2105 that separate the piezoelectric wires 2103 can comprise flexible materials to accommodate for the movement of the piezoelectric wires 2103. FIG. 23E shows a section view of the flat circular piezoelectric transducer 2100 during flexure or movement, FIG. 23F shows a perspective view of the same. Portions of the piezoelectric wires 2103 can flex in different directions F1 and F2, when receiving the transmission 2112. In some cases, the piezoelectric wires 2103 can flex in opposite directions to F1 and F2. In some cases, the portions of the piezoelectric wires 2103 can flex in same direction.

Figure 24:
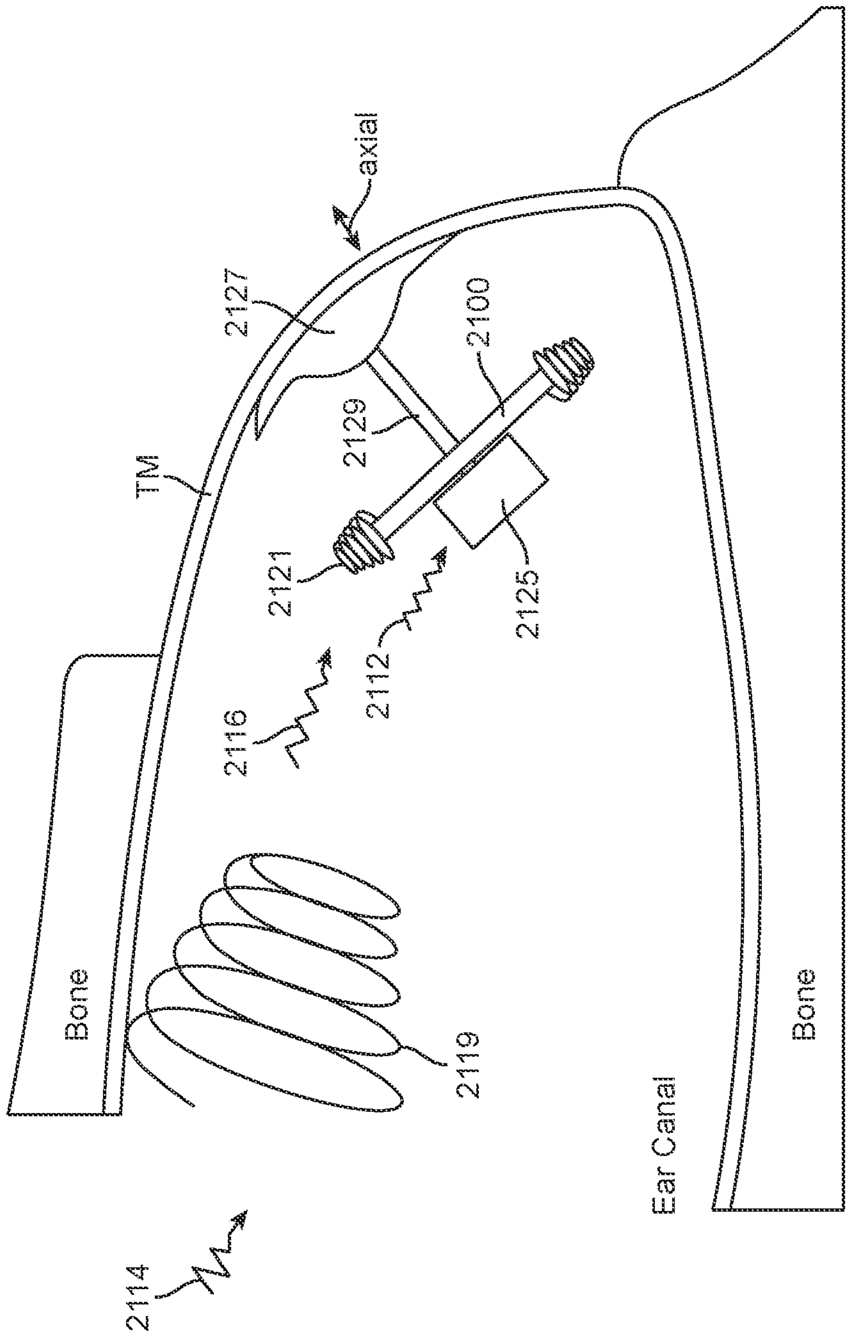
FIG. 24 shows side section view of a contact hearing device, including a drive post and umbo lens, placed in the ear canal adjacent the tympanic membrane, according to the embodiments of the present disclosure.

FIG. 24 shows an actuator assembly placed in the ear canal EC and coupled to the eardrum TM. As described herein, an electromagnetic signal 2116 converted from an external sound 2114 can be transmitted by a transmit coil 2119 and can be received by a receive coil 2121. The receive coil 2121 and/or other circuitry can transfer the signal to a piezoelectric transducer 2100 in form of electric current 2112, and the piezoelectric transducer 2100 can convert the electric transmission to mechanical energy in accord with the sound data in the electromagnetic signal 2116. The mechanical energy may be transferred to the tympanic membrane TM by drive post 2129 and umbo lens 2127 which can be affixed to the tympanic membrane TM, and can cause motion the tympanic membrane TM along the axial direction, transferring the mechanical energy to the cochlea and other portions of the hearing transduction chain such that the user can interpret the mechanical energy as sound. In some embodiments, the actuator assembly can further comprise a floating mass 2125.

Figure 25A:
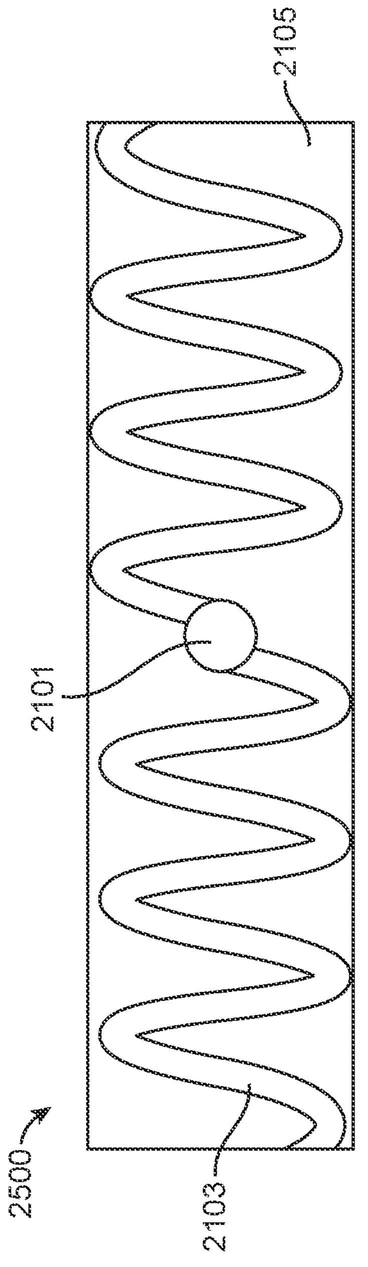
FIGS. 25A-25B illustrate a flat rectangular piezoelectric transducer or actuator.
Figure 25B:
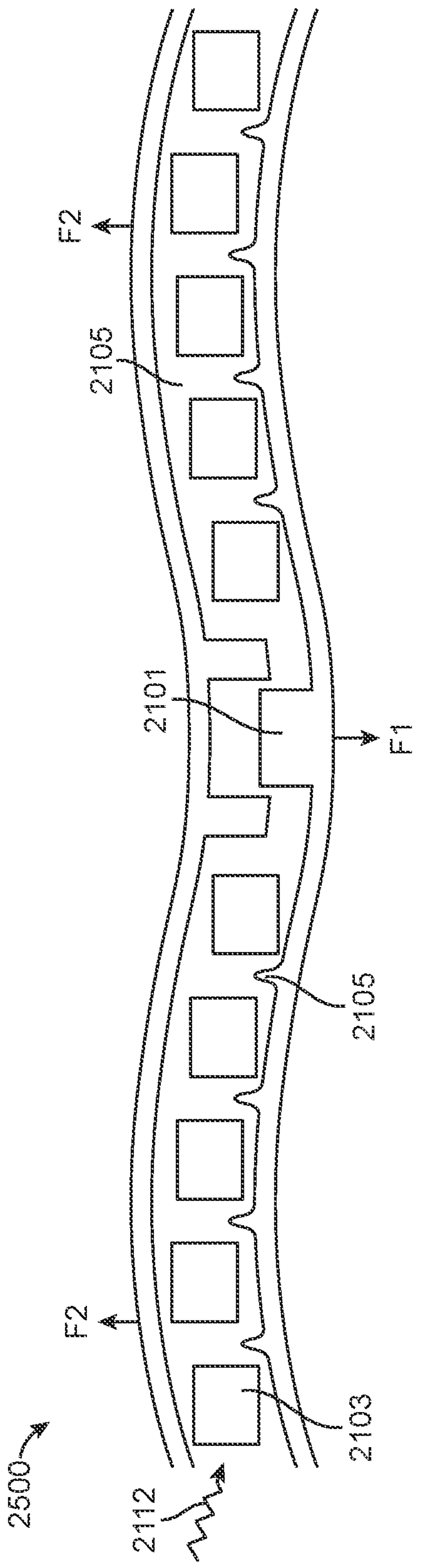

FIGS. 25A-25B show a flat rectangular piezoelectric transducer 2500. FIG. 25A shows a top view of wires 2103 curled in a rectangular shape. The wires 2103 may comprise a piezoelectric material such as PZT. The piezoelectric wire 2103 can be connected to the drive post mount 2101 and separated by passive elements 2105. FIG. 25B shows a side view of the piezoelectric transducer 2500 when an electric current 2112 is run through the piezoelectric wire 2103. Different portions of the wire 2103 can flex with respect to each other in directions as shown by arrows F1 and F2, and cause movement of the piezoelectric transducer 2500. The mechanical movements of the piezoelectric transducer 2500 can be transferred to drive post mount 2101, which may be coupled to an umbo lens to transmit the mechanical movements to the hearing transduction chain of the user to be interpreted as sound. The passive elements or materials 2105 can comprise flexible materials to accommodate the movement of the piezoelectric transducer 2500.

Figure 26B:
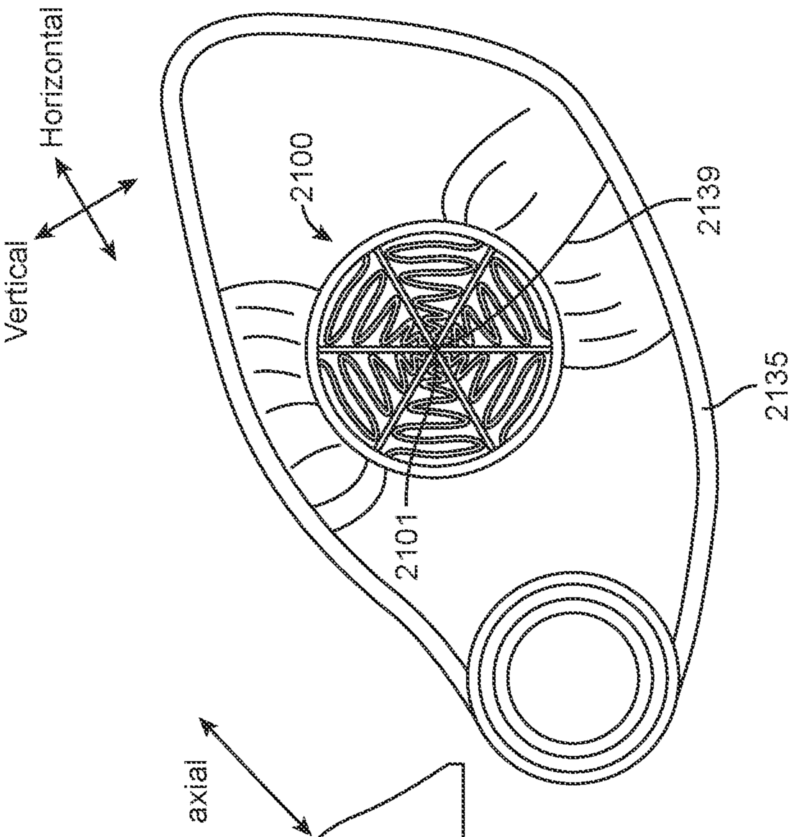
FIGS. 26A-26B illustrate another contact hearing device, according to embodiments of the present disclosure.
Figure 26A:
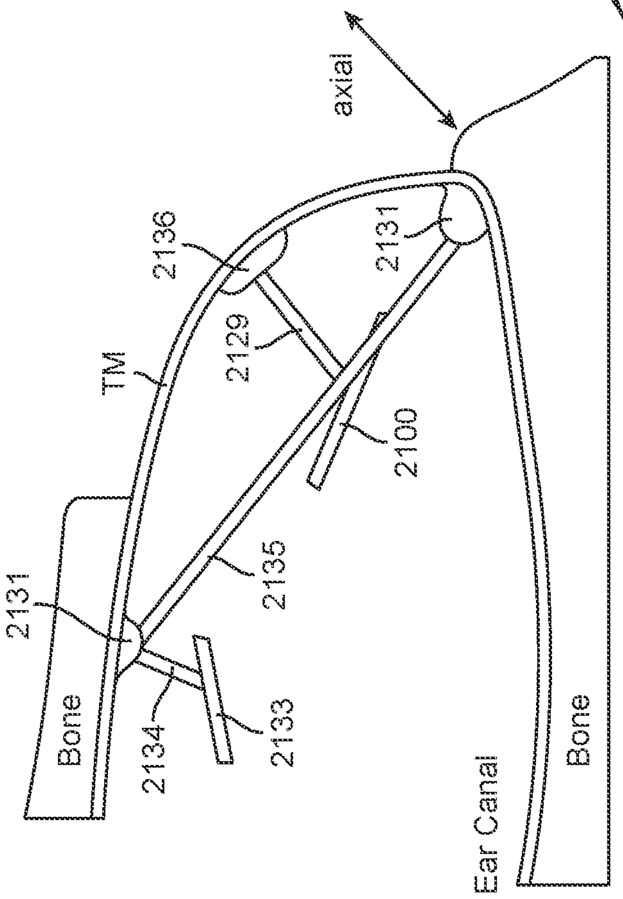

FIG. 26A shows a side view of the flat circular piezoelectric actuator 2100 attached to the ear canal EC by a sulcus or perimeter platform 2131 via a chassis 2135. As described herein, the sulcus or perimeter platform 2131 may also be coupled to the tympanic membrane TM. The flat circular piezoelectric actuator 2100 can be attached to the tympanic membrane TM by a drive post 2129 and umbo lens 2136. The umbo lens 2136 can be attached to the tympanic membrane TM by adhesive. The receive coil 2133 can be coupled to the perimeter platform 2131 by a post 2134. When the receive coil 2133 receives an electromagnetic or electric signal or transmission from a transmit coil, the receive coil 2133 and/or other circuitry can conduct an electric current to the flat circular piezoelectric actuator 2100, which can appropriately vibrate the tympanic membrane TM along axial direction via the drive post 2129 in accord with the sound data in the transmission signal. FIG. 26B shows a top view of the actuator 2137 attached to the chassis 2135. The actuator 2137 can be attached to the drive post via drive post mount 2135 and attached to the chassis 2135 by elastomeric spring elements 2139. The elastomeric spring elements 2139 can dampen the horizontal or vertical motion of the actuator 2137. In some embodiments, the spring elements 2139 may provide mechanical leverage to enhance or otherwise modify the movement provided by the flat piezoelectric actuator 2100. In some embodiments, the spring elements can shape the frequency response of the mechanical output. In some embodiments, the shaped output can provide more output at frequencies typical of hearing loss, especially frequencies between 1 kHz and 12 kHz.

Figure 27B:
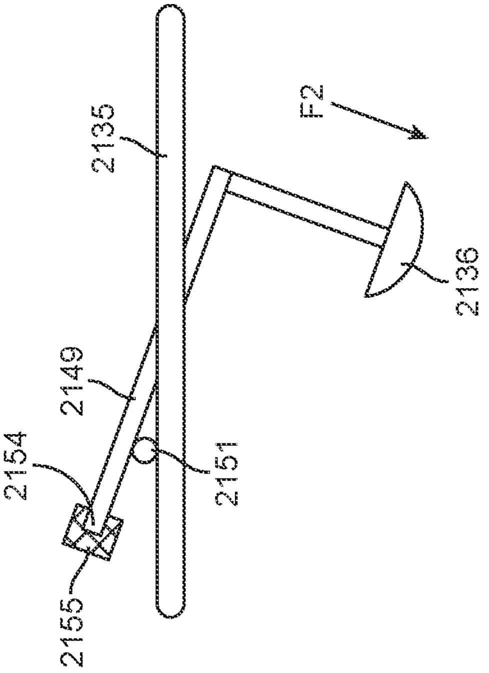
FIGS. 27A-27B shows a further piezoelectric actuator assembly having a flat rectangular piezoelectric actuator or transducer, according to embodiments of the present disclosure.
Figure 27A:
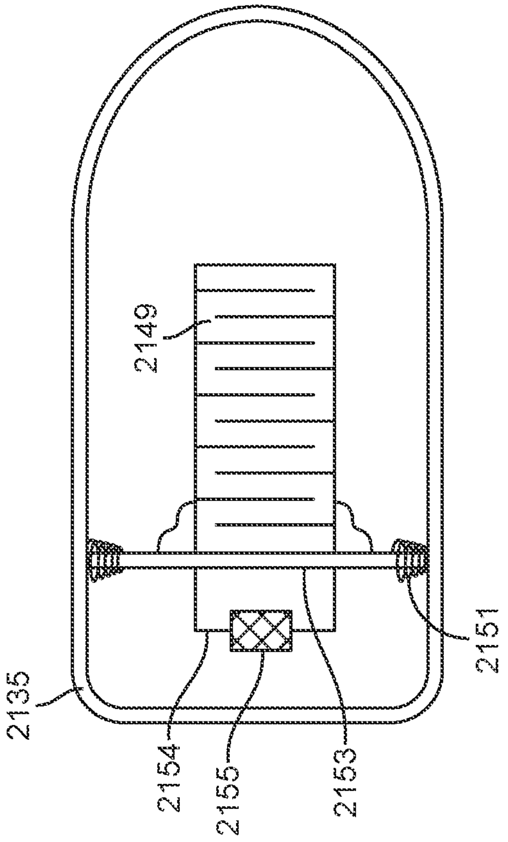
Figure 28A:
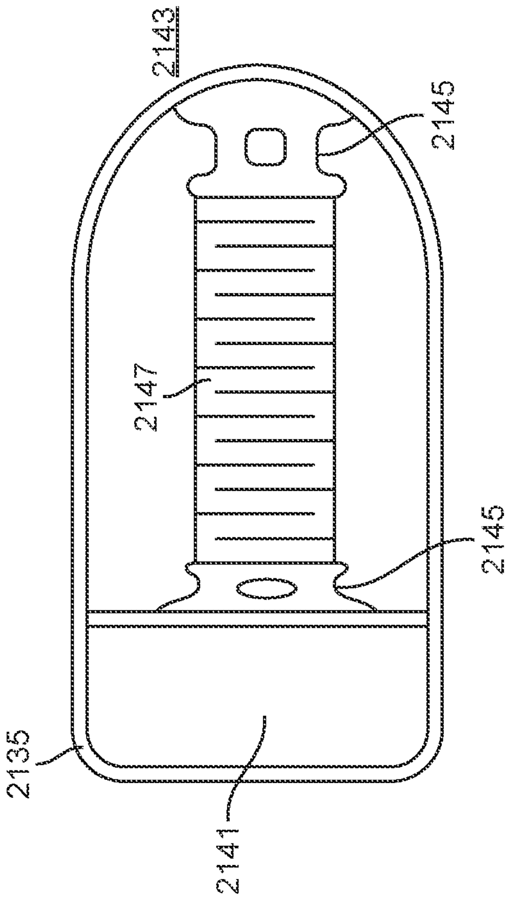
FIGS. 28A-28B show a further piezoelectric actuator assembly having a flat rectangular piezoelectric actuator or transducer, according to embodiments of the present disclosure.
Figure 28B:
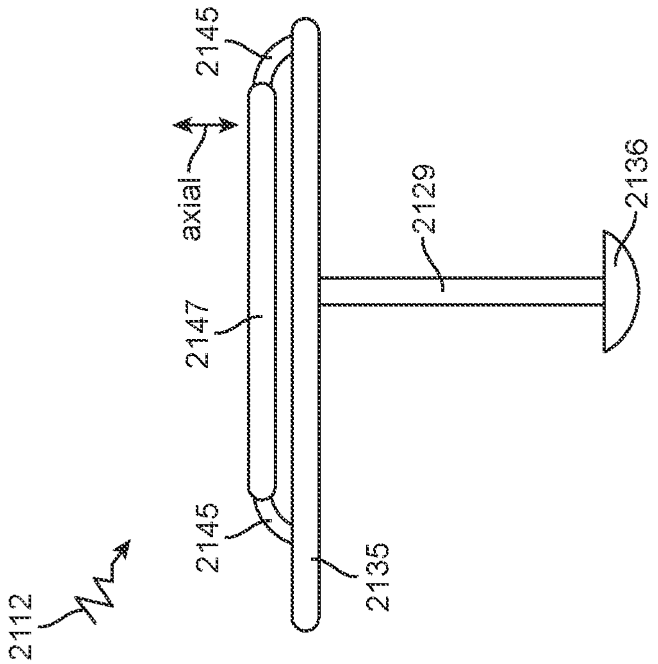

FIG. 27A shows a top view another piezoelectric actuator assembly, which can be similar in many ways to the piezoelectric actuator assembly in FIGS. 26A-26B but with a flat rectangular piezoelectric actuator 2149. The flat rectangular piezoelectric actuator 2149 can be attached to the chassis 2135 at one of its side 2153 by a spring member 2151. The spring member 2151 can comprise a spring and/or a damper to shape the frequency response of the piezoelectric actuator assembly. In some embodiments, the spring member can be filled with silicone gel to act as a damper. A mass 2155 can be coupled to one end 2154 of the actuator 2149 to increase the load on the drive post. FIG. 27B shows a side view of the piezoelectric actuator assembly in FIG. 27A. The actuator 2149 can flex, move, or deform in response to an electrical or electric transmission 2112, which can pivot by the spring hinge 2151 in a direction indicated by the arrow F2. The movement of the actuator can be transferred to the tympanic membrane (not shown) via a drive post 2129 and umbo lens 2136 as described herein FIG. 28A shows a top view another piezoelectric actuator assembly with a flat rectangular piezoelectric actuator 2149, similar to the piezoelectric actuator assembly of FIGS. 27A-27B. The rectangular actuator 2147 can be attached to the chassis 2135 at two sides 2141 and 2143 by spring members 2143. The spring members 2143 can comprise dampening materials to dampen the movement of the actuator in horizontal direction or vertical direction. FIG. 28B shows a side view of the actuator 2147 in FIG. 28A attached the chassis 2135 by dampening spring members 2145. When the actuator 2149 receives a transmission 2112, the actuator 2149 can move along the axial direction and can transfer the mechanical movement to tympanic membrane (not shown) via a drive post 2129 and umbo lens 2136 as described herein.

Many of the above embodiments can be evaluated on an empirical number of patients, for example 10 patients to optimize the transducers, for example transducer mass, positioning, support and circuitry. For example, experiments can be conducted on an empirical number of ten patients to determine improved coupling of sound with differential movement of the first transducer and second transducer. In addition to testing with patients, the embodiments can be tested with computer simulations and laboratory testing. The below described experiments are merely examples of experiments that can be performed, and a person of ordinary skill in the art will recognize many variations and modifications that can be used to improve and optimize the performance of the transducer devices described herein.

IV. Experimental

For exemplary piezoelectric elements, five key characteristics were looked at as a function of geometric parameters. The five parameters were: 1) minimum manufacturable layer thickness, 2) electrical capacitance, 3) $1^{st}$ mechanical resonant frequency (if available), 4) low frequency stiffness, and 5) maximum displacement achievable with a photodetector power source. For each exemplary piezoelectric element, a contour plot of the maximum displacement achievable at 2 kHz was made.

Figure 14A:
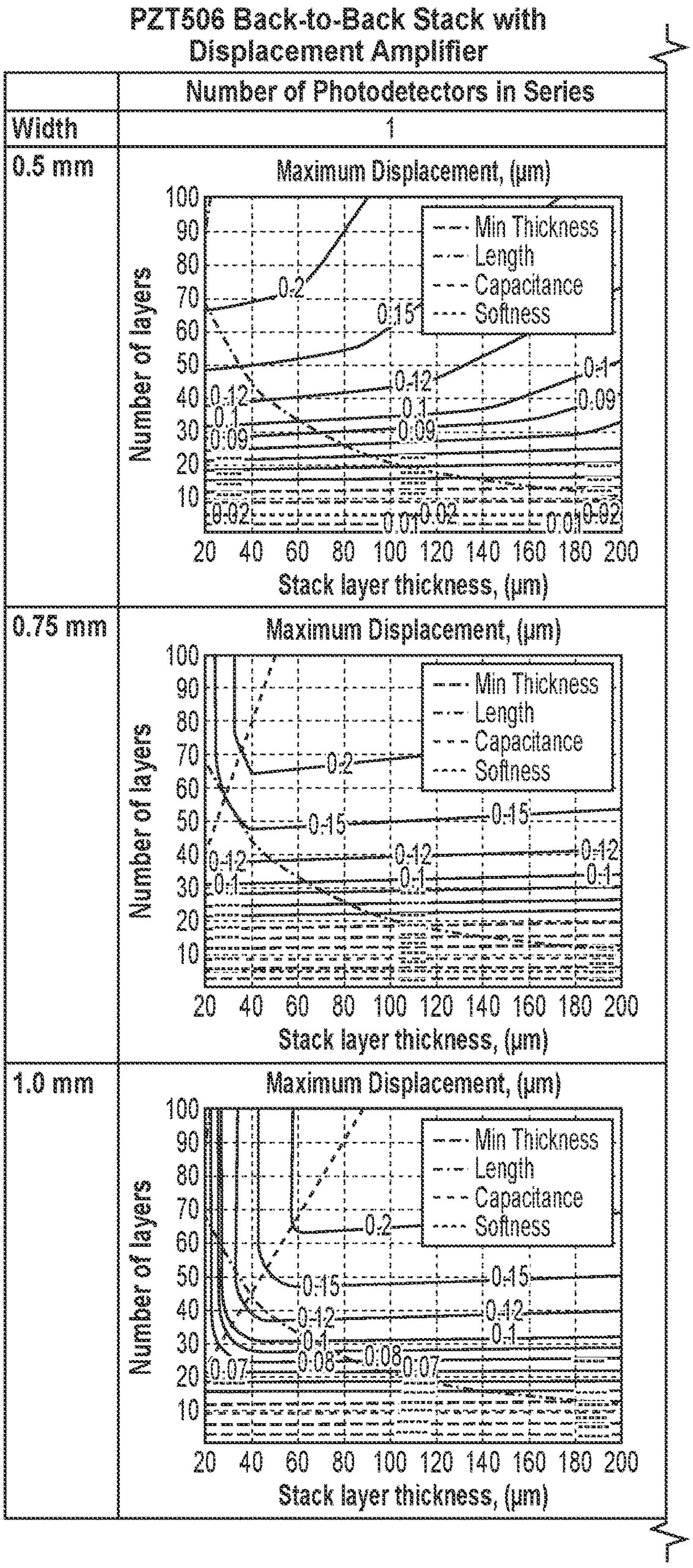
FIGS. 14A, 14B, and 14C show exemplary graphs of simulation results for an output transducers in accordance with the systems of FIGS. 1, 2, and 3A to 5.
Figure 14B:
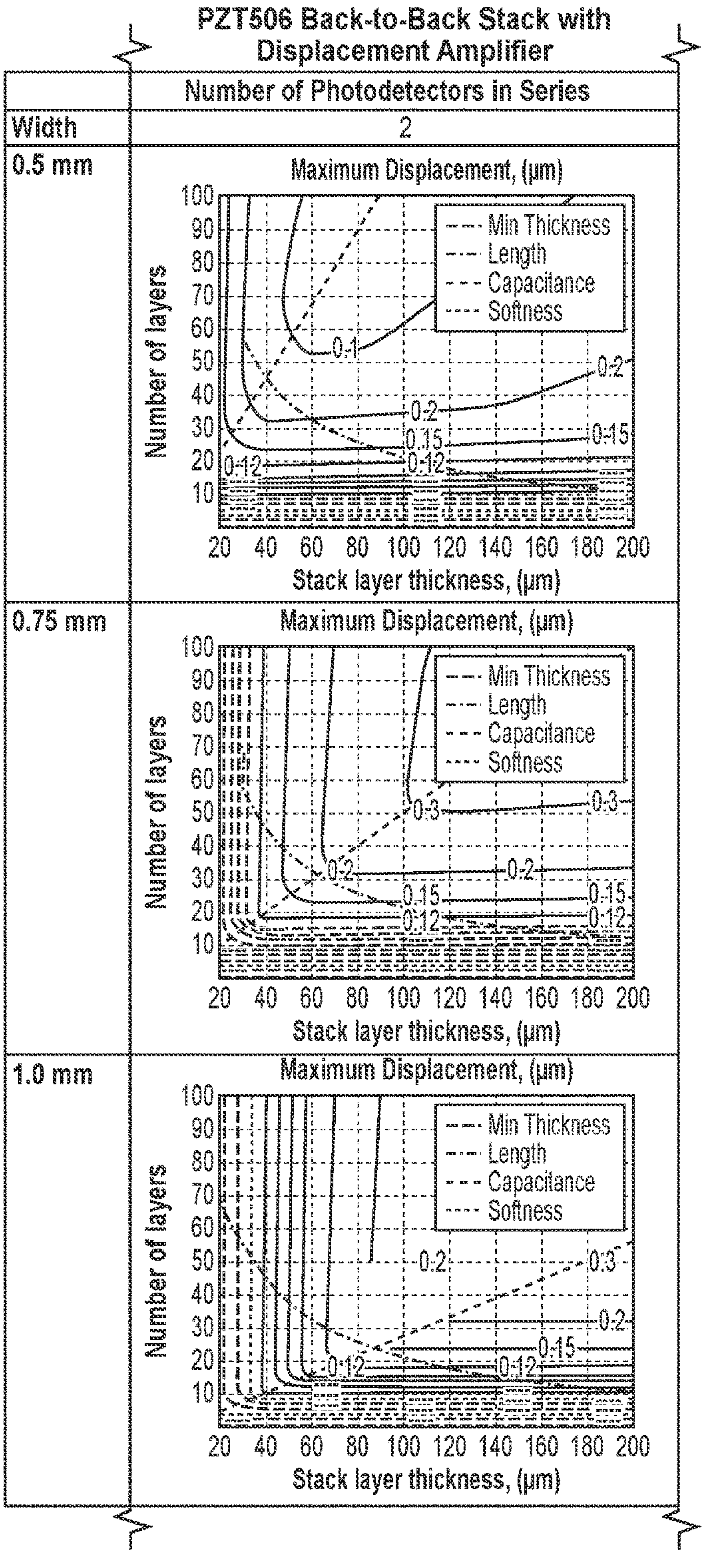
Figure 14C:
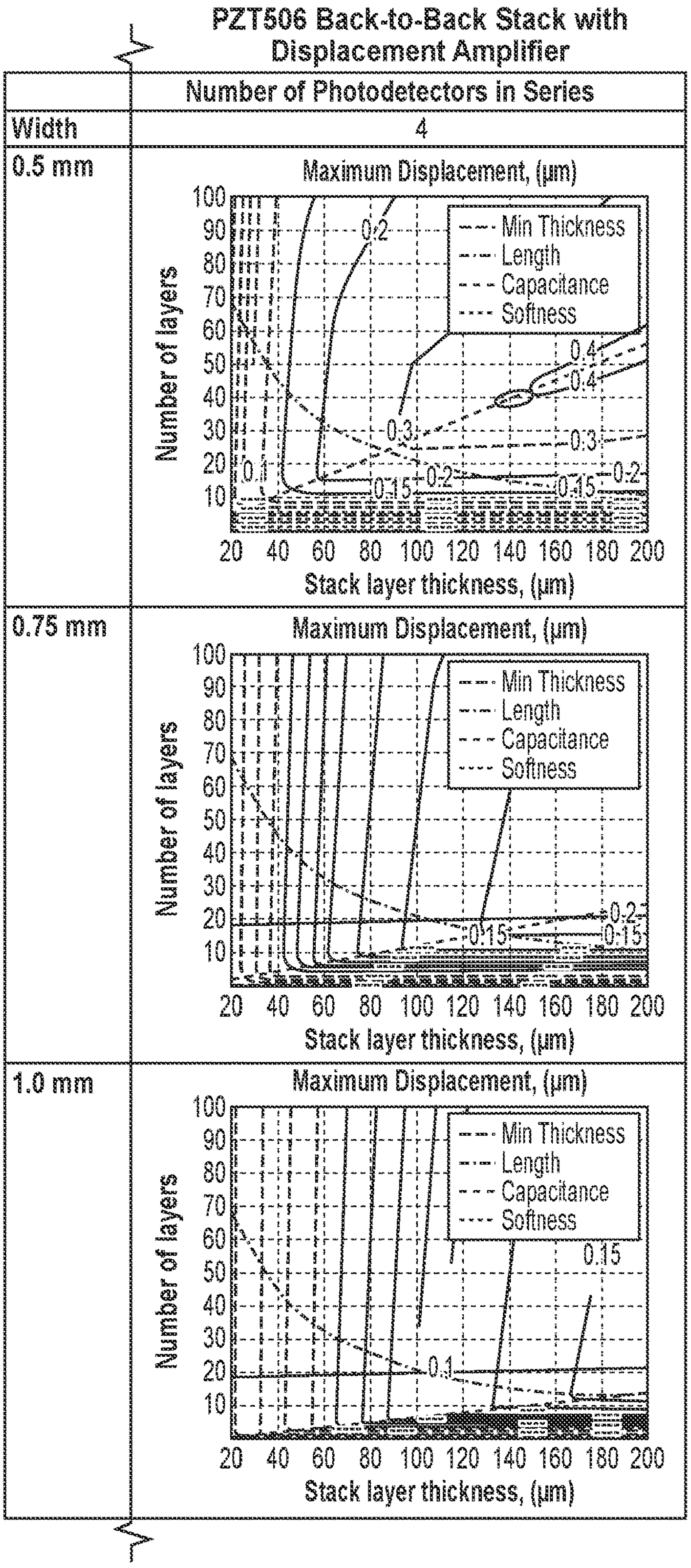

FIGS. 14A-14C show an exemplary contour map for an embodiment of a back-to-back amplified stack piezoelectric elements, a PZT506 back-to-back stack with displacement amplifier. Similar plots can be made for additional embodiments comprising the simply supported bimorph piezoelectric elements, for example a PZT506 simply supported bimorph, a TRS singly crystal simply supported bimorph, and a PVDF simply supported bimorph piezoelectric elements. FIGS. 14A-14C include combinations of different numbers of photodetectors used to power the piezoelectric element and the width of the piezoelectric element. The displacement shown accounts for the electrical limitations of the photovoltaic power source as well as any mismatch between the impedance of the umbo and the stiffness of the driving piezo. Equation 1 and Table 6 below show the equation for the maximum displacement and the parameter definitions.

$$d_{max} = \left(\frac{d}{V}\right)R\left(\frac{K_{pz}}{K_{pz} + R^2 Z_{umbo}}\right)\min\left(N_{PD}V_{max}\cdot\frac{\left(\frac{I_{max}}{N_{PD}}\right)}{2\pi f_1 C}\right) \quad \text{EQUATION 1}$$

TABLE 6

| EXEMPLARY TEST PARAMETERS | |
|---|---|
| Parameter | Value |
| $f_{max}$' | Maximum frequency of interest (10 kHz) |
| $f_1$' | 2 kHz - frequency used to optimize design |
| R | Lever ratio |
| $K_{gg}$ | Low frequency stiffness of piezo |
| $Z_{umbo}$ | Impedance of umbo at $f_1$ |
| $\frac{d}{V}$ | Displacement per volt of a given design |
| $N_{PD}$ | Number of photocells in series |
| $V_{max}$ | Maximum voltage of single photocell (0.4 V) |
| $I_{max}$ | Maximum current of single photocell given the illumination constraints (224 uA) |
| C | Capacitance of a given design |
| min(x,y) | Minimum function which takes the minimum of the two arguments (x,y) |

On top of the contour map shown, other parameters are shown as "constraint lines". For example, the minimum manufacturable thickness is represented as a line. Any design point falling below or to the right of this line may be achievable. Any design point falling above or to the left calls for a layer thickness that is not currently available from any of the contacted vendors. Often, only integer numbers of layers are possible. Similarly, the capacitance is shown in a line. Any design falling below or to the right of this line has less than the optimal capacitance for 2 kHz. Any design above or to the left has a higher capacitance. At this point, one must remember that the displacement contours are shown at 2 kHz. At different frequencies, there will be a different optimal capacitance. (Optimizing for higher frequencies will require smaller capacitances.) Designs that have a 1st mechanical resonance of 10 kHz are shown as a line. Designs to the right have higher resonant frequencies; designs to the left have lower resonant frequencies. Designs that have a low frequency stiffness equal to the umbo stiffness at 10 kHz are shown with a line. Designs to the right have higher stiffnesses; designs to the left have lower stiffnesses. In exemplary embodiments, piezoelectric element parameters that are below and to the right of all the constraint lines while at the same time maximizing location on the displacement contour are chosen. Contour maps can be made for embodiments of bimorph piezoelectric transducers using the parameters set forth in Table 7.

TABLE 7

| EXEMPLARY TEST PARAMETERS FOR BIMORPH PIEZOELECTRICS | | | |
|---|---|---|---|
| Parameter | PZT506 | TRS-Single Crystal | PVDF |
| $E_{11}$ | 64.5 GPa | 11.6 GPa | 3.0 GPa |
| $\underline{d}_{g2}$ | 225 pm/V | 1000 pm/V | 20 pm/V |
| $\underline{\varepsilon}_{g2}$ | 2250 | 7700 | 12 |
| ρ | 8000 Kg/m$^3$ | 7900 Kg/m$^3$ | 1780 Kg/m$^3$ |
| Minimun layer thickness | 20 μm | 140 μm | 2 μm |
| Lever Ratio | 1.0 | 1.0 | 1.0 |
| L | 5 mm | 5 mm | 5 mm |

Contour maps can be made for embodiments of simply supported bimorph piezoelectrics using the parameters set forth in Table 8. The bimorph with the greatest displacement that meets all of the constraints may be selected. Exemplary embodiments SSBM1, SSBM2, SSBM3, SSBM4, SSBM5, SSBM6, SSBM7, SSBM8, SSBM12, SSBM15, and SSBM18 give displacements greater than 0.1 um at 2 kHz.

TABLE 8

DISPLACEMENT MEASUREMENTS FOR EXEMPLARY BIMORPH PIEZOELECTRIC EMBODIMENTS

| Embodiment | Material | Beam width | Number of photodetectors | Beam ½ thickness | Number of layers | Layer thickness | Maximum displacement |
|---|---|---|---|---|---|---|---|
| SSBM1 | PZT506 | 0.5 mm | 1 | 120 um | 6 | 20 um | 0.15 um |
| SSBM2 | PZT506 | 0.5 mm | 2 | 120 um | 4 | 30 um | 0.16 um |
| SSBM3 | PZT506 | 0.5 mm | 3 | 120 um | 3 | 40 um | 0.15 um |
| SSBM4 | PZT506 | 1.0 mm | 1 | 100 um | 4 | 25 um | 0.15 um |
| SSBM5 | PZT506 | 1.0 mm | 2 | 100 um | 2 | 50 um | 0.15 um |
| SSBM6 | PZT506 | 1.0 mm | 3 | 100 um | 1 | 100 um | 0.12 um |
| SSBM7 | PZT506 | 1.5 mm | 1 | 100 um | 3 | 33 um | 0.12 um |
| SSBM8 | PZT506 | 1.5 mm | 2 | 100 um | 2 | 50 um | 0.14 um |
| SSBM9 | PZT506 | 1.5 mm | 3 | 100 um | 1 | 100 um | 0.09 um |
| SSBM10 | TRS-SC | 0.5 mm | 1 | 280 um | 2 | 140 um | 0.045 um |
| SSBM11 | TRS-SC | 0.5 mm | 2 | 280 um | 2 | 140 um | 0.09 um |
| SSBM12 | TRS-SC | 0.5 mm | 3 | 280 um | 2 | 140 um | 0.13 um |
| SSBM13 | TRS-SC | 1.0 mm | 1 | 280 um | 2 | 140 um | 0.05 um |
| SSBM14 | TRS-SC | 1.0 mm | 2 | 280 um | 2 | 140 um | 0.09 um |
| SSBM15 | TRS-SC | 1.0 mm | 3 | 230 um | 1 | 230 um | 0.10 um |
| SSBM16 | TRS-SC | 1.5 mm | 1 | 280 um | 2 | 140 um | 0.045 um |
| SSBM17 | TRS-SC | 1.5 mm | 2 | 230 um | 1 | 230 um | 0.07 um |
| SSBM18 | TRS-SC | 1.5 mm | 3 | 230 um | 1 | 230 um | 0.10 um |
| SSBM19 | PVDF | 2.0 mm | 2 | 210 um | 34 | 6.2 um | 0.045 um |
| SSBM20 | PVDF | 2.0 mm | 3 | 210 um | 16 | 13.1 um | 0.045 um |
| SSBM21 | PVDF | 3.0 mm | 2 | 210 um | 27 | 7.8 um | 0.04 um |
| SSBM22 | PVDF | 3.0 mm | 3 | 210 um | 14 | 15 um | 0.04 um |

The PZT506 material appears to be the suitable for making the bimorph. Its combination of thin layer thicknesses, high piezoelectric constants and moderate permittivity provides a suitable best output. Also, it appears that a wide range of beams all produce roughly the same output, 0.15 um. Choosing between these options can be based on tradeoffs of manufacturing. For example, layers in the bimorph can be traded-off against segmenting the photodetector.

Contour maps can be made for embodiments of back-to-back amplified stack piezoelectric elements, a TRS single crystal back-to-back stack with displacement amplifier, respectively. A displacement amplified stack piezoelectric elements may comprise a scissor jack with two stacks placed back-to-back pushing outwards. In this configuration, the centerline of the assembly does not move. Therefore, the maximum stack length to consider for displacement purposes is 2.5 mm or half of the maximum allowable dimension. However, the effective capacitance may be needed to account for both stacks. The lever ratio may be limited to be between 1 and 15. In between those limits, the stiffness of the stack can be matched to the impedance of the umbo at 10 kHz. Since the number of layers in a stack is high, the thickness of the glue/electrodes between layers may need to be considered. For example, a glue/electrode layer thickness of 16 um may be used. Like with simply supported bimorph piezoelectric elements above, amplified stack piezoelectric elements were analyzed at a variety of thicknesses and assuming various numbers of photodetectors in series. Neither the stiffness nor the $1^{st}$ resonance of the stack was a limiting factor while layer thickness, capacitance and length may be limiting factors.

Table 9 below shows some exemplary ranges of parameters for embodiments of back-to-back amplified stack piezoelectric elements.

TABLE 9

EXEMPLARY TEST PARAMETERS FOR BACK-TO-BACK STACK PIEZOELECTRICS

| Parameter | PZT506 | TRS-Single Crystal |
|---|---|---|
| $E_{11}$ | 64.5 GPa | 11.6 GPa |
| $d_{g2}$ | 545 pm/V | 1900 pm/v |
| $\bar{\varepsilon}_{g2}$ | 2250 | 7700 |
| ρ | 8000 Kg/m$^3$ | 7900 Kg/m$^3$ |
| Minimun layer thickness | 20 μm | 140 μm |
| Lever Ratio | 1.0 to 15.0 | 1.0 to 15.0 |
| L | 2.5 mm | 2.5 mm |

Table 10 below shows parameters for several embodiments of back-to-back amplified stack piezoelectric elements. Both the single crystal material and the PZT506 material appear to have maximum outputs near 0.3 um. Several embodiments of back-to-back amplified stack piezoelectric elements produce similar amounts of displacement. Thus, there May be flexibility in manufacturing.

TABLE 10

DISPLACEMENT MEASUREMENTS FOR EXEMPLARY BACK-TO-BACK STACK PIEZOELECTRIC EMBODIMENTS

| Material | Stack width | Number of photo detectors | Number of layers | Layer thick-ness | Maximum dis-placement |
|---|---|---|---|---|---|
| PZT506 | 0.5 mm | 1 | 65 | 20 μm | 0.2 μm |
| PZT506 | 0.5 mm | 2 | 45 | 40 μm | 0.23 μm |
| PZT506 | 0.5 mm | 4 | 25 | 90 μm | 0.28 μm |
| PZT506 | 0.75 mm | 1 | 58 | 30 μm | 0.15 μm |
| PZT506 | 0.75 mm | 2 | 32 | 65 μm | 0.18 μm |
| PZT506 | 0.75 mm | 4 | 16 | 135 μm | 0.20 μm |
| PZT506 | 1.0 mm | 1 | 45 | 40 μm | 0.13 μm |
| PZT506 | 1.0 mm | 2 | 25 | 70 μm | 0.15 μm |
| PZT506 | 1.0 mm | 4 | 12 | 180 μm | 0.16 μm |
| TRS-SC | 0.5 mm | 1 | 17 | 140 μm | 0.1 μm |
| TRS-SC | 0.5 mm | 2 | 17 | 140 μm | 0.2 μm |
| TRS-SC | 0.5 mm | 4 | 14 | 170 μm | 0.31 μm |
| TRS-SC | 0.75 mm | 1 | 17 | 140 μm | 0.14 μm |
| TRS-SC | 0.75 mm | 2 | 17 | 140 μm | 0.28 μm |
| TRS-SC | 0.75 mm | 4 | 9 | 260 μm | 0.31 μm |
| TRS-SC | 1.0 mm | 1 | 17 | 140 μm | 0.15 μm |
| TRS-SC | 1.0 mm | 2 | 14 | 175 μm | 0.25 μm |
| TRS-SC | 1.0 mm | 4 | 7 | 350 μm | 0.28 μm |

Embodiments of piezoelectric elements were also tested using a laser vibrometer to measure the velocity (and hence the displacement) of a target. Data was analyzed to yield displacement per volt and plotted versus frequency. Data was determined using the equations mentioned above and plotted alongside the test data.

Figure 15A:
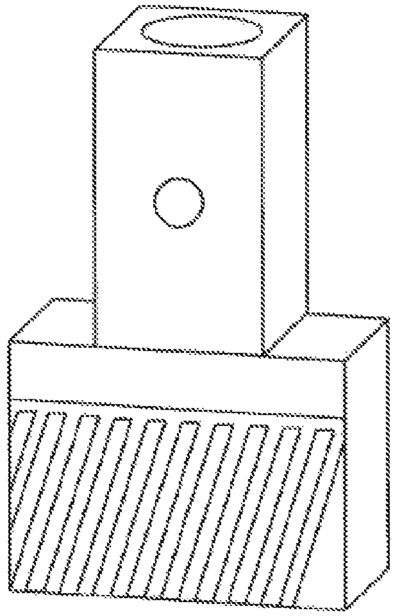
FIG. 15A shows a perspective view of a stacked piezo and FIG. 15B shows a plot of displacement per voltage for the stacked piezo of FIG. 15A.
Figure 15B:
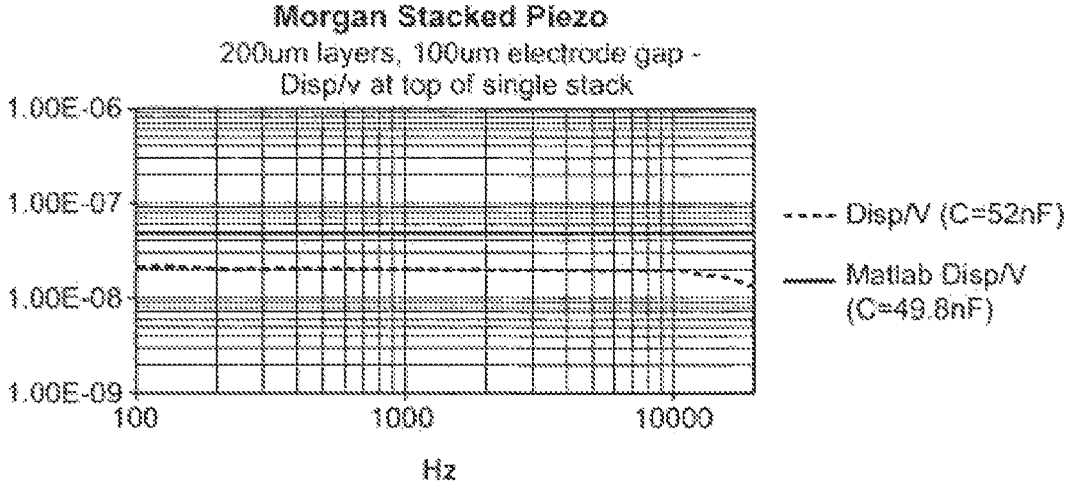

A single Morgan stacked as shown in FIG. 15A was tested. The parameters for the single Morgan stack piezo are shown in Table 11 below. A plot of the test data, including displacement versus voltage, is shown in FIG. 15B.

TABLE 11

EXEMPLARY PARAMETERS FOR MORGAN STACKED PIEZO

| Parameter Material | Value Morgan PZT506 |
|---|---|
| Piezo Dimensions | 1 × 1 × 1.8 mm |
| Layer Thickness | 20 μm |
| Number of Layers | 50 |
| E11 | 6.45e10 |
| d33 | 545e-12 |
| d31 | −225e-12 |
| Density | 8000 |
| Relative Permittivity | 2250 |
| Kp (coupling factor) | 0.70 |
| Input Voltage | 1V |
| Input Frequency range | 100-20000 Hz |
| Measured capacitance | 52 nF |
| Calculated capacitance | 49.8 nF |

Figure 16A:
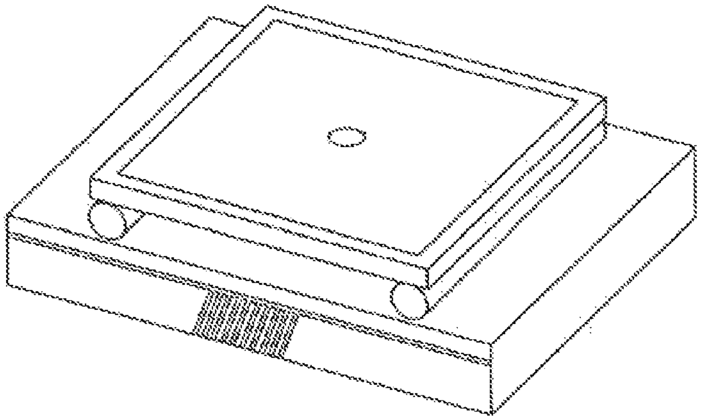
FIG. 16A shows a perspective view of a series bimorph and FIG. 16B shows a plot of displacement per voltage for the series bimorph of FIG. 16A.
Figure 16B:
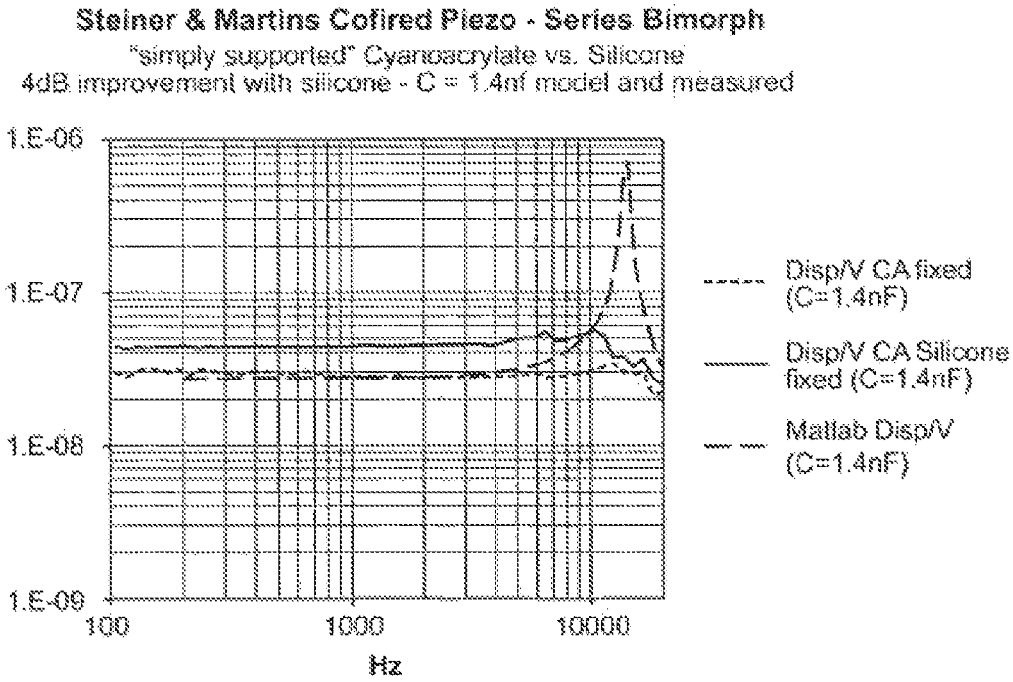

A Steiner and Martins cofired Piezo series bimorph as shown in FIG. 16A was tested. The parameters for the single Morgan stack are shown in Table 12 below. A plot of the test data, including displacement versus voltage, is shown in FIG. 16B. Affixing the piezo using a flexible material increased the vibrational displacement by a few dB.

TABLE 12

EXEMPLARY PARAMETERS FOR STEINER AND MARTINS COFIRED PIEZO - SERIES BIMORPH

| Parameter Material | Value STEMInc SMQA |
|---|---|
| Piezo Dimensions | 7 mm × 7 mm |
| Layer Thickness | 200 μm |
| E11 | 8.6e10 |
| d33 | 310e-12 |
| d31 | −140e-12 |
| Density | 7900 |
| Relative Permittivity | 1400 |
| Kp (coupling factor) | 0.58 |
| Input Voltage | 1V |
| Input Frequency range | 100-20000 Hz |
| Measured capacitance | 1.4 nF |
| Calculated capacitance | 1.4 nF |

Figure 17A:
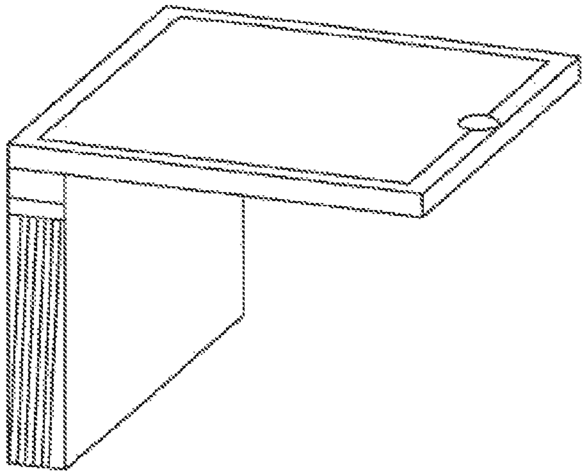
FIG. 17A shows a perspective view of a single crystal bimorph cantilever and FIG. 17B shows a plot of displacement per voltage for the single crystal bimorph cantilever of FIG. 17A.
Figure 17B:
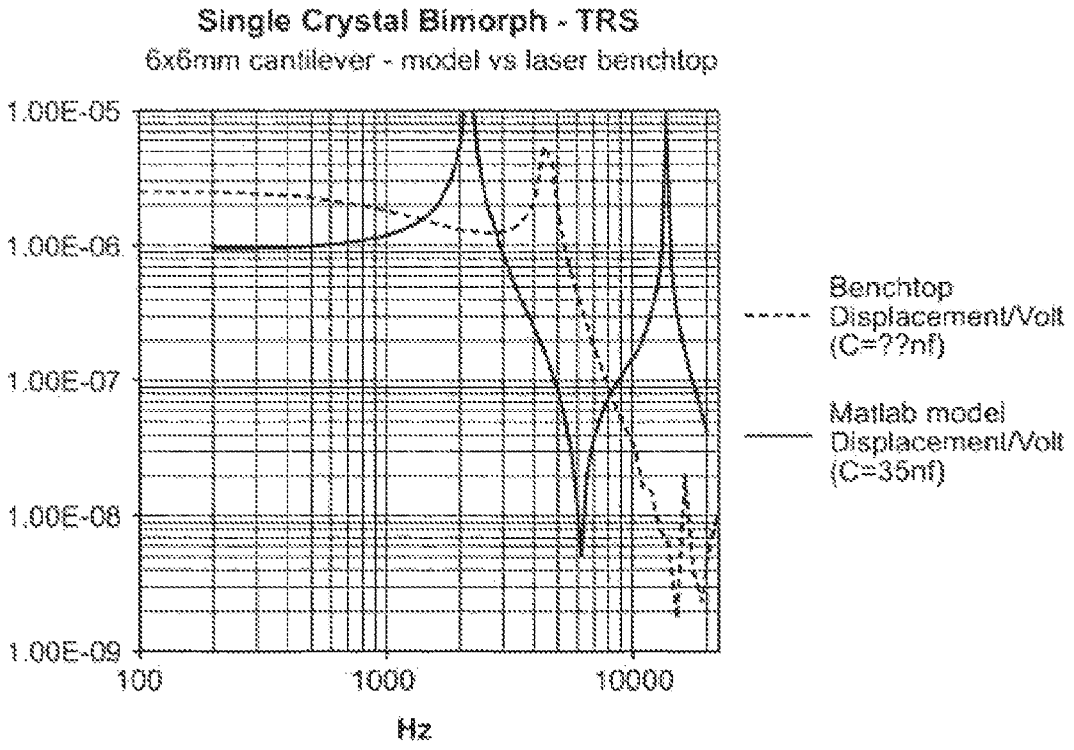

A TRS Single Crystal Bimorph Cantilever as shown in FIG. 17A was tested. The parameters for the single Morgan stack are shown in Table 13 below. The parameters may comprise known parameters and can be measured by one of ordinary skill in the art. A plot of the test data, including displacement versus voltage, is shown in FIG. 17B.

TABLE 13

EXEMPLARY PARAMETERS FOR TRS SINGLE CRYSTAL BIMORPH CANTILEVER

| Parameter Material | Value TRS single crystal |
|---|---|
| Piezo Dimensions | 6mm × 6mm |
| Layer Thickness | 140 μm |
| Ell | 1.16e10 |
| d33 | 1900e-12 |
| d31 | −1000e-12 |
| Density | 7900 |
| Relative Permittivity | 7700 |
| Input Voltage | 1V |
| Input Frequency range | 100-20000Hz |
| Measured capacitance | nF |
| Calculated capacitance | 35nF |

Figure 18A:
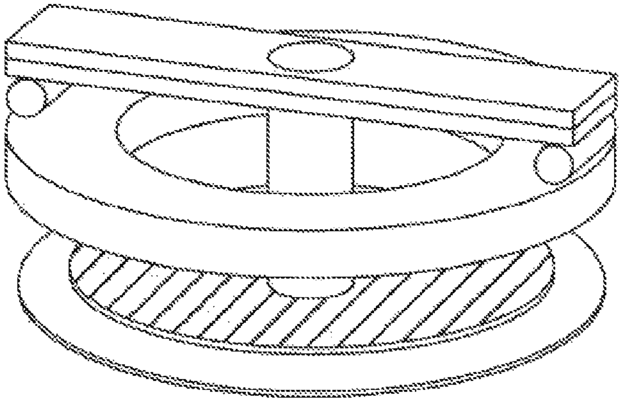
FIG. 18A shows a perspective view of a bimorph on a washer and FIG. 18B shows a plot of displacement per voltage for the bimorph on a washer of FIG. 18A.
Figure 18B:
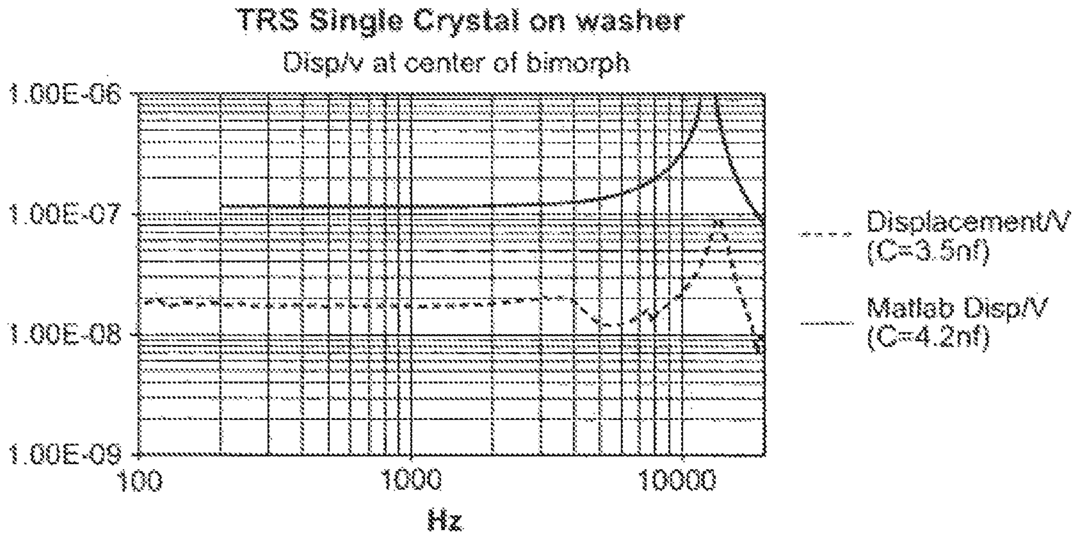

A TRS Single Crystal Bimorph on a washer as shown in FIG. 18A was tested. The parameters for the single Morgan stack are shown in Table 14 below. A plot of the test data, including displacement versus voltage, is shown in FIG. 18B. In this test, the resonance is in the predicted frequency but the magnitude is off by nearly 20 dB. The capacitance is also off, so the piezo may be damaged.

TABLE 14

EXEMPLARY PARAMETERS FOR TRS SINGLE CRYSTAL ON WASHER

| Parameter Material | Value TRS single crystal |
|---|---|
| Piezo Dimensions | 1 mm × 5mm |
| Layer Thickness | 140 μm |
| Eli | 1.16e10 |
| d33 | 1900e-12 |
| d31 | −1000e-12 |
| Density | 7900 |
| Relative Permittivity | 7700 |
| Input Voltage | 1V |

TABLE 14-continued

EXEMPLARY PARAMETERS FOR TRS SINGLE CRYSTAL ON WASHER

| Parameter Material | Value TRS single crystal |
|---|---|
| Input Frequency range | 100-20000Hz |
| Measured capacitance | 3.6nF |
| Calculated capacitance | 4.2nF |

Figure 19A:
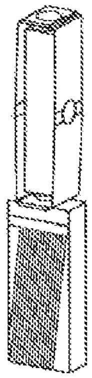
FIG. 19A shows a perspective view of a stacked piezo pair.
Figure 19B:
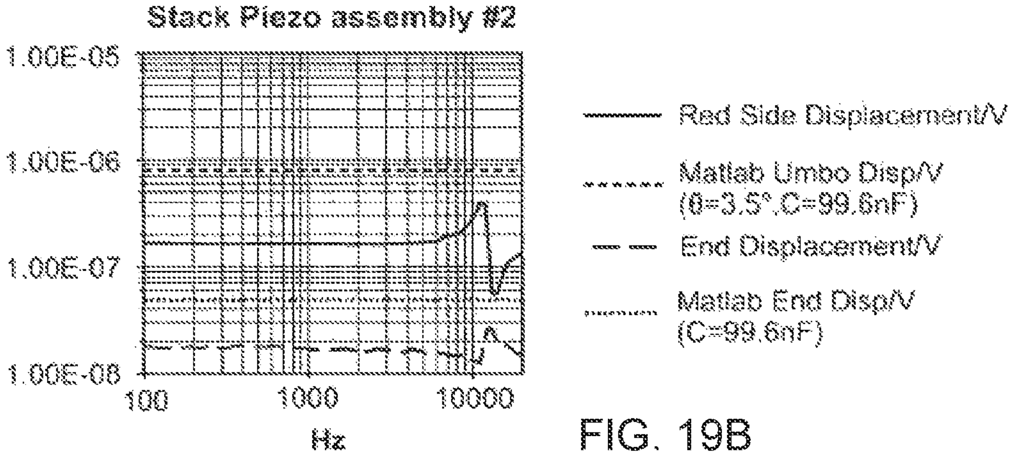
FIG. 19B shows a plot of displacement per voltage for the stacked piezo pair of FIG. 19A.
Figure 19C:
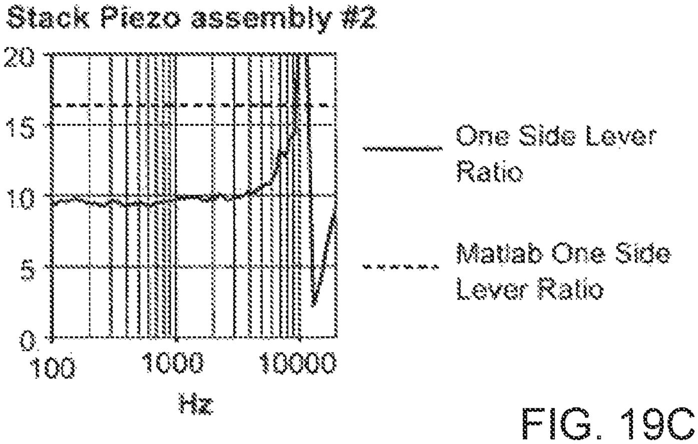
FIG. 19C shows a plot of lever ratio for the stacked piezo pair of FIG. 19C.

A stacked piezo pair with V-jack type displacement amplification as shown in FIG. 19A was tested. The parameters for the single Morgan stack are shown in Table 15 below. A plot of the test data, including displacement versus voltage, is shown in FIGS. 19B and 19C. In this test, an additional resonance appears which may most likely a resonance in the mechanical lever.

TABLE 15

EXEMPLARY PARAMETERS FOR STACKED PIEZO PAIR WITH V-JACK DISPLACEMENT AMPLIFICATION

| Parameter Material | Value Morgan PZT506 |
|---|---|
| Piezo Dimensions | 1 × 1 × 3.6 mm |
| Lever angle, lever ratio | 3.5°, 16X |
| Layer Thickness | 20 μm |
| Number of Layers | 100 |
| Ell | 6.45e10 |
| d33 | 545e-12 |
| d31 | −225e-12 |
| Density | 8000 |
| Relative Permittivity | 2250 |
| Kp (coupling factor) | 0.70 |
| Input Voltage | 1V |
| Input Frequency range | 100-20000Hz |
| Measured capacitance | 104nF |
| Calculated capacitance | 99.6nF |

Embodiments of output transducers which were placed on a subject's eardrum were tested. The transducer was wire driven, connected directly to the audiometer to determine the acoustic threshold. In order to reduce the effect of the wires, 48 AWG wire was used between the transducer and a location just outside the ear canal. The position of the transducer was verified by a physician using a video otoscope.

Once in place, the audiometer driven transducer was energized across a 12k, C2 load and the audiometer setting adjusted to reach threshold. The threshold was recorded at each frequency tested. After the testing was complete and the transducer removed from the subject's ear, the transducer was reconnected to the audiometer and the voltage measured. Often, the audiometer setting was increased by 40 dB to make a reliable measurement.

The data collected was converted to pressure equivalent using Minimum Audible Pressure curves and plotted against the specifications, bench-top data and average electromagnetic or EM system output. In all cases, the assumption is that the input to the transducer is 0.4V peak and 75 mW. The bench-top data was determined by measuring the unloaded displacement and comparing to the known displacement of the umbo at each frequency plotted.

In addition to the threshold measurements, the feedback pressure was measured at two locations: at the umbo and at the entrance to the ear canal. Often, the transducer was driven by a laptop running SYSid, and operated at 1V peak, with the feedback measured with an ER-7c microphone. The resulting data gives a measure of the gain margin for each transducer design/location if the microphone is located either deep in the canal or at the canal entrance.

Figure 20A:
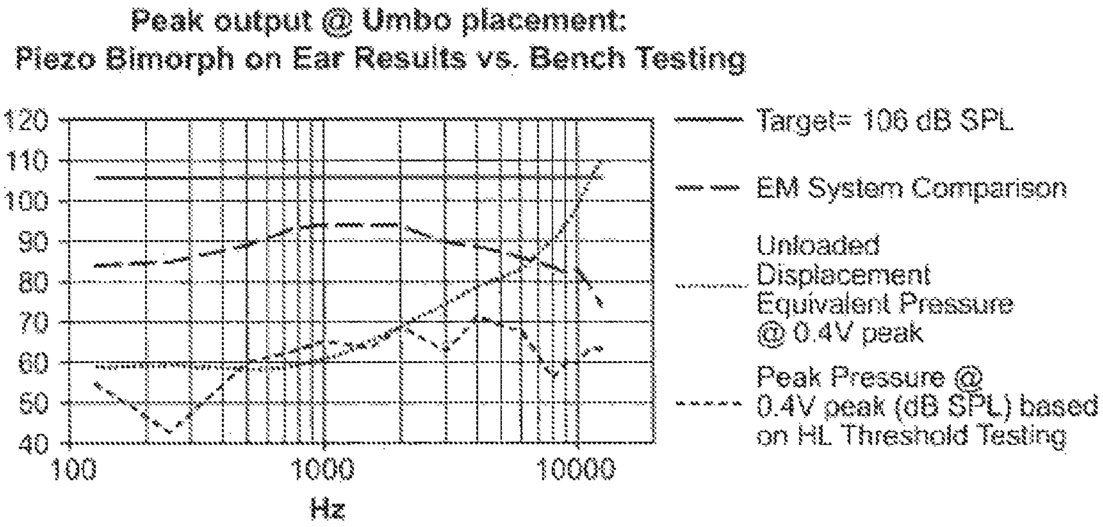
FIG. 20A shows a plot of peak output for a bimorph piezo placed on the umbo.
Figure 20B:
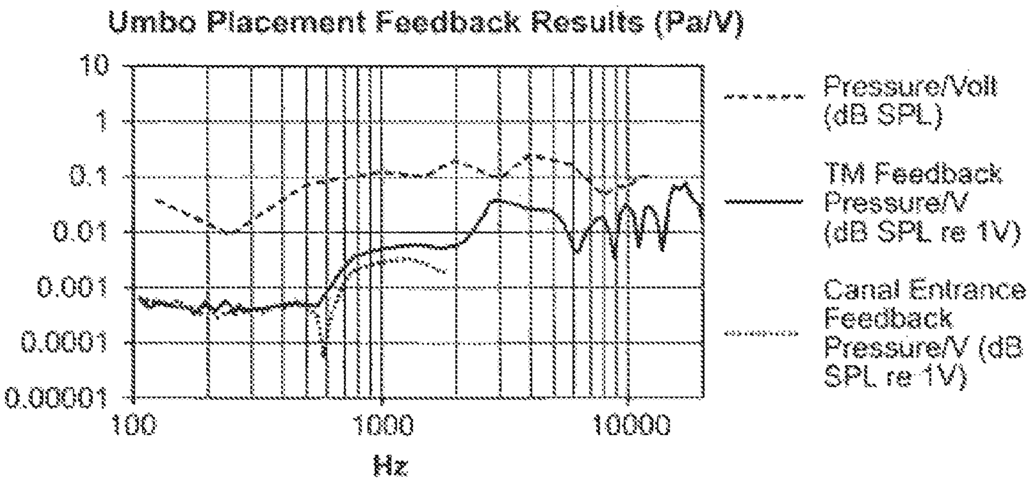
FIG. 20B shows a plot of feedback for a bimorph piezo placed on the umbo.

FIGS. 20A-23B show peak power output and feedback for the tested embodiments of output transducers. Although an idealized target peak power output of 106 dB is shown for purposes of comparison, peak power outputs of less than 106 dB, for example 80 or 90 dB at 10 kHz, can provide improved hearing for many patients. FIGS. 20A and 20B show peak power output and feedback, respectively, of a TRS single crystal bimorph placed on the umbo. The on ear results match the bench top predictions up to 2 kHz, then diverge, with the on-ear results remaining flat up to 12 kHz. The umbo located transducer used a different piezo than the center of pressure located transducer.

Figure 21A:
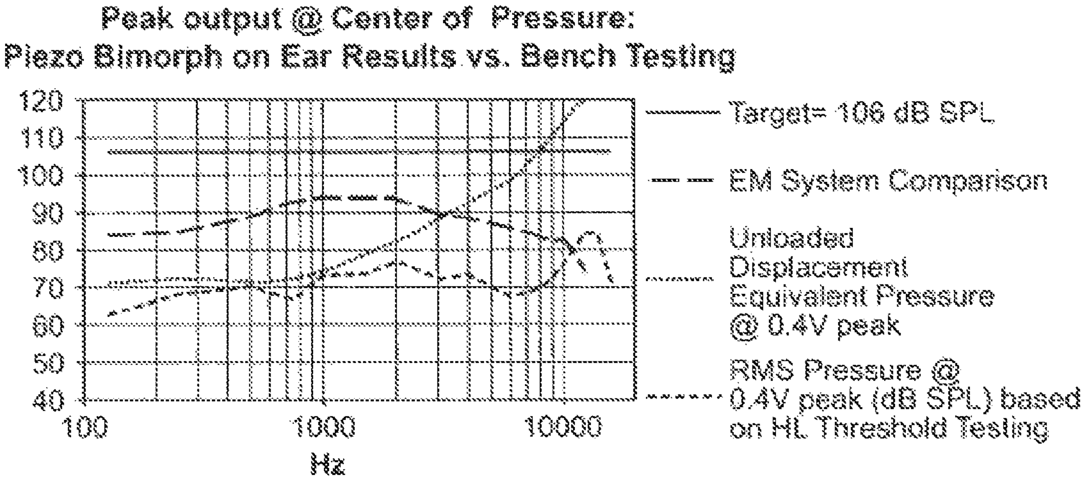
FIG. 21A shows a plot of peak output for a bimorph piezo placed on the center of pressure on an eardrum.
Figure 21B:
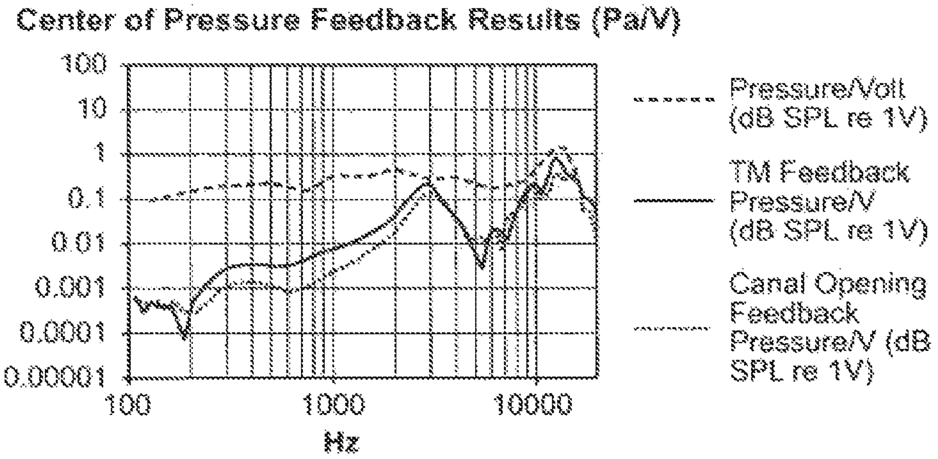
FIG. 21B shows a plot of feedback for a biomorph piezo placed on the center of pressure on an eardrum.

FIGS. 21A and 21B show peak power output and feedback, respectively, of a TRS single crystal bimorph placed on the center of pressure of the eardrum. The on ear results match the bench top predictions up to 2 kHz, then diverge, with the on-ear results remaining flat up to 12 kHz. Employing feedback cancellers or other feedback handling techniques, or moving the microphone location can improve the power output and feedback profiles.

Figure 22A:
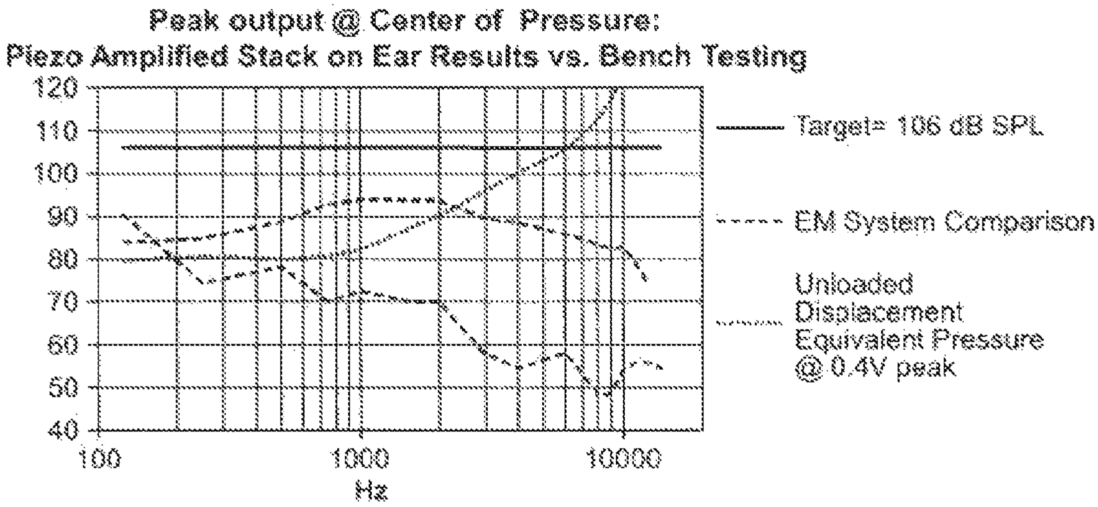
FIG. 22A shows a plot of peak output for a stacked piezo placed on the center of pressure on an eardrum.
Figure 22B:
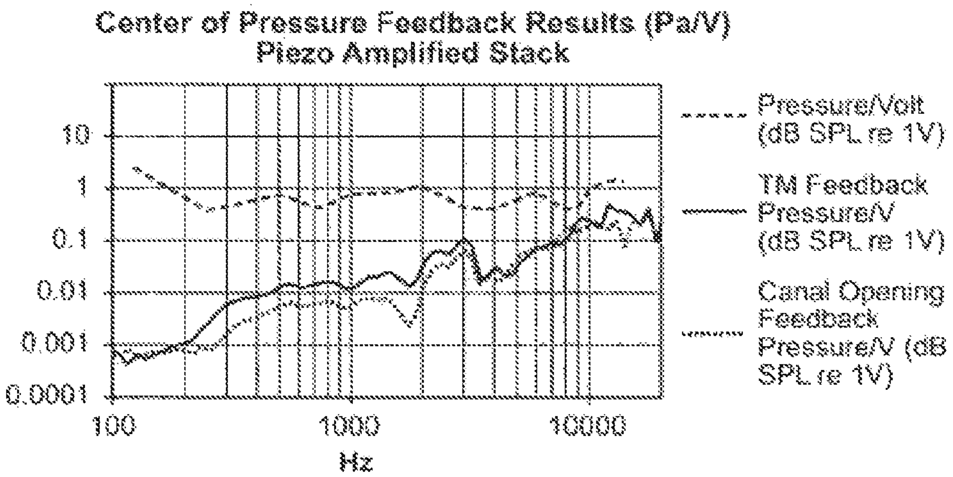
FIG. 22B shows a plot of feedback for a stacked piezo placed on the center of pressure on an eardrum.

FIGS. 22A and 22B show peak power output and feedback, respectively, of a stacked piezo pair with V-jack type displacement amplification placed on the center of pressure of the eardrum. The 100 nF piezo load causes the PV system to be current limited starting at a low frequency. The overall equivalent pressure per volt (when not current limited) is better than the bimorph case by about 20 dB.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A contact hearing device comprising:

a) an actuator assembly comprising a piezoelectric actuator, wherein the piezoelectric actuator comprises one or more coiled wires; and b) a receiver assembly, wherein the actuator assembly comprises a sulcus platform configured to couple the piezoelectric actuator to a tympanic membrane such that the piezoelectric actuator vibrates the tympanic membrane in response to a transmission received by the receiver assembly.

2. The contact hearing device of claim 1, wherein the one or more coiled wires form a flat shape when the piezoelectric actuator does not receive the transmission.

3. The contact hearing device of claim 2, wherein the flat shape is circular.

4. The contact hearing device of claim 2, wherein the flat shape is rectangular.

5. The contact hearing device of claim 1, wherein the one or more coiled wires form conical shape when the piezoelectric actuator receives the transmission.

6. The contact hearing device of claim 1, where the piezoelectric actuator comprises lead zirconate-titanate (PZT).

7. The contact hearing device of claim 1, wherein the receiver assembly further comprises a receive coil that receives the transmission.

8. The contact hearing device of claim 1, wherein the transmission is an electric current.

9. The contact hearing device of claim 1, wherein the transmission is a radio frequency signal.

10. The contact hearing device of claim 1, wherein the actuator assembly further comprises a mass.

11. The contact hearing device of claim 10, wherein the mass has a weight in a range of 50-100 mg.

12. The contact hearing device of claim 10, wherein the mass is a floating mass.

13. The contact hearing device of claim 1, wherein the sulcus platform comprises a drive post.

14. The contact hearing device of claim 1, wherein the sulcus platform comprises a perimeter post.

15. The contact hearing device of claim 1, wherein the sulcus platform comprises an umbo lens.

16. The contact hearing device of claim 1, wherein the sulcus platform is attached to the tympanic membrane by an adhesive.

17. The contact hearing device of claim 15, wherein the actuator assembly is positioned such that the actuator is located approximately in the center of the umbo lens.

18. The contact hearing device of claim 1, wherein the actuator is connected to an inner surface of an ear canal by one or more spring elements.

19. The contact hearing device of claim 18, wherein the one or more spring elements comprise a damping material.

20. A contact hearing system comprising the contact hearing device of claim 1; and an ear tip comprising a transmit coil, wherein the ear tip further comprises a passage extending from a lateral to a medial end of the ear tip, and at least one acoustic vent in the passage, wherein a medical end of the at least one acoustic vent is positioned at or near the medial end of the passage.

21. A contact hearing device comprising:

a) an actuator assembly comprising a piezoelectric actuator and a floating mass; and b) a receiver assembly, wherein the actuator assembly comprises a sulcus platform configured to couple the piezoelectric actuator to a tympanic membrane such that the piezoelectric actuator vibrates the tympanic membrane in response to a transmission received by the receiver assembly.

* * * * *